United States Patent [19]
Zhang et al.

[11] Patent Number: 6,016,478
[45] Date of Patent: Jan. 18, 2000

[54] SCHEDULING SYSTEM WITH METHODS FOR PEER-TO-PEER SCHEDULING OF REMOTE USERS

[75] Inventors: Qili Zhang, Scotts Valley; Jin T. Teh, Fremont; Philippe Richard Kahn, Scotts Valley, all of Calif.

[73] Assignee: Starfish Software, Inc., Scotts Valley, Calif.

[21] Appl. No.: 08/693,677

[22] Filed: Aug. 13, 1996

[51] Int. Cl.[7] ........................................................ B42D 5/04
[52] U.S. Cl. .................................. 705/9; 705/8; 395/200.32
[58] Field of Search ....................... 705/9, 8; 395/200.32, 395/200.33, 200.37, 200.47, 200.57, 200.61, 200.68

[56] References Cited

U.S. PATENT DOCUMENTS

| | | | |
|---|---|---|---|
| 4,769,796 | 9/1988 | Levine | 368/29 |
| 4,807,155 | 2/1989 | Cree et al. | 345/329 |
| 4,866,611 | 9/1989 | Cree et al. | 364/300 |
| 4,881,179 | 11/1989 | Vincent | 364/518 |
| 4,977,520 | 12/1990 | McGaughey, III et al. | 364/521 |
| 5,113,380 | 5/1992 | Levine | 368/10 |
| 5,428,784 | 6/1995 | Cahill, Jr. | 395/200.36 |
| 5,493,692 | 2/1996 | Theimer et al. | 455/26.1 |
| 5,519,606 | 5/1996 | Frid-Nielsen et al. | 364/401 |

OTHER PUBLICATIONS

Mallett, M., "Sorting Out Schedules," BYTE, Dec. 1991, pp. 263, 264, 266, 268.

Microsoft Windows User's guide for the Windows Graphical Environment–Version 3.0, Copyright 1985–1990, pp. 50–53 and 370–382.

Mefford, M., "Track your time and appointments with schedule.com (includes related articles on customizing schedule and schedule command)," PC Magazine, v9, n6, Mar. 27, 1990, Dialog file 47, Accession No. 03386823, p. 303(7).

Kurkowski, C., "In sync; CrossWind's Synchronize software coordinates users' schedules and company resources for efficient project management. (CrossWind Technologies, Inc.'s project management software)," DG Review, v12, n7, Jan. 1992, Dialog file 275, Accession No. 01512963, p. 20(3).

Gunnerson, G., "Staying in Sync, at Home and on the Road," Network Computing, n210, 104, Date 911001, 1991, Dialog file 647, Accession No. 00605915, 3 pages.

*Primary Examiner*—Thomas R. Peeso
*Attorney, Agent, or Firm*—John A. Smart

[57] ABSTRACT

An electronic Personal Information Manager (PIM) including a peer-to-peer group scheduling/calendar system is described. The group scheduling/calendar system provides methods for peer-to-peer group scheduling among users, including those users who only have simple e-mail support (i.e., do not have access to the group scheduling/calendar system itself). If a user is able to receive and respond to e-mail, he or she is able to participate in group scheduling in an automated fashion. Under user control, the system generates a scheduling invitation incorporating different formats. Each format includes, in order of increasing content richness, a simple text embedded scheduling invitation, an HTML (Hypertext Markup Language) form embedded scheduling invitation, and a proprietary binary "MIME" (Multipurpose Internet Mail Extensions) scheduling invitation. Each format is designed to transfer the highest degree of information content which a particular target client type can handle. A recipient of the scheduling message employs the messaging format best suited for his or her environment. Regardless of which format the recipient employs, the group scheduling system processes the reply message automatically, with the appropriate information automatically included in the user's group scheduling calendar. The system supports different levels of participation of various individuals throughout various stages of group scheduling, despite the fact that some of the individuals who need to participate might use other proprietary software and reside in other time zones.

36 Claims, 36 Drawing Sheets

SCHEDULING SYSTEM WITH METHODS FOR PEER-TO-PEER SCHEDULING OF REMOTE USERS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the area of information processing and, more particularly, apparatus and methods for managing and scheduling time-based information for multiple individuals located at different locations.

Successful management of one's time is a goal that every successful professional must achieve. One's business day may be swept away in a deluge of meetings and appointments, all of which must be somehow managed. An attempt to manage this task on paper, such as with a simple wall calendar, is unworkable for all but the simplest of schedules. More likely, such unsophisticated aids to managing one's time will lead to scheduling conflicts, missed appointments, botched deadlines, and angry clients.

Oftentimes, it is necessary to schedule a group of people for an event, such as a meeting. This is the problem of "group scheduling"—that is, notifying a group of people that a certain event is going to happen and receiving confirmation from members of the group whether each can participate. Conventionally, "group scheduling" has been largely limited to scheduling events for users within a particular "work group." Typically, a "work group" has comprised those users connected together through a local area network (LAN). Alternatively, a "work group" can be extended to users who can receive messages. In this extended group, however, manual processing on the part of the user is typically required. For instance, for a user who connects from a remote location, the user is required to manually process messages received to manually update the calendaring product to update one's scheduling status information. This leads to two disjointed activities for the user: (1) retrieving messages and (2) entering/processing scheduling information.

With the ever increasing importance of the Internet, work groups are no longer confined to local area networks, or even wide area networks (WANs). Instead, people are connected together via electronic mail or "e-mail." At the same time, however, users have become accustomed to the ease which automatic scheduling systems provide, such as those which operate within a proprietary environment (e.g., Novell Groupwise® operating on a Netware® local area network). If users are not connected to the same proprietary system (e.g., Novell Groupwise), then the users must resort to a manual scheduling process. Here, the job typically falls to a secretary or administrative assistant who must contact each proposed participant individually, for determining his or her availability. Typically, the person charges with scheduling the event must "negotiate" with the proposed participants for reaching a time when the meeting can finally happen. The process is still not complete, however. A confirmation message must be sent to all proposed participants for confirming the final time.

What is really needed are system and methods which permit any user to schedule appointments with a group of other users in an automated fashion, but without requiring the users of the group to employ or be connected to a particular proprietary system. In particular, such a system should allow a user to initiate a message to invite a group of people to a meeting (i.e., to schedule a meeting). Those individuals should, if they are able to receive electronic mail, be able to participate in the group scheduling. Here, the recipients need not have access to any particular proprietary software for participating in the group scheduling. Instead, each participant need only be able to receive and send e-mail (which can be done using a wide variety of products, from numerous vendors.) The present invention fulfills this and other needs.

SUMMARY OF THE INVENTION

The present invention recognizes a user needs flexibility in choosing how appointments, events, and other time-based data are entered and managed, despite the fact that other individuals who need to participate might use other proprietary software and reside in other time zones. According to the present invention, therefore, an electronic group scheduling/calendar system is provided with methods for peer-to-peer group scheduling among users, including those users who only have simple e-mail support (i.e., do not have access to the group scheduling/calendar system itself), or even have no e-mail support.

According to the present invention, if a user is able to receive and respond to e-mail, he or she should be able to participate in group scheduling in an automated fashion. In particular, the present invention allows a user to undertake group scheduling with other "remote" users located at different locations (including those with different time zones), regardless of what particular platform or software applications each of the other users is employing. In contrast to prior art scheduling approaches which required all users to operate the same proprietary scheduling software, the present invention instead requires only one user of a workgroup to have the group scheduling software which the present invention is embodied. Every other user need only be able to send and receive e-mail messages—using any one of the wide variety of e-mail packages which are available—in order to be automatically tracked by the system. Still further, the present invention includes facilities for accommodating even those users who cannot receive e-mail.

"E-mail" itself is a messaging-based approach which is exploited by the present invention for communicating with all users, regardless of which proprietary system a given user is employing. The present invention implements a messaging subsystem or exchange which provide scheduling primitives (e.g., "accept" and "decline" message types) for supporting the basic functionality of group scheduling, even for generic e-mail clients—that is, a client which does not share nor is even aware of the group scheduling software subsystem provided by the local client of the system of the present invention. This include "dumb" remote clients which simply have no knowledge or understanding of the scheduling format supported by the group scheduling local client.

In typical operation, for instance, group scheduling begins with a user scheduling an event, that is, sending to desired participants an initial meeting message or "invitation" for scheduling the event. The event itself can be any type of event, including those with a duration (e.g., meetings and appointments); "resources" (e.g., conference rooms, projectors, and the like) can also be scheduled. The recipient user(s) can receive the message across a variety of different software platforms or e-mail solutions.

The message itself comprises an identifier, such as <ISK> (or other unique), together with a scheduling invitation in different formats. The different formats include, in order of increasing content richness, a simple text embedded scheduling invitation, an HTML (Hypertext Markup Language) form embedded scheduling invitation, and a proprietary binary "MIME" (Multipurpose Internet Mail Extensions) scheduling invitation. Each format is designed to transfer the highest degree of information content which a particular target client type can handle. A remote client having the scheduling system of the present invention can recognizes from the identifier that the message is from another proprietary client. Accordingly, the client can process the binary "MIME" scheduling invitation natively. This message is a vendor-specific message, allowing direct, proprietary communication between proprietary clients with the richest possible information content.

Since other clients have no knowledge of the scheduling system, they simply ignore the identifier and the binary attachment. To allow the local client to communicate with these recipient, non-proprietary interclient communication formats are employed. For instance, a remote client with browser capability can employ the HTML form embedded scheduling invitation, which can be appropriately processed by its Web browser (e.g., Microsoft Explorer or Netscape Navigator); this represents the richest content that this client type can handle. The embedded HTML form (i.e., Web page) can easily be viewed by the Web browser as an input form having input fields corresponding to the information requested for scheduling the event. For instance, the form may include text or input fields for subject, time, event, and the like. Additionally, the form can include screen buttons for allowing the recipient user to "accept" or "decline" the invitation. At the conclusion of completing the input form, the recipient user can select "submit" for returning the input information back to the initiator. Here, the browser of the recipient generates a reply message, in a manner similar to that done today for on-line Internet registration. Upon receipt of the reply, the originating client can identify, decode, and process the reply appropriately.

In the event that the recipient client is a simple e-mail client, the recipient client employs the simple messaging format incorporated into the scheduling message. Here, the recipient client can view a plain text e-mail message to which the user can respond (e.g., "accept" or "decline"). In the recipient client's reply, the client includes the "body" of the initial invitation message. As is common in e-mail communication, the reply message can itself easily incorporate the contents of the original message. By simply including the initiator's original message when a non-SK client replies, the non-SK client is incorporating information which facilitates processing of the reply by the SK local client. For instance, the reply includes the "ISK" signature which is embedded within the subject line. Other information includes the e-mail address of the recipient as well as the recipient's response (e.g., "accept") using delimited key words. Upon receiving the reply, the initiator can recognize that the response (e.g., an "accept" message or a "decline" message) corresponds to a particular invitation send out, thus facilitating decoding and processing of the message. In this manner, the response includes sufficient scheduling information embedded within it to allow the initiator client to appropriately decode the response, despite the fact that the responding recipient is a simple e-mail client without browser capability.

Regardless of which format the recipient employs, the group scheduling system of the present invention can process the reply message automatically, including entering the appropriate information in the user's group scheduling calendar. In this manner, the system of the present invention can support different levels of participation of various users (none of which is required to have the system), throughout various stages of group scheduling.

BRIEF DESCRIPTION OF THE DRAWINGS

FIGS. 7A–C are bitmap screenshots illustrating a preferred interface provided by the system for processing incoming replies.

FIGS. 8A–G are bitmap screenshots illustrating a preferred interface provided by the system for scheduling use of resources.

DETAILED DESCRIPTION OF A PREFERRED EMBODIMENT

The following description will focus on the presently preferred embodiment of the present invention, which is operative in an end-user application running under the Microsoft® Windows environment. The present invention, however, is not limited to any particular one application or any particular environment. Instead, those skilled in the art will find that the system and methods of the present invention may be advantageously applied to a variety of system and application software, including database management systems, wordprocessors, spreadsheets, and the like. Moreover, the present invention may be embodied on a variety of different platforms, including Macintosh, UNIX, NextStep, and the like. Therefore, the description of the exemplary embodiments which follows is for purposes of illustration and not limitation.

System Hardware

Figure 1A:
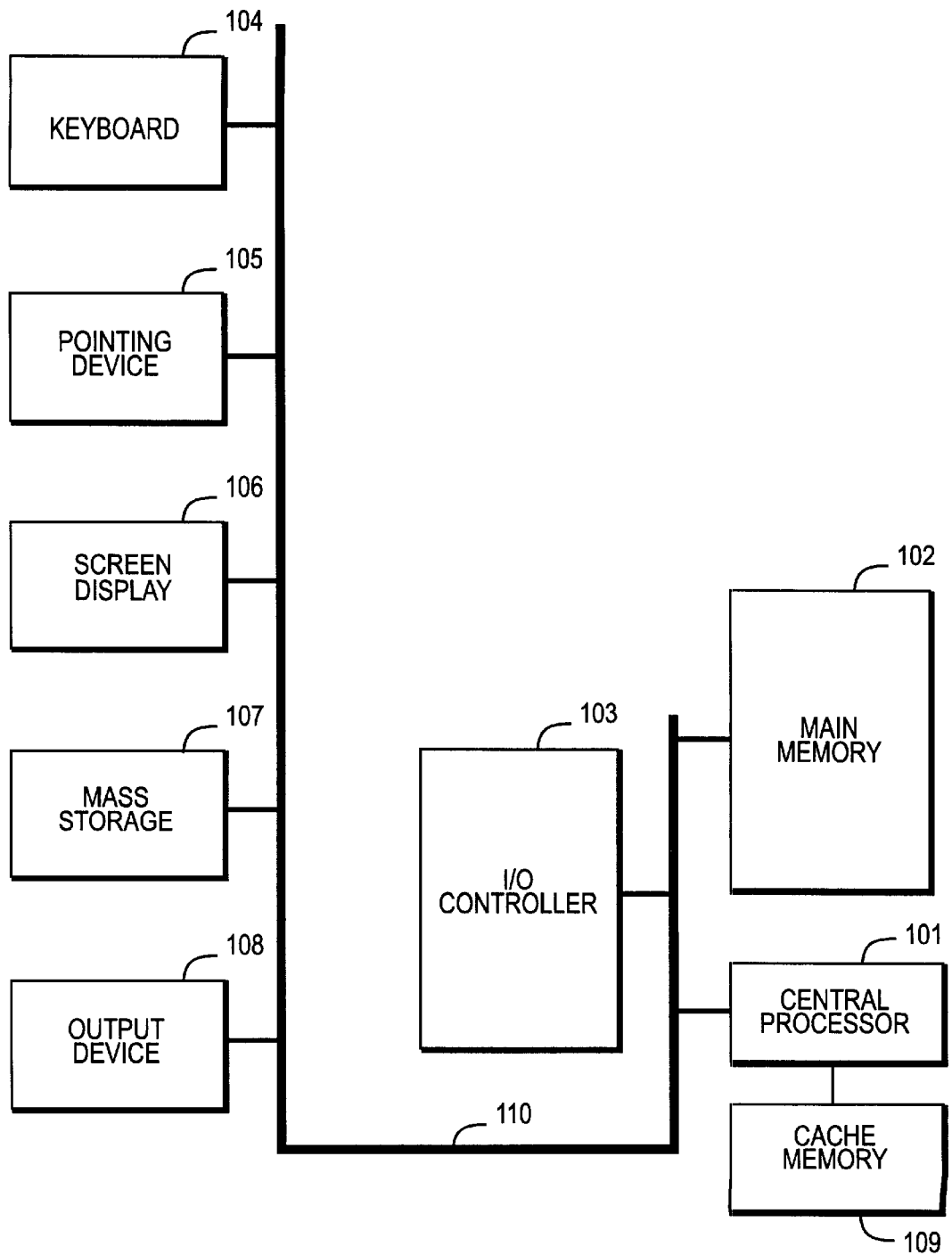
FIG. 1A is a block diagram of a computer system in which the present invention may be embodied.

The invention may be embodied on a computer system such as the system 100 FIG. 1A, which comprises a central processor 101, a main memory 102, an input/output controller 103, a keyboard 104, a pointing device 105 (e.g., mouse, track ball, pen device, or the like), a display or screen device 106, and a mass storage 107 (e.g., hard or fixed disk, removable floppy disk, optical disk, magneto-optical disk, or flash memory). Although not shown separately, a real-time system clock is included with the system 100, in a conventional manner. Processor 101 includes or is coupled to a cache memory 109 for storing frequently accessed information; memory 109 may be an on-chip cache or external cache (as shown). One or more input/output device(s) 108, such as a printing device or slide output device, are included in the system 100, as desired. As shown, the various components of the system 100 communicate through a system bus 110 or similar architecture. In a preferred embodiment, the system 100 includes an IBM PC-compatible personal computer, available from a variety of vendors (including IBM of Armonk, N.Y.). I/O device 108 may include a laser printer, such as an HP Laserjet printer, which is available from Hewlett-Packard of Palo Alto, Calif.

System Software

A. Overview

Figure 1B:
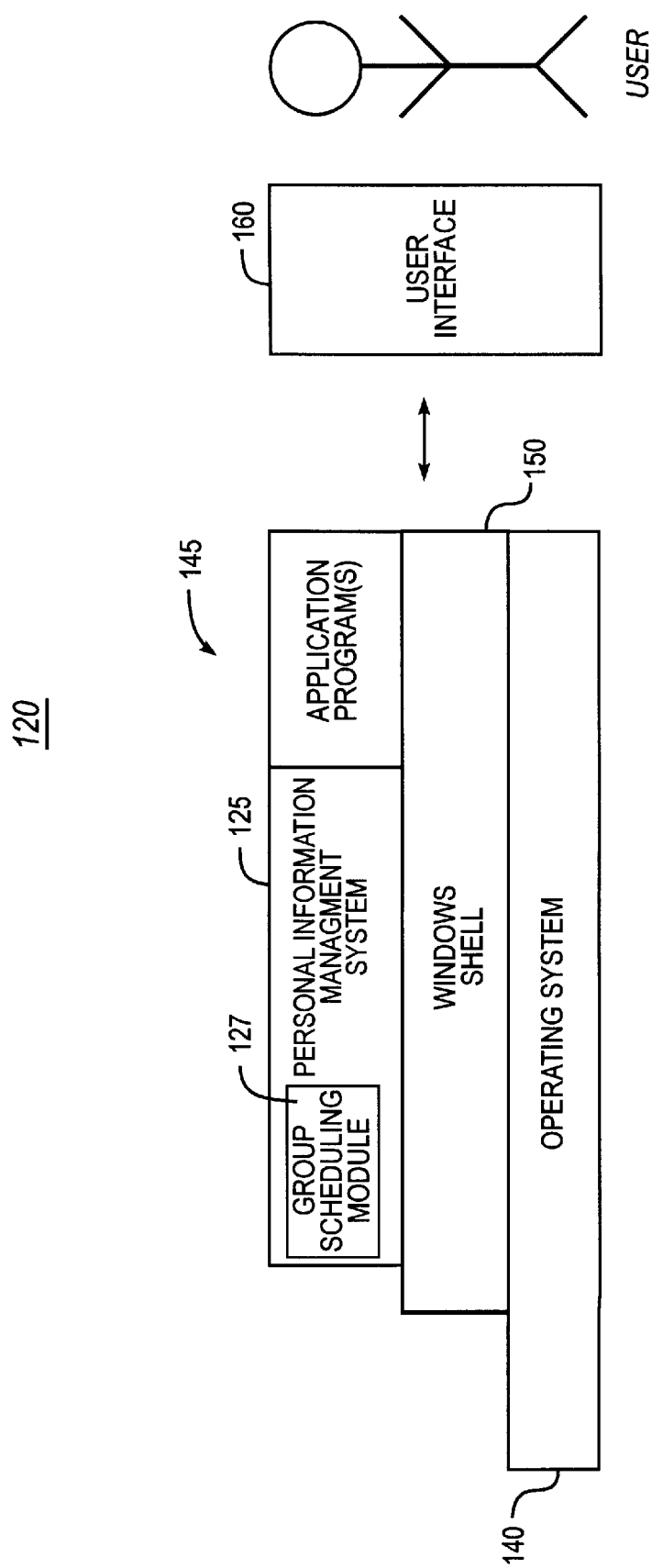
FIG. 1B is a block diagram of a software system of the present invention for controlling the operation of the system of FIG. 1A.

Illustrated in FIG. 1B, a computer software system 120 is provided for directing the operation of the computer system 100. Software system 120, which is stored in system memory 102 and on storage (e.g., disk memory) 107, includes a kernel or operating system (OS) 140 and a windows shell 150. One or more application programs, such as client application software or "programs" 145 may be "loaded" (i.e., transferred from storage 107 into memory 102) for execution by the system 100.

System 120 includes a user interface (UI) 160, preferably a Graphical User Interface (GUI), for receiving user commands and data. These inputs, in turn, may be acted upon by the system 100 in accordance with instructions from operating module 140, windows 150, and/or client application module(s) 145. The UI 160 also serves to display the results of operation from the OS 140, windows 150, and application (s) 145, whereupon the user may supply additional inputs or terminate the session. OS 140 and windows 145 can be provided by Microsoft® Windows 95, by Microsoft® Windows NT, or by Microsoft® Windows 3.x (operating in conjunction with MS-DOS); these are available from Microsoft Corporation of Redmond, Wash. Although shown conceptually as a separate module, the UI is typically provided by interaction of the application modules with the windows shell, both operating under OS 140.

One application software comprises a Personal Information Management (PIM) System 125 which includes an Internet-based Group Scheduling Module 127 of the present invention. The Internet-based Group Scheduling Module 127 provides group scheduling among users connected to the Internet or to other commercial service providers (e.g., CompuServe). In an exemplary embodiment, PIM System 125 comprises Sidekick®, which is available from Starfish Software, Inc. of Scotts Valley, Calif. A general description of the operation of Sidekick® can be found in its accompanying user manual. Interface and methods provided by the group scheduling module of the present invention, in the exemplary embodiment of Sidekick®, will now be described in further detail.

Peer-to-Peer Scheduling

A. General

According to the present invention, if a user is able to receive and respond to e-mail, he or she should be able to participate in group scheduling. In particular, the present invention allows a user to undertake group scheduling with other "remote" users located at different locations (including those with different time zones), regardless of what particular platform or software applications each of the other users is employing. In contrast to prior art scheduling approaches which required all users to operate the same proprietary scheduling software, the present invention instead requires only one user of a workgroup to have the group scheduling software which the present invention is embodied. Every other user need only be able to send and receive e-mail messages—using any one of the wide variety of e-mail packages which are available. Still further, the present invention includes facilities for accommodating even those users who cannot receive e-mail.

"E-mail" itself is a messaging-based approach which is employed by the present invention for communicating with all users. The present invention implements a messaging subsystem or exchange which provide scheduling primitives—for example, "accept" and "decline" message types—for supporting the basic functionality of group scheduling. In typical operation, for instance, group scheduling begins with a user scheduling an event, that is, sending to desired participants an initial meeting message or "invitation" for scheduling the event. The event itself can be any type of event, including those with a duration (e.g., meetings and appointments); as described below, "resources" (e.g., conference rooms, projectors, and the like) are also scheduled. The recipient user(s), once having received the message, can undertake one of several actions. The user can accept or decline to participate, or the user can forward the message to one or more other users. When declining a proposed scheduling event, the user can propose another time for the event. When a user declines, he or she replies with a "decline" message; the message may include one or more alternative times proposed by the declining user. The decline message is processed upon its return, whereupon the system automatically updates the scheduling calendar. An accepting user, on the other hand, replies with an "accept" message. Again, the group scheduling system processes the message automatically, including entering the appropriate information in the group scheduling calendar. In this manner, the system of the present invention can support different levels of participation of various users (none of which is required to have the system), throughout various stages of group scheduling.

B. Functional Overview

Figure 2:
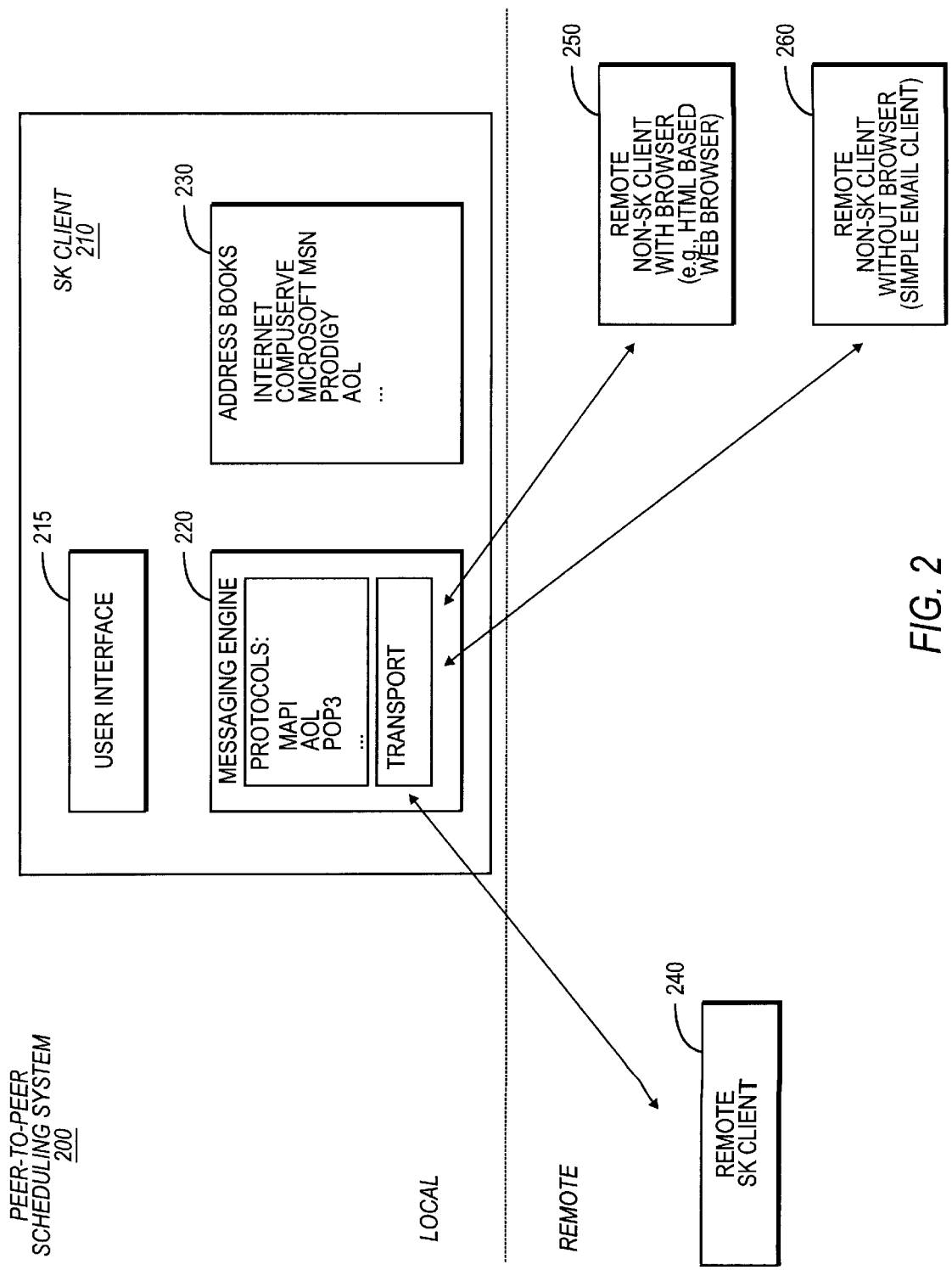
FIG. 2 is a bitmap screenshot illustrating a user interface of a Personal Information Manager which embodies the present invention.

FIG. 2 is a block diagram illustrating a functional overview of a group scheduling system 200 of the present invention, from the perspective of an end user. The system includes a local client 210 comprising front-end software, including a graphical user interface, for entering scheduling information and generating group scheduling messages. The client 210 connects to transport mechanism or messaging engine 220. This provides the mechanism whereby the client 210 can send messages to and receive messages from remote clients.

In a preferred embodiment, the messaging engine 220 supports Microsoft is Exchange or MAPI (Messaging Application Programming Interface), AOL (America On Line), and POP 3 (Internet "Post Office Protocol)" messaging protocols. These widely-supported protocols can be employed for reaching remote clients having addresses (i.e., accounts) on the Internet, America On Line, Microsoft Network (MSN), as well as other systems which are accessible through gateways (e.g., Compuserve, which has an Internet gateway). To further support each messaging or mail system, the client 210 includes an address book module 230, which comprises a separate address book for each messaging system. In an exemplary embodiment, for instance, the system provides support for AOL address book, Internet (Netscape) address book, and MAPI-exchange address book.

With the messaging engine connection, the client 210 is a "local" client which exchanges messages with various "remote" clients, such as client 240, client 250, and client 260. As shown, there are different types of remote clients. One type of remote client is one which shares the same software group scheduling subsystem as the local client 210 (i.e., it "understands" proprietary file formats of the local client 210). Such a client is shown at 240. Here, the local client 210 and the remote client 240 can of course communicate directly using the proprietary format understood by both, in the same manner as presently done by present-day proprietary group scheduling solutions.

According to the present invention, however, a remote client may also comprise a generic e-mail client—that is, a client which does not share nor is even aware of the group scheduling software subsystem provided by the local client of the present invention. These "dumb" remote clients, such as represented by clients 250 and 260, simply have no knowledge or understanding of the scheduling format supported by the local client 210. For clarity of the description which follows, the generic or non-proprietary clients are referred to as "non-SK" clients, for indicating that these clients do not have Sidekick®—the proprietary software which implements automated group scheduling with both proprietary and non-proprietary clients. Those clients which do have Sidekick® are referred to a "SK" clients.

With the ever-increasing use of the Internet and particular the rapid adoption of the World-wide Web ("Web") as a pervasive communication platform, an ever-increasing number of non-proprietary remote clients will have a standard browser, such as Netscape Navigator (available from Netscape of Mountain View, Calif.) or Microsoft Internet Explorer (available from Microsoft Corp. of Redmond, Wash.). As described in further detail below, the present invention may exploit this by using rich text messages, such as e-mail including one or more HTML (Hyper Text Markup Language) forms or "Web pages." Such a client, such as shown at 250 in FIG. 2, is identified as a remote non-SK client "with browser." A simple e-mail client, on the other hand, is identified as a remote non-SK client "without browser."

C. Interclient Communication

Figure 3A:
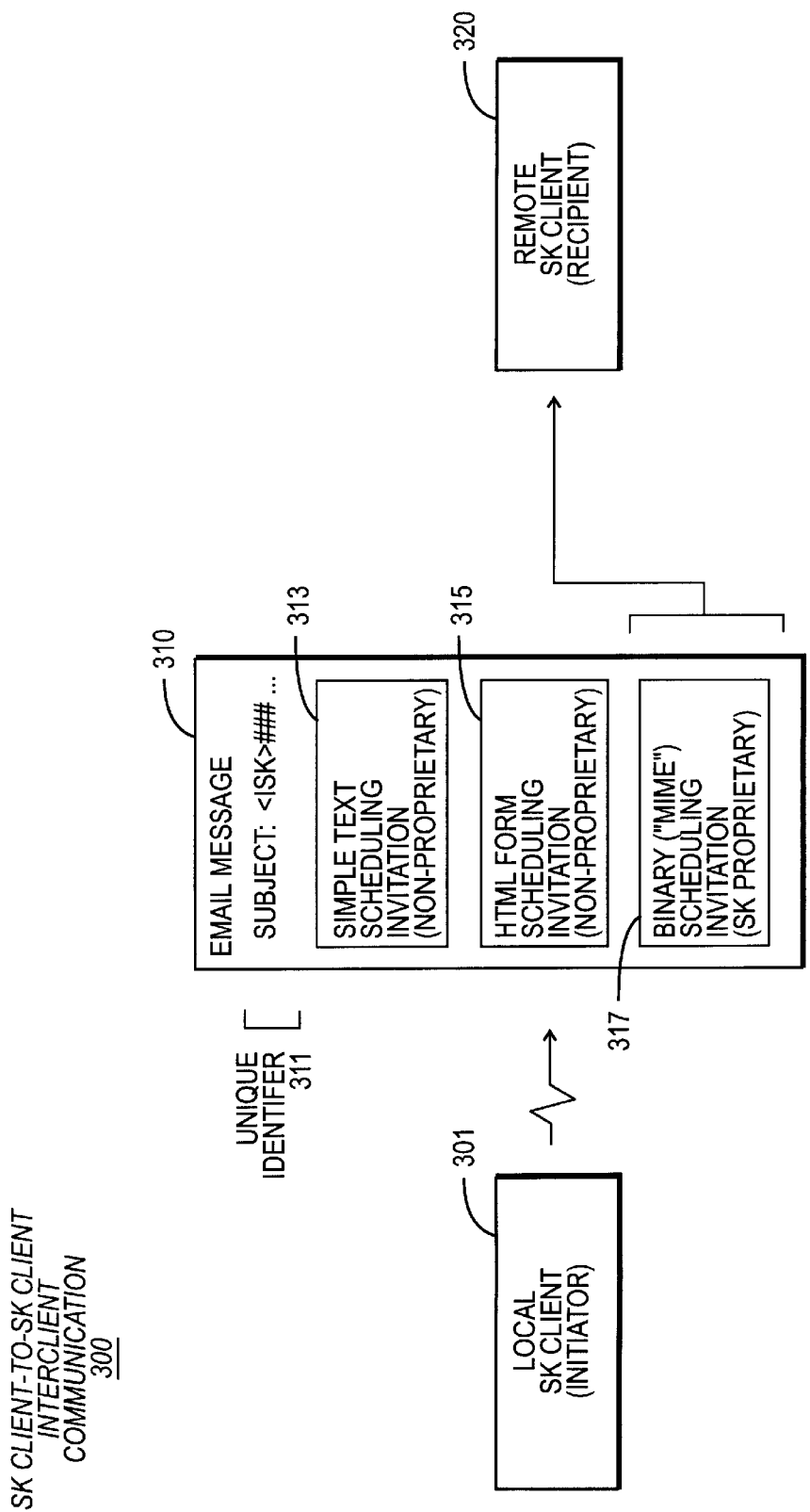
FIGS. 3A–C illustrate interclient communication which employs a message incorporating multi-format information embedded within.
Figure 3B:
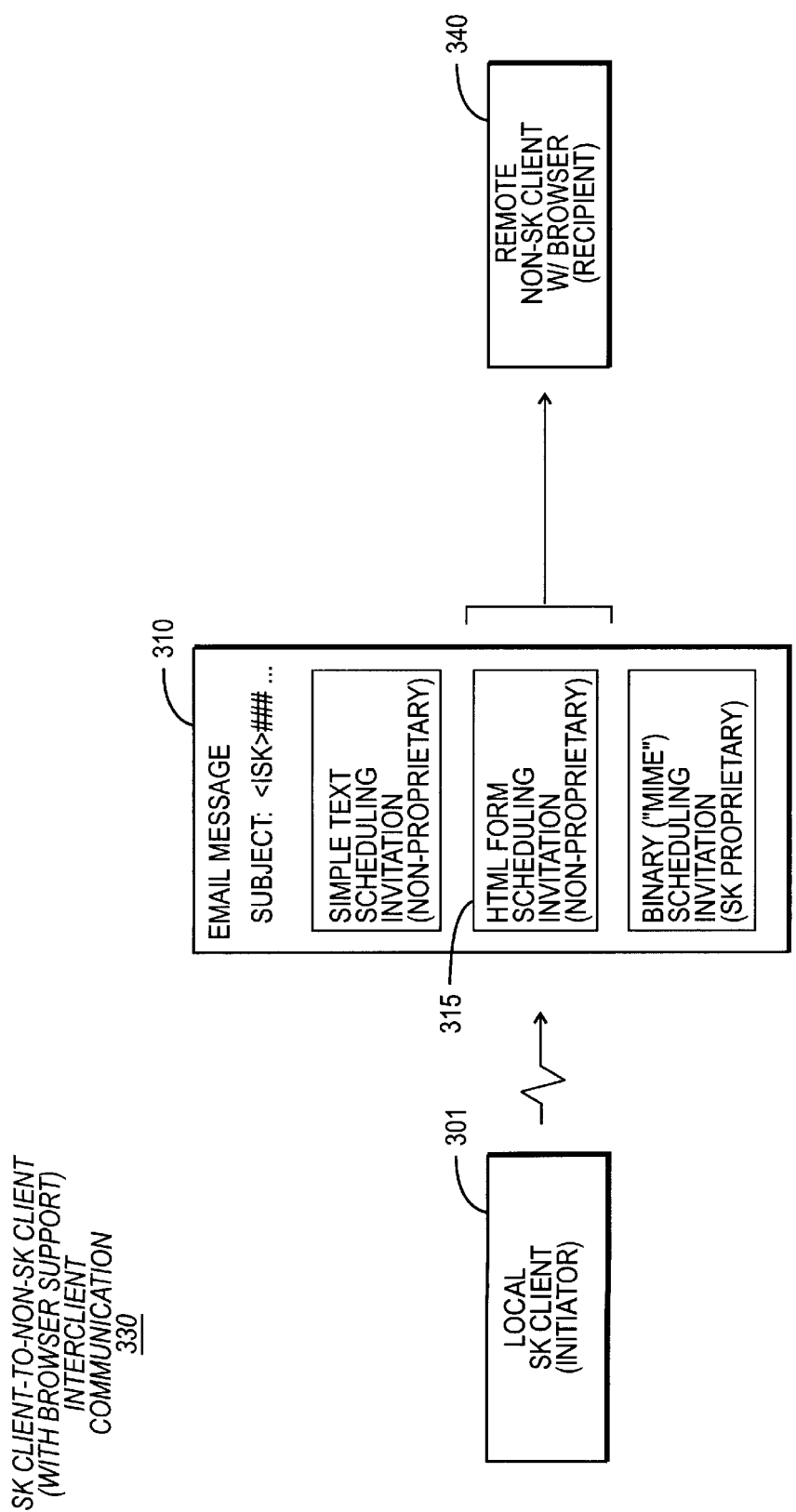
Figure 3C:
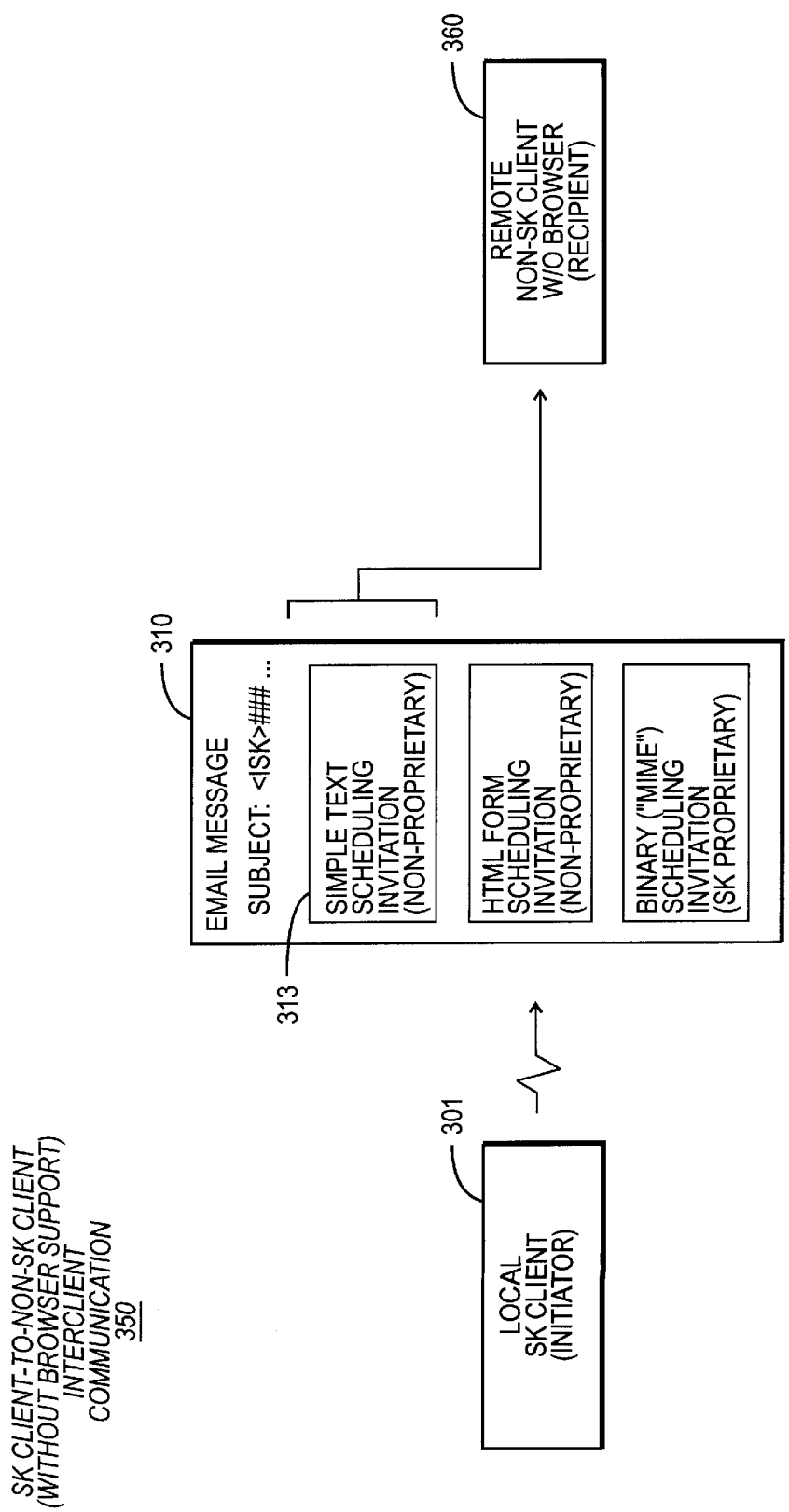

The local SK client communicates with other clients by employing its messaging engine or transport layer to sends and receives electronic mail or messages. As illustrated in FIGS. 3A–C, each message itself is structured to facilitate an optimal communication protocol appropriate for the different types of clients (i.e., SK client, non-SK client with browser, or non-SK client without browser). This is achieved by incorporating into the message different formats of the scheduling message—one format for each particular client type.

To allow rapid identification of scheduling messages between SK clients themselves, an identifier or "signature" is incorporated into the message by tagging the standard "subject line" in each e-mail message. In an exemplary embodiment, the initiator of a message (i.e., local SK client) includes the following unique identifier in the subject line of <ISK> or, alternatively, <SIS>. The interpretation of this depends on the actual type of client the recipient is. Remote recipient clients which do support the proprietary format of the local client (i.e., recipient SK remote clients) can recognize the identifier and readily identify the message as a scheduling message from another SK client. This allows all SK clients to easily identify scheduling messages among themselves, thus facilitating decoding and processing of messages. In the instance of one SK client communicating with another SK client, therefore, the recipient is a "smart" client with full knowledge and understanding of the type of message and how to interpret it.

One such SK-client-to-SK-client dialog is illustrated by interclient communication 300 in FIG. 3A. Local SK client sends e-mail message 310. The message comprises the <ISK> (or other unique) identifier 311 together with a scheduling invitation in different formats. The different formats include, in order of increasing content richness, a simple text embedded scheduling invitation 313, an HTML (Hypertext Markup Language) form embedded scheduling invitation 315, and a proprietary binary "MIME" (Multipurpose Internet Mail Extensions) scheduling invitation 317.

Each format is designed to transfer the highest degree of information content which a particular target client type can handle. In FIG. 3A, for instance, remote client 320 recognizes from the identifier 311 that the message 310 is from another SK client—SK local client 301. Accordingly, the remote SK client 320 processes the binary "MIME" scheduling invitation 317.This message is a SK-specific message, allowing direct, proprietary communication between SK clients with the richest possible information content. Description of the MIME format is well documented in the trade literature; see e.g., Kientzle, T., *MIME and Internet Mail*, Dr. Dobb's Journal, September 1995, pp. 54–60 (with code listings pp. 104–110), the disclosure of which is hereby incorporated by reference.

Since non-SK clients have no knowledge of the scheduling system, they simply ignore the identifier and the SK binary attachment. To allow the SK local client to communicate with these non-SK recipient, the non-proprietary interclient communication formats 313, 315 are employed. As shown in FIG. 3B, for instance, remote non-SK client with browser 340 employs the HTML form embedded scheduling invitation 315, which can be appropriately processed by its Web browser (e.g., Microsoft Explorer or Netscape Navigator); this represents the richest content that this client type can handle.

The embedded HTML form (i.e., Web page) can easily be viewed by the Web browser as an input form having input fields corresponding to the information requested for scheduling the event. For instance, the form may include text or input fields for subject, time, event, and the like. Additionally, the form can include screen buttons for allowing the recipient user to "accept" or "decline" the invitation. At the conclusion of completing the input form, the recipient user can select "submit" for returning the input information back to the initiator. Here, the browser of the recipient generates a reply message, in a manner similar to that done today for on-line Internet registration. Upon receipt of the reply, the SK client 210 can identify, decode, and process the reply appropriately. Based on the action selected by the recipient (e.g., accept, decline, or the like), the SK client 210 can update its scheduling information in an appropriate manner.

In the event that the client is a non-SK client and does not have a browser, a simple messaging format is employed. As shown in FIG. 3C, remote non-SK client without browser 360 processes the simple text embedded scheduling invitation 313, as this represents the richest content that it can handle. Here, the recipient client receives a plain text e-mail message to which it can respond (e.g., "accept" or "decline"). In the client's response, the client includes the "body" of the initial invitation message. As is common in e-mail communication, the reply message can itself easily incorporate the contents of the original message. By simply including the initiator's original message when a non-SK client replies, the non-SK client is incorporating information which facilitates processing of the reply by the SK local client. For instance, the reply includes the "ISK" signature which is embedded within the subject line. Other information includes the e-mail address of the recipient as well as the recipient's response (e.g., "accept") using delimited key words. Upon receiving the reply, the initiator can recognize that the response (e.g., an "accept" message or a "decline" message) corresponds to a particular invitation send out, thus facilitating decoding and processing of the message. In this manner, the response includes sufficient scheduling information embedded within it to allow the initiator client to appropriately decode the response, despite the fact that the responding recipient is a non-SK client without a browser—a simple, generic e-mail client.

D. Resource Scheduling

When a meeting or an event is scheduled, often "resources" will be needed as well. For a board meeting, for instance, the board room needs to be available. The meeting might also require other resources, such as an overhead projector or a VCR. In accordance with the present invention, the scheduling system is extended to include these "resources." As with users, the resource scheduling is peer-to-peer—that is, it is shared among the users in a cooperative fashion.

A resource itself "owns" an e-mail account—that is, it is able to send and receive scheduling messages. In this manner, scheduling of the resource can be completely automated. Here, the resource is controlled by an SK client, which manages the calendar for the resource. When a request is received to schedule the resource, the SK client can check its calendar and respond whether the resource is available, all in an automated fashion. For the example of a board room meeting, the board room resource is, in effect, "invited" to the meeting. Through the SK client which is controlling the scheduling calendar for the board room, the board room can "reply." In a preferred embodiment, an immovable resource (e.g., "room" resource) cannot be scheduled to attend two meetings at the same time. A person, on the other hand, can be scheduled for two meetings at the same time; in that instance, the person decides which meeting to attend (i.e., which one is more important), or decides to attend certain portions of each meeting.

Preferred Interface and User Operation

A. General Interface

Figure 4:
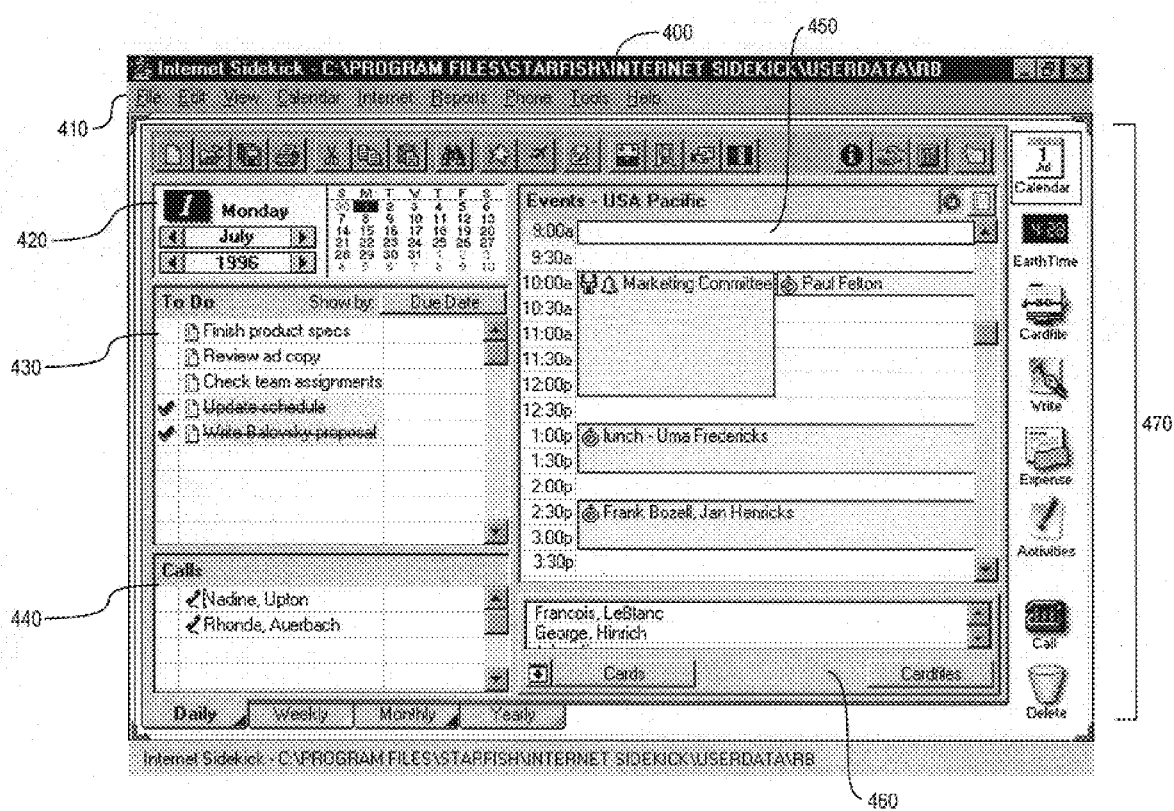
FIG. 4 is a bitmap screenshot illustrating a "Deskpad" interface provided by the system.

As shown in FIG. 4, the system provides a "Deskpad" interface 400—that is, a personal information management interface which includes an electronic appointment calendar. The interface 400 includes a menu bar 410, for invoking menu items or commands. The interface itself is comprised of particular subregions. A first subregion 420 displays the current time and date. Below this region are a To Do region 430 and a Call region 440. The former lists To Do items which the user has included. The latter is a log of calls which the user wishes to track. Actual schedule events or appointments are displayed in the interface at region 450. By default, appointments are displayed in one's own local time. The interface also includes a quick lookup or viewport 460, for working with another view of the interface (e.g., "Cardfile" view). Finally, the interface includes Deskpad icons 470, for quickly switching to other modules of the system.

The interface 400 provides different "views": Calendar view, Cardfile view, Write view, Expense view, and Activities view. The Cardfile view can be used as an address book in which the user stores names, addresses, e-mail addresses, phone numbers, and other information (e.g., record collection). The Cardfile works with the Calendar's Internet group scheduling to address event invitations, and also can look up phone numbers of incoming calls using Caller ID. The user can use the Cardfile with the Phone Dialer to dial calls, or merge card information into a letter using Quick Letter. The Write view provides a place to create and format documents, organized in folders and binders. The Expense view lets the user enter information from expense receipts, and organize expenses in folders. The user's expenses are printed in a finished expense report. The Activities view presents information about all the user's group scheduling events plus other Calendar activities: one's calls, To Do items, and individual appointments for the period selected. The Activities view is employed to reply to group event invitations and view replies to group events the user has originated.

Of particular interest to the present invention is the Calendar view which, as shown in FIG. 4, displays the user's Calendar. Here, the user creates appointments and uses Internet-based messaging (or other electronic messaging service) to automatically handle invitations and replies for scheduling group events. The appointments adjust to the user's own local time zone, if the user travels with the computer when he or she switches to the new local time in an "EarthTime" module of the system. The EarthTime module tells the user the current time in eight locations around the globe, and provides other information such as time difference start and end of daylight saving time, and other facts about each city, for over 540 cities. Further description of the EarthTime module is provided in commonly-owned application Ser. No. 08/609,983, filed Feb. 29, 1996, which is hereby incorporated by reference. When desired, the user can print the Calendar in a variety formats, including page sizes suited to the most popular day planners, such as Keith Clark, DayRunner, Day-Timers, and Franklin Planner.

B. Peer-to-Peer Scheduling Interface

1. Overview

The Group Scheduling module 127 uses electronic messaging to communicate with others to schedule events and book resources. Because it supports numerous e-mail platforms, including the Internet, the module can provide group scheduling with users anywhere in the world. The system automatically invites the participants to an event the user schedules, and collects their replies for accepting or declining the invitation or for requesting that the user reschedule it. The event is automatically placed in the Calendar in the Calendar view, as well as the recipients' calendars if they accept. Additionally, the user can also automatically reserve resources for the event, such as conference facilities, projectors, and others. Most of the group scheduling occurs in the Activities View, where the user can see all group events in list form. Events the user schedules, or that the user accepts an invitation to, are also posted automatically in the user's Calendar.

To schedule an event, the user enters the details of the meeting and the list of people he or she wants to invite. The system then automatically notifies the recipients and collects their responses for the user. In addition to electronic messaging, the user can use fax or telephone for group scheduling, for people without e-mail accounts. If the user specifies a fax number for notification, the event invitation is automatically sent using built-in fax software (e.g., Microsoft Fax) and the user's fax modem. Selecting phone notification, on the other hand, puts a reminder in the user's Calls list.

2. Scheduling Wizard

The system provides a convenient "Scheduling Wizard" to assist the user in the process of entering event information. It helps the user enter all the information about the event, and identify the participants he or she wants to invite. The user also can create a group event using a "Schedule an Event" dialog box. The user can include a message with the invitation, and the replies can include a message and a report on free time if a recipient cannot attend at the scheduled time. If the user needs to notify some people by fax or phone, he or she can enter their reply status manually.

Figure 5A:
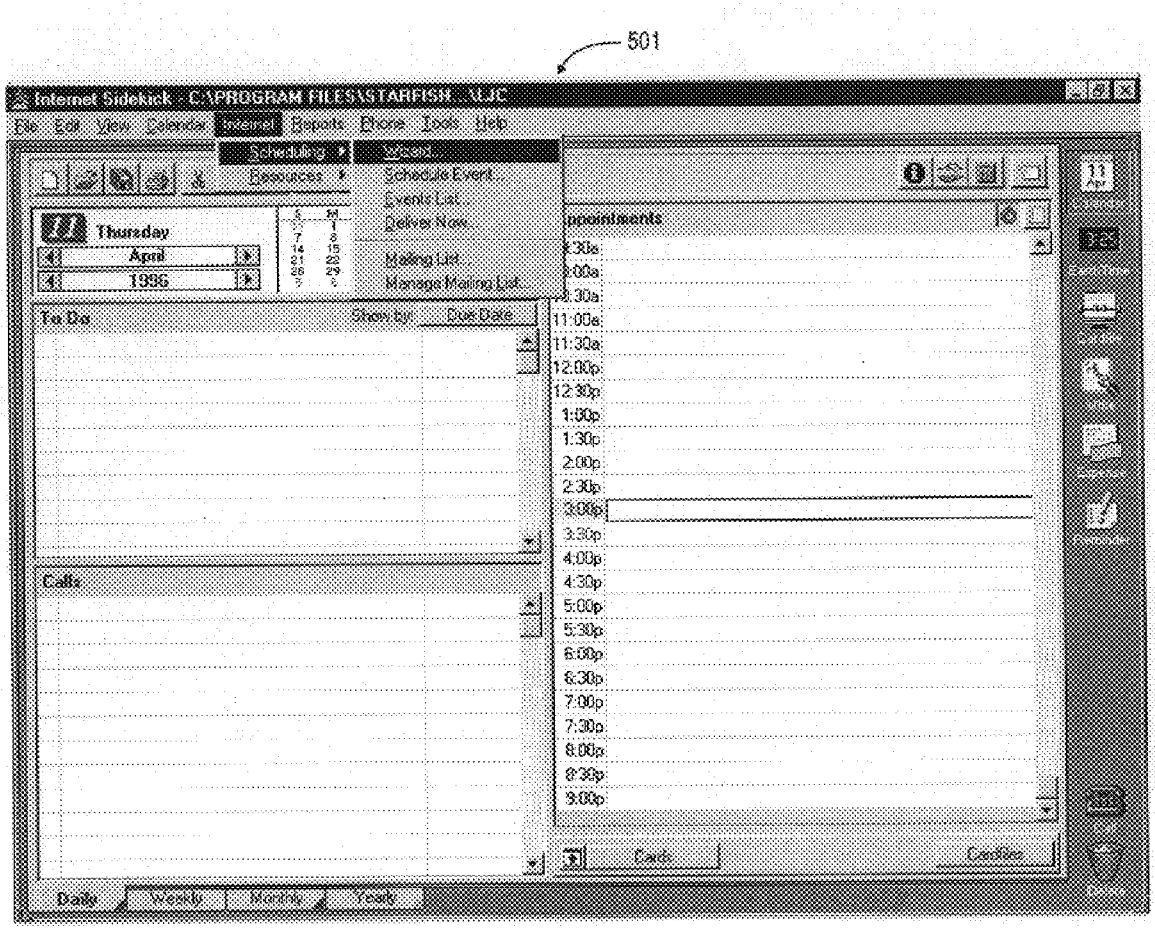
FIGS. 5A–I are bitmap screenshots illustrating a Scheduling Wizard interface provided by the system for scheduling events.
Figure 5B:
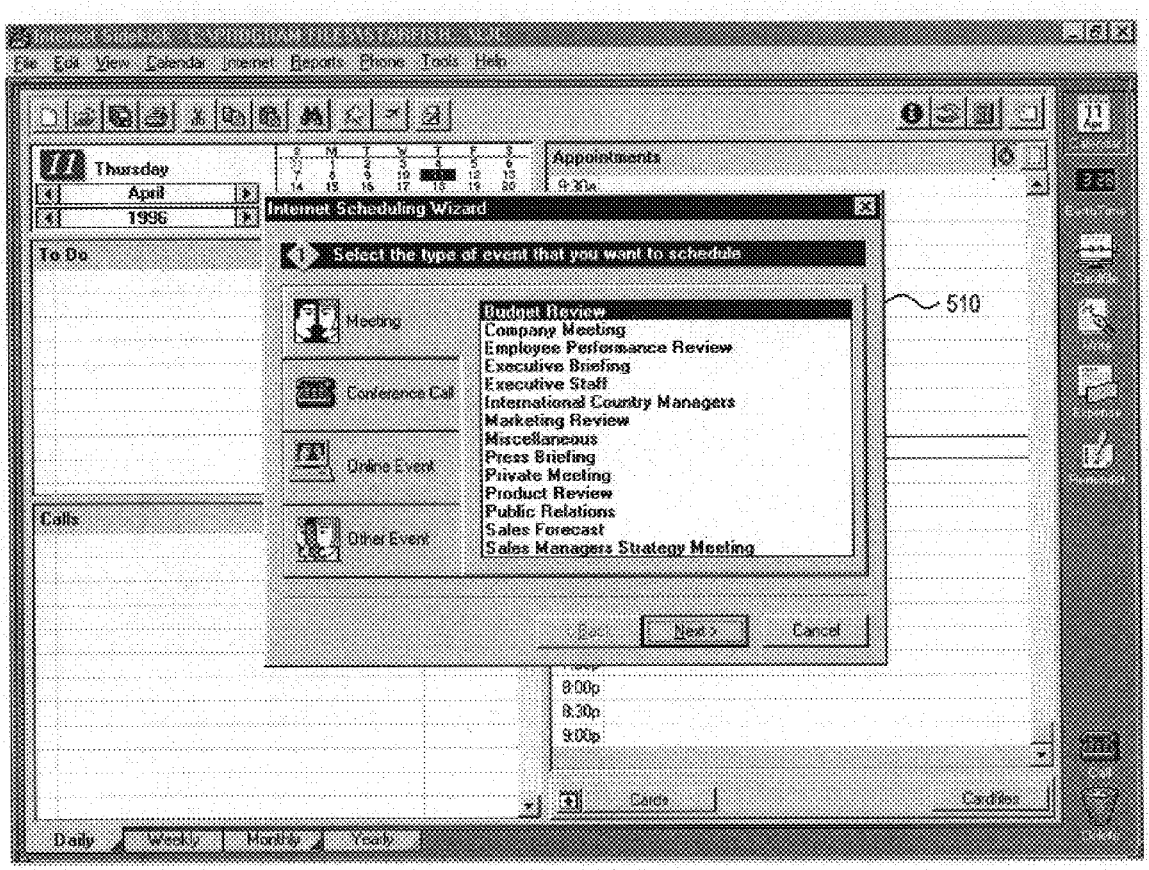

The easiest way to enter group event information is using the Scheduling Wizard. To schedule an event in the Activities or Calendar view, the user selects Internet|Scheduling Wizard from the main menu, as shown at 501 in FIG. 5A This action launches Scheduling Wizard 510, as shown in FIG. 5B. The wizard consists of a series of pages that prompt the user to enter the information for the event, such as participants, resources, agenda or notes, and options. The user enters the information in each page, and clicks "Next" to proceed to the next page. The user can go back at any time to earlier pages if he or she needs to change something. When the user has finished, they system displays an Event Summary. Here, the user can review his or her choices, and make changes, if necessary, by going back to previous pages. When the user is ready to schedule the event, the Wizard adds it to the user's queue of outgoing messages, and put it on the user's calendar. To use Internet scheduling, the user creates a cardfile that contains properly identified e-mail addresses for the people the user will be inviting. Alternatively, the user can use an existing Netscape Address Book or Microsoft Exchange Cardfile for addressing.

Figure 5C:
Figure 5D:
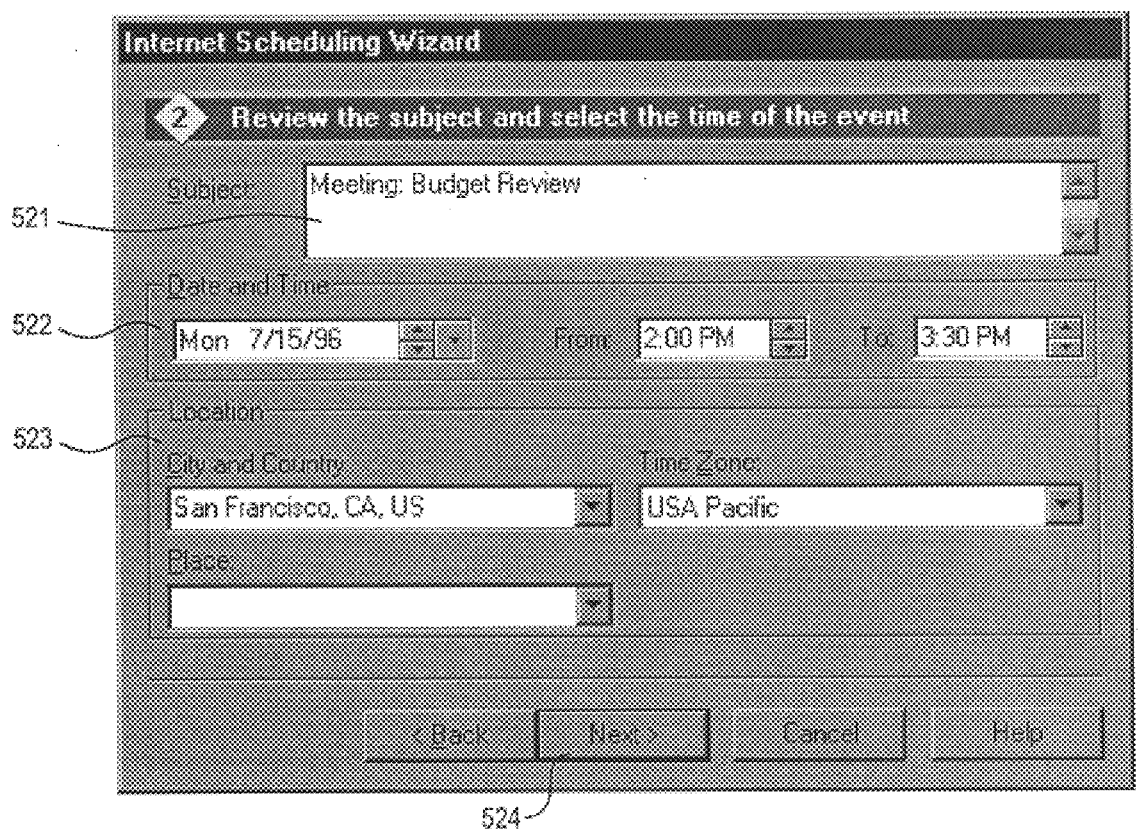

The wizard is used from start to finish as follows. First, the user enters an event type. As illustrated in FIG. 5C, the user clicks an event category at 511 and selects a particular subject—that is, an event type to schedule. When the user has completed each Wizard panel, the user clicks "Next" button 512 to continue. Alternatively, the user can click "Back" to return to an earlier panel. Next, in FIG. 5D, the user invokes the "Date and Time" page. Here, the user reviews the subject presently entered, at 521, and then enters a date and time for the event, at 522. The user can select the date by typing or by using the arrows. A calendar can be opened at this point (e.g., by selecting the large arrow). The user also enters the start and end times. Next, the user selects or types the city where the event is to occur, at 523. The time zone fills in automatically. After typing or selecting a place, the user advances the wizard to the next pane by selecting Next button 524.

Figure 5E:
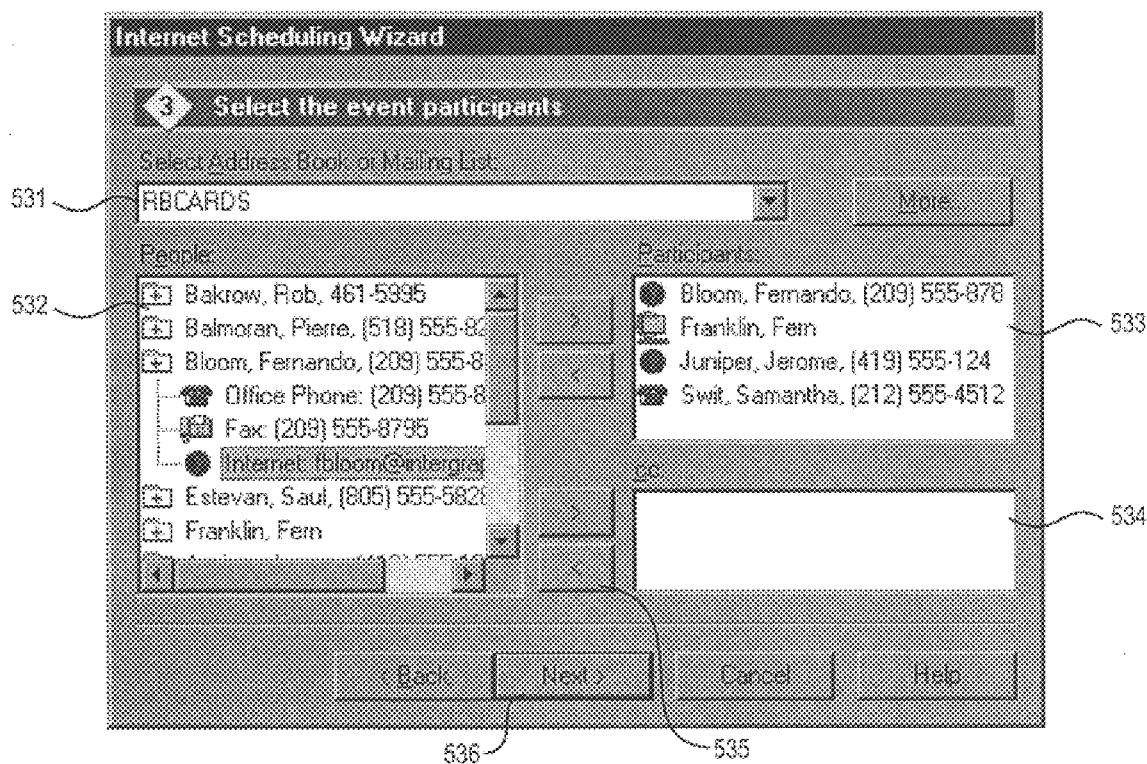
Figure 5F:
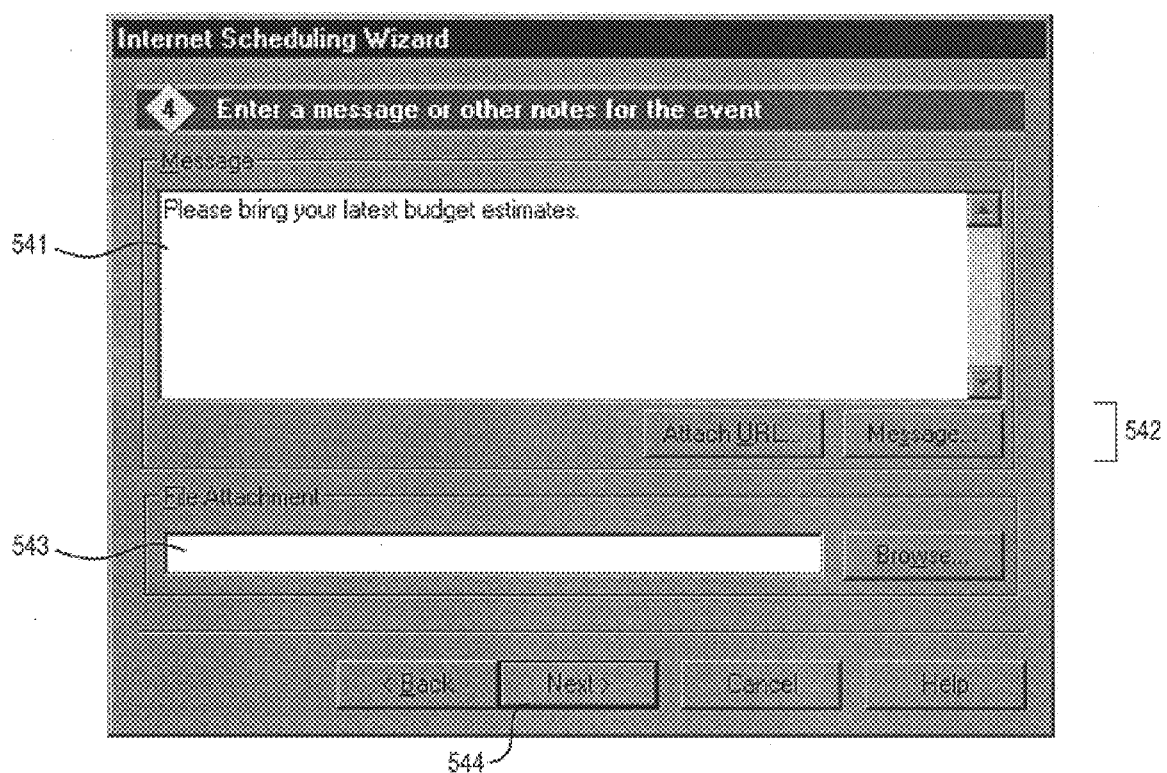
Figure 5G:
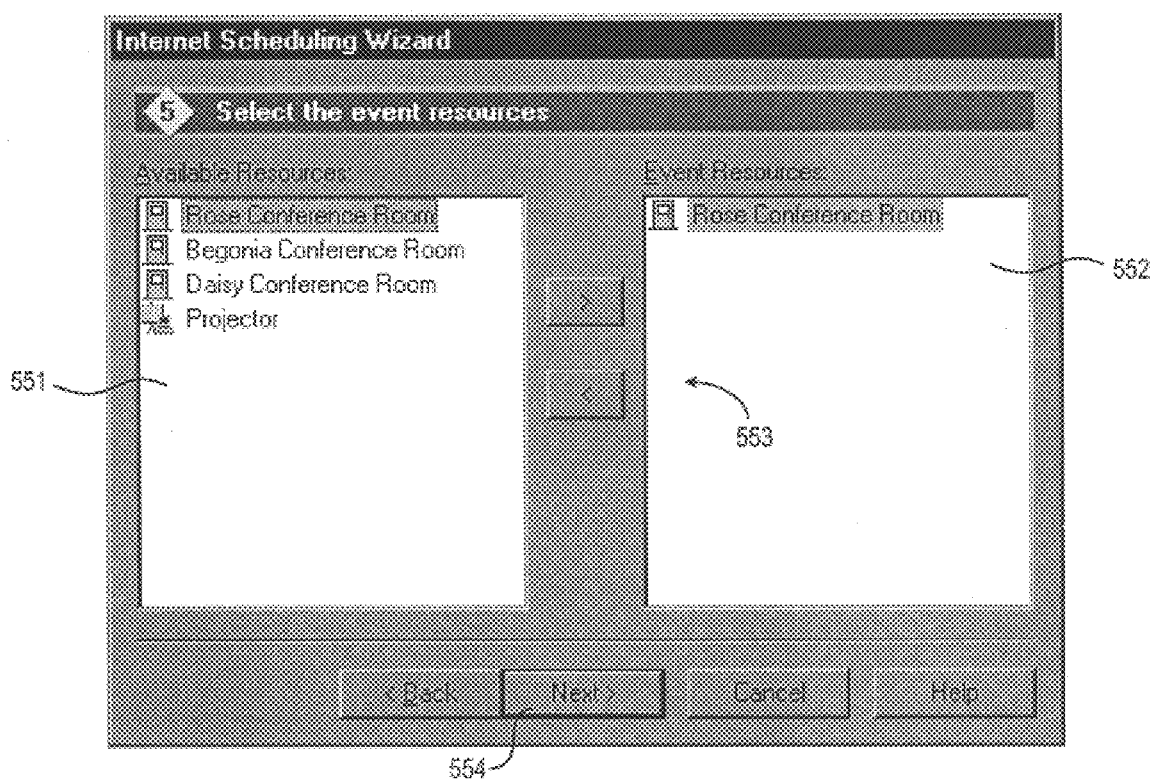

The next pane is a "Participants" page, illustrated in FIG. 5E, which allows the user to select participants. At 531, the user chooses an Address Book or a mailing list; clicking "More" opens a different Address book. Now, the user clicks the folder next to each name, and clicks the notification method (i.e., e-mail, fax, or the like) for that participant. The user adds desired selections to the Participants list 533 or CC list 534, using selection buttons 535. Thereafter, the user moves to the next pane by selecting Next button 536. On the "Message" page, shown in FIG. 5F, the user types the agenda or notes, at 541. From buttons 542, the user can click a "Message" button to select a file containing a message. Alternatively, the user clicks "Attach URL" (Uniform Resource Locator, the address of a site on the World Wide Web) to add an Internet address as part of the message information. Users receiving the URL can click on it to launch their Web browser and jump to the URL site. At 543, the user can select a file to send as an attachment to the meeting invitation. The user proceeds to the next pane by selecting Next button 544. The next pane or page is the "Resources" page, illustrated in FIG. 5G, where the user selects one or more resources from a list 551 of available resources. The user clicks the selection buttons 553 to add or remove items from the Event Resources list 552. By clicking Next button 554, the user proceeds to the next page.

Figure 5H:
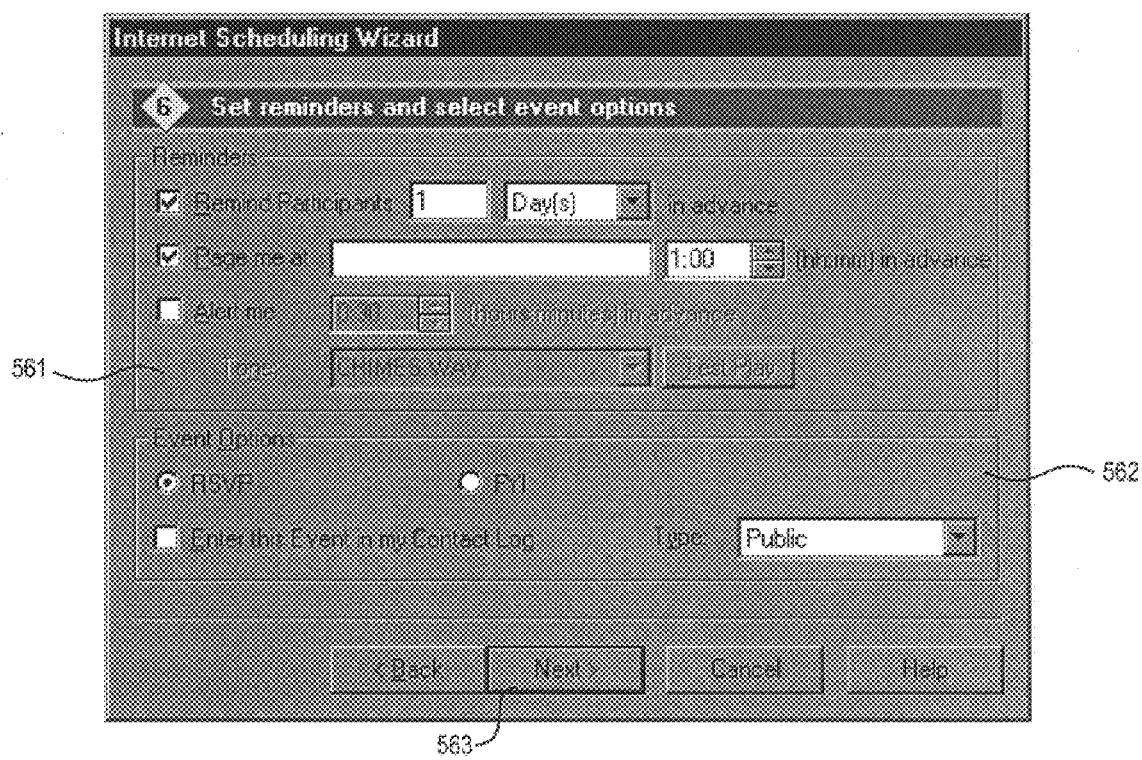
Figure 5L:
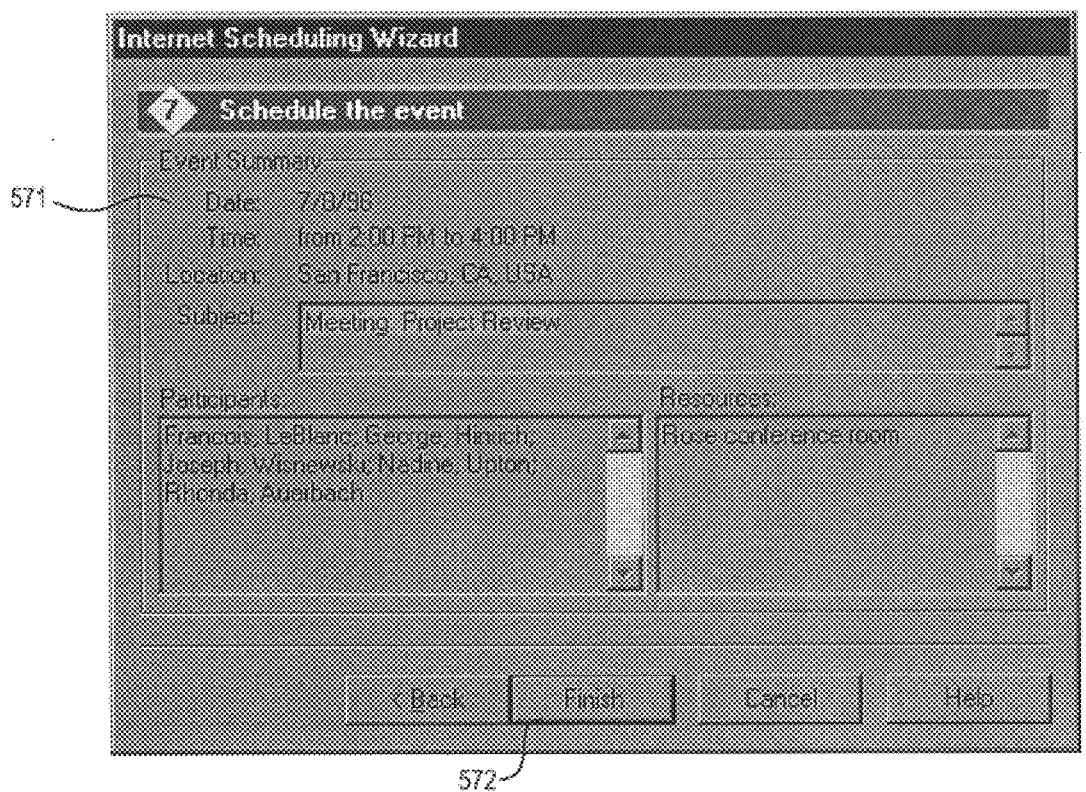

The next page is the "Event options" page, illustrated in FIG. 5H. At 561, the user can select a check box to send a reminder as well as set an amount of advance notice. By checking "Page Me" or "Alert Me" and setting a time, the user can instruct the system to remind the user by page or alarm. The user selects the RSVP radio button, in Event Options box 562, to request a reply, or selects the FYI radio button to send an announcement only. By selecting RSVP (i.e., "please respond"), recipients can send back a reply whereupon the system automatically collects the information for the user. If the user chooses FYI (i.e., "For Your Information"), on the other hand, he or she is sending an announcement of the event, without requesting replies. This option is used, for example, for events such as a company meeting that will occur regardless of individual schedules. Additionally, in Event Options box 562, the user can instruct the system to enter this Event in the user's Contact Log. Upon checking the box, the event is entered in the Contact Log for each participant in the invitation list. Finally, the user can specify a type for the event: Public, Personal, or Confidential.

Upon selecting Next button 563, the user instructs the system to proceed to the "Schedule the Event" page, illustrated in FIG. 5I. Here, the user can review the selections, at 571, and go back to any previous page, if needed. Once satisfied with the selections, the user selects "Finish" button 572 to schedule the event. Alternatively, the user can cancel the input altogether by selecting "Cancel."

The user can also include people who do not have e-mail in the list of event invitees. Here, two options exist for addressing invitations: fax or telephone. If an invitation is directed to someone at their fax address, the system launches the fax software (e.g., Microsoft Fax) and faxes the invitation automatically. If the user selects someone's telephone number as their address, a reminder is added to the user's Calls list in the calendar to call that person. When the user hears from these people, he or she can enter their meeting reply by entering the appropriate status: Accept, Decline, Reschedule Request, or Delegate.

3. Incoming Event Invitations

Figure 6A:
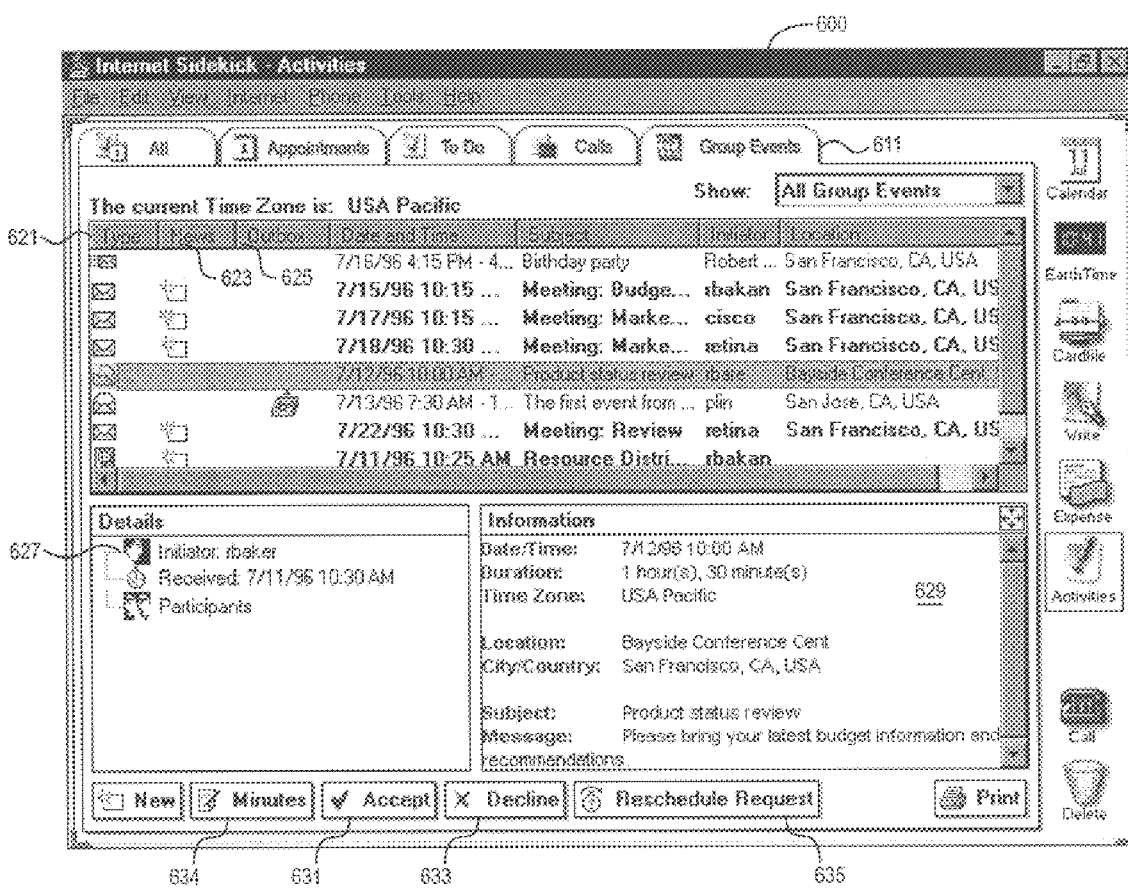
FIGS. 6A–C are bitmap screenshots illustrating a preferred interface provided by the system for processing incoming event invitations.

When the user receives an invitation to an event, it appears in bold type in the Activities view 600, which is illustrated in FIG. 6A. An icon appears in the News column 623 to indicate a new event. The user will see the incoming event invitation in his or her e-mail in-box, marked with the signature (e.g., <ISK> for Internet Sidekick) in the subject. In typical operation, the user disregards this message in his or her e-mail in-box, as the system will automatically find and handle it for the user. Users who have other systems, on the other hand, can open the message like any other e-mail; it contains instructions on how to reply so the original sender's system (i.e., SK client) will be able to record the reply.

To get to the Activities view, the user click the Activities icon (or selects the corresponding menu command). After the user has clicked Group Events tab 611, status information is displayed for group events in the three left-hand columns. Type column 621 displays an icon for the event type: (b 1) New event the user initiated; (2) New incoming event, and (3) Incoming event the user has opened. News column 623 displays an icon for all new items: (1) New event information; (2) Reply has arrived; and (3) Event has been canceled. Out-box column 625 indicates messages that are queued to be sent during the user's next e-mail flash session; it displays an icon indicating Messaging waiting to be sent. The user can select an Internet |Send/Receive Now command to send pending messages immediately. By clicking on a Detail item 627, the user can display further information in Details and Information pane 629.

To reply to an event invitation, the user reviews the event specifics in the Details and Information panes. Then, the user clicks a choice to reply from the buttons at the bottom of the window (e.g., "Accept," "Decline," "Reschedule," or the like). Alternatively, the user can right-click an event in the top pane, and choose from a Shortcut menu. In a preferred embodiment, the user's reply is sent only to the originator, not to others invited to the event.

Figure 6B:
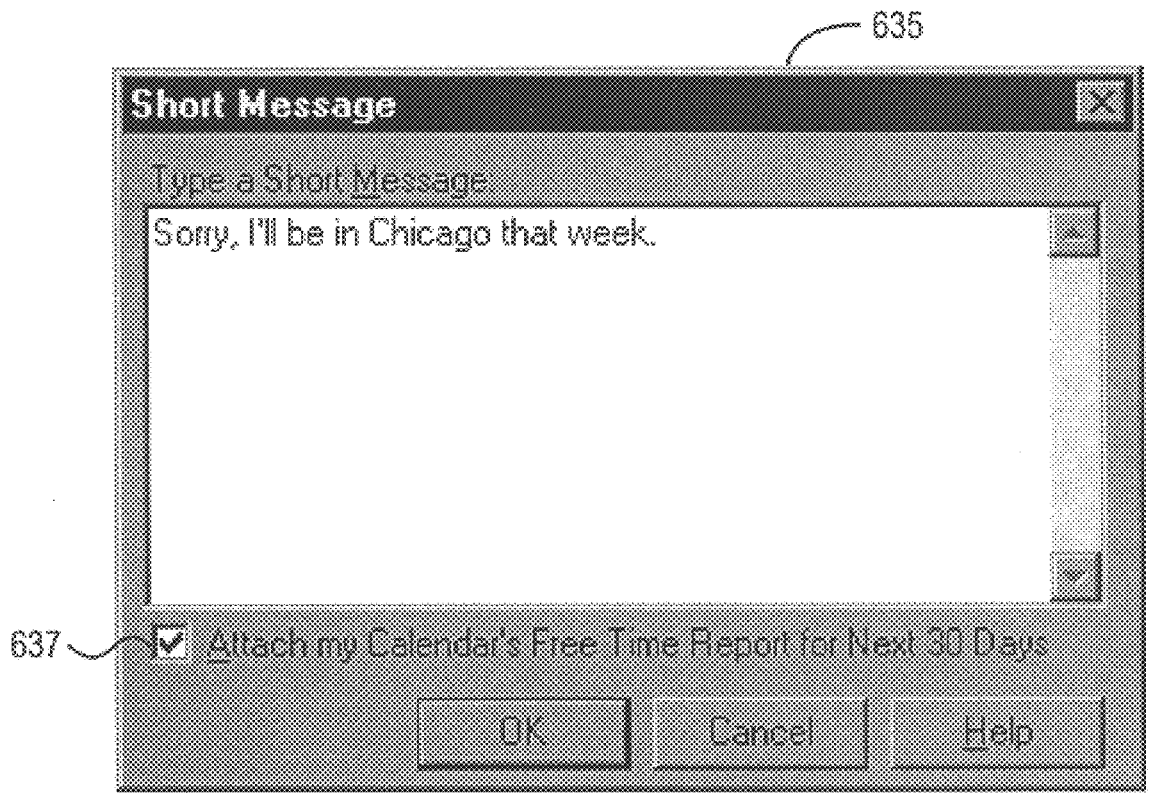

Accept button 631 lets the user enter a short reply message (via Reply dialog 635 in FIG. 6B), and then sends the acceptance to the initiator confirming that the user will attend. The event is automatically added to the user's calendar. Decline button 633, on the other hand, sends a reply message to the initiator that the user will not be able to attend. The event is not added to the user's calendar. With the user's reply, the user can include a Free Time report showing the user's booked and unbooked time for the next 30 days (or other user-specified interval), for assisting the meeting originator in rescheduling. Included in the Free Time report is an indication of all the times for the next 30 days when the user has a scheduled event, and all other (free) times. In a preferred embodiment, no information about specific events on the user's calendar is sent, beyond the indication that the time is booked. The user checks box 637 to include the report.

Figure 6C:
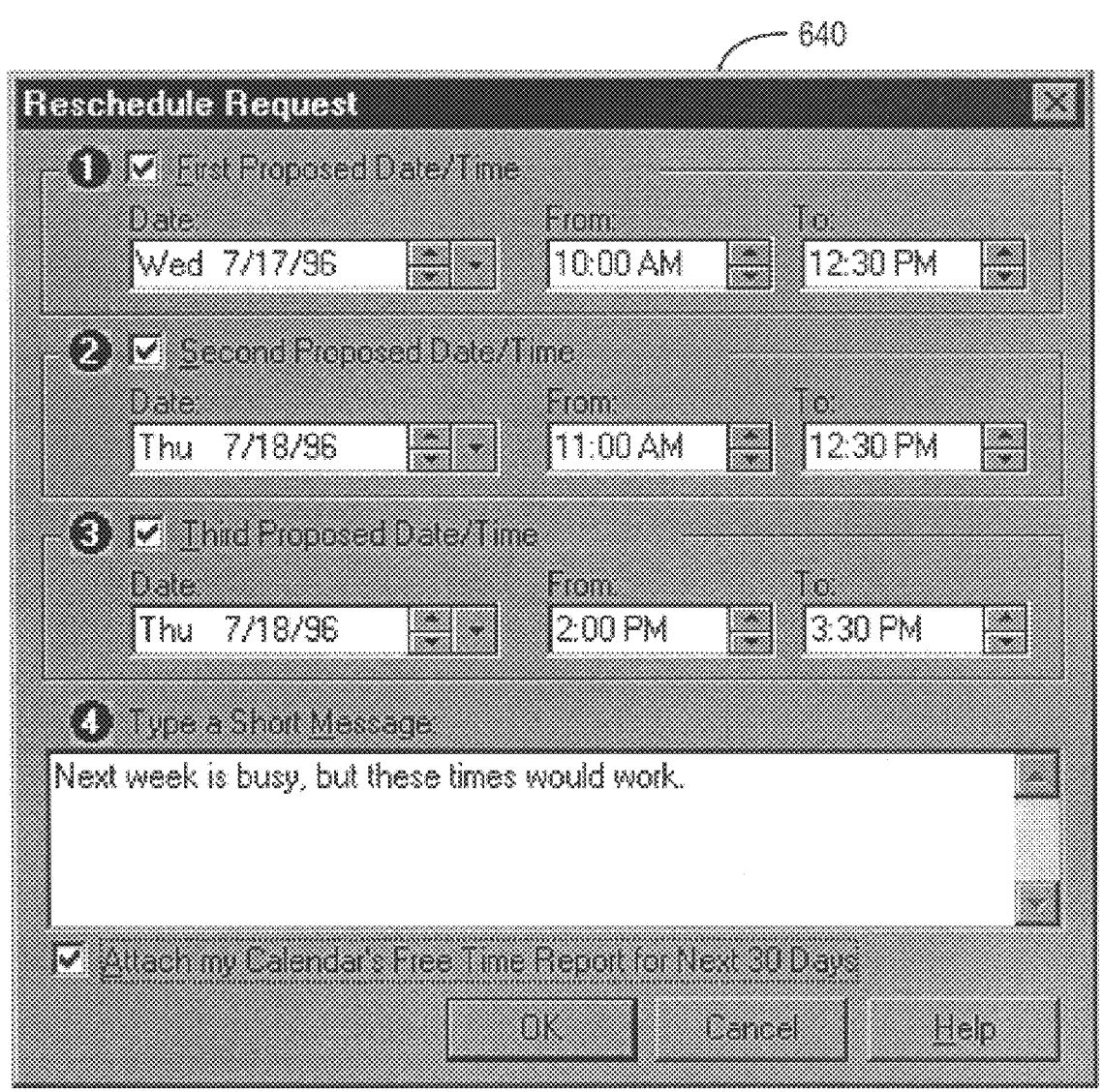

In addition to accepting or declining, the recipient user can request rescheduling of the event. Here, the user selects Reschedule Request button, such as button 635 in FIG. 6A. In response, the system displays Reschedule Request dialog 640, as shown in FIG. 6C. This option sends a reply requesting that the event be moved to another time or date. In the dialog, the user can enter one or more alternate times for the event, as well as include a short message. As with the decline response, the user has the option of including a Free Time report to assist the meeting originator in rescheduling. The Minutes button 634 is used to send notes or minutes to all participants. This launches a "Compose the Minutes" window where the user can write a message or attach a file (by clicking a Browse button); the minutes are automatically distributed to the participants.

Besides accepting and declining, the user can "delegate" the event by choosing the option from the menu. The option opens a Delegate To dialog box (not shown), where the user can specify a person to forward the invitation to. Here, the meeting originator is notified that the user has delegated the event to someone else.

4. Replying to Incoming Event Invitations for Non-SK Clients

Users who are non-SK client users (i.e., do not have Internet Sidekick installed) can still reply to incoming invitations in a way that is automatically recorded by the event originator's. All event invitations, whether the recipient is a non-SK client user or an SK client user, appear in the user's e-mail in-box. Users who are SK client users can ignore the messages, since the system will read and process these automatically.

Non-SK client users can open the invitation like any other e-mail item and read the contents, which are stored in formatted text. The body of the message includes instructions that explain briefly how a non-SK client user can reply. To reply to an invitation using conventional e-mail software, the non-SK client user proceeds as follows. The user opens the invitation in his or her e-mail in-box, like any other message. Using the user's own e-mail software (from any vendor), the user "replies" to the message, and includes the body of the original message in the reply (i.e., does not modify the contents). The subject field of the reply will already include <ISK> indicating that the reply is an Internet Sidekick scheduling message. In the body of the message, the user finds a section labeled "Your Reply." Here, the user simply types an "X" in the brackets next to Accept or Decline, so that the reply reads "[X] Accept" or "[X] Decline"; the replying user can also type a brief message in the space between the markers reading <BEGIN REPLY MESSAGE> and <END REPLY MESSAGE>. Now the user simply sends the reply. The originator's SK client will be able to process the reply automatically and mark the appropriate status for that recipient.

5. Incoming Replies

Figure 7A:
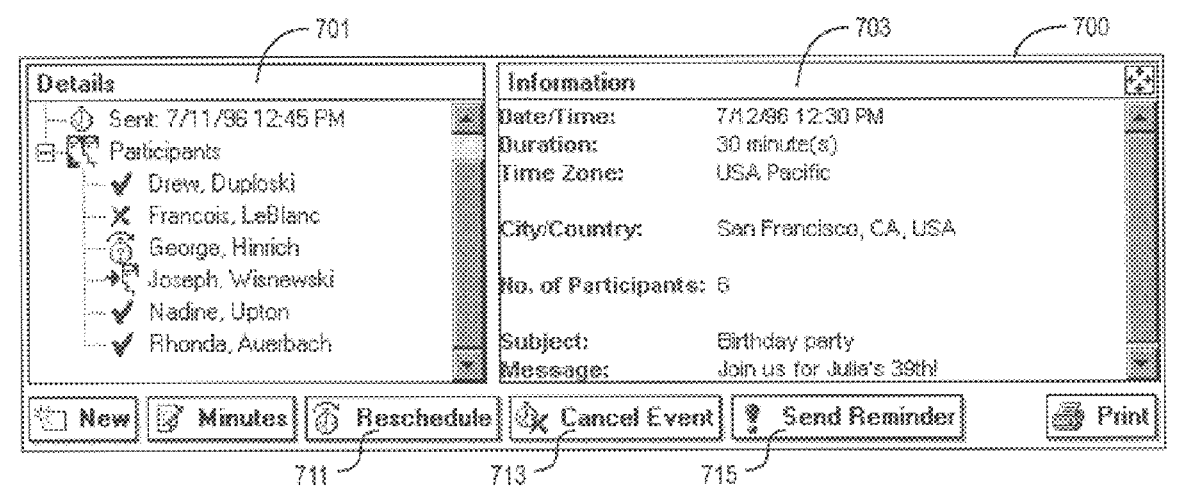
Figure 7B:
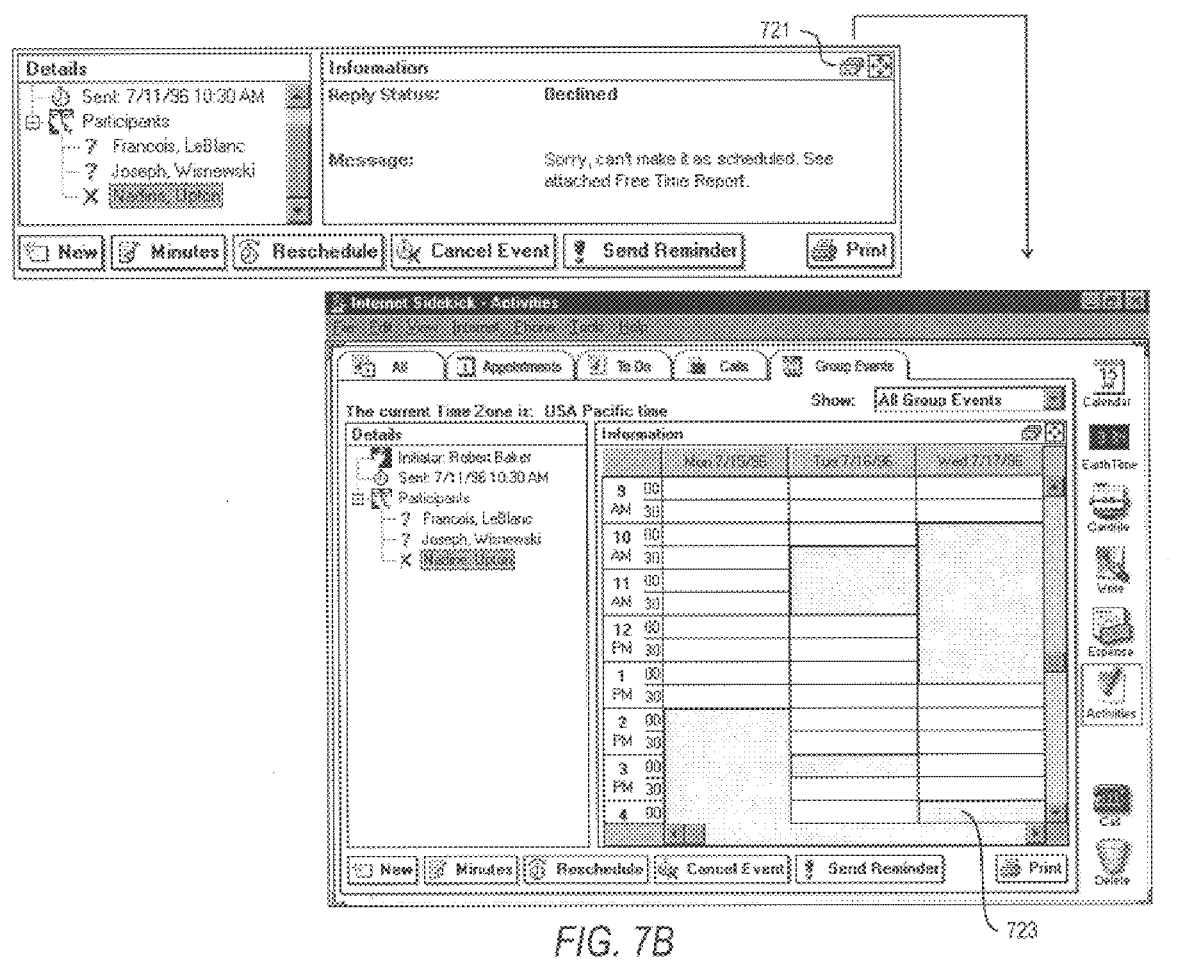
Figure 7C:
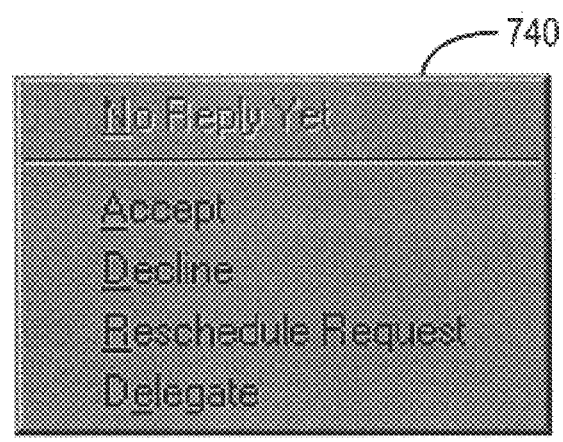

The originator's SK client automatically collects reply messages from people which were invited to an event and displays the replies in the Activities view. As replies arrive, the user is notified by an icon in the News column (623 in FIG. 6A). The user can click the participants' names in the Activities view, and read their reply status, as well as any reply message they may have sent, in the Details and Information dialog 700, shown in FIG. 7A. By clicking the + sign by the participants in Details pane 701, the user can expand the list. By clicking a participant, the user can view the reply message in Information pane 703 and expand the Details and Information panes to full-screen, as desired.

The originator user can reschedule an event which he or she originated by selecting the event and clicking Reschedule button 711. This action displays a "Schedule an Event" dialog box where the user enters the new date and time information, and any other changes. The user is asked if he or she wants to notify all participants and resource managers about the change. If the user selects "Yes," notification is automatically sent.

In a similar manner, the user can cancel an event he or she originated by selecting the event and clicking Cancel Event button 713. The user will be asked to confirm that he or she wants to cancel the event and notify all participants; selecting "Yes" cancels the event. Alternatively, the user can delete group scheduling events in the Activities view to clean up his or her events list. This is done by selecting one or more events and pressing the Del key, or by right-clicking an event and choosing Delete from the menu. In contrast to canceling, the action of deleting group events in the Activities view does not remove them from the user's calendar, and does not notify meeting participants. It is used only to clean up the Activities list display. To delete a group event the user has originated and notify participants, the user clicks the Cancel Event button 713 or deletes the event in his or Calendar.

Also in the Details and Information dialog 700, the user can elect to send a reminder to all event participants in advance of a meeting. This is done by selecting the event and clicking Send Reminder button 715. Alternatively, the user can arrange for the reminder when the user initially creates the event.

If the recipient attaches a Free Time report (e.g., when declining or requesting rescheduling of the invitation), his or her Free Time report appears with the reply message, as indicated by Free Time button 721 in FIG. 7B. The Free Time report shows when the recipient has events booked and what times are free, during the next 30 days, as described above. It can be viewed by clicking on the Free Time button 721, whereupon the system displays Free Time report 723, for the reply. The report is useful in determining an alternate meeting time, especially when scheduling several people.

6. Entering Replies Manually

For people who are invited by fax or phone, the user can enter the reply status manually. To enter reply information manually, the user selects the event from the list (in the Activities view). Next, the user selects the participant's name to bring up that individuals details in the Details pane. Now, the user can enter the status by right-clicking on the participant's name, to bring up pop-up menu 740, shown in FIG. 7C. Here, the user can enter: "Accepted," "Declined," "Reschedule Requested," "Delegated," or "No Reply Yet."

C. Resource Scheduling Interface

1. General

Resources are facilities such as conference rooms or equipment that the user wants to be able to schedule. The system of the present invention groups resources in one of the following resource types:

1. Facilities—a resource such as a conference room or other immovable location. Facilities can have a Maximum Occupancy setting. The system maintains a calendar for facilities and confirms or denies bookings automatically based on the calendar.
2. Equipment—a movable resource such as a projector or vehicle. The system maintains a calendar for equipment and confirms or denies bookings automatically based on the calendar.
3. Other—private resource which an individual user wants to keep track of, such as booking a conference call operator, or ordering catering for a meeting. There is no calendar for this category, and entries are recorded under the user's To Do items.

Since resources typically do not have their own e-mail accounts, each resource has a "manager," whose e-mail is used to handle the calendar and messaging for reserving the resource. Typically, the manager is the person who creates the resource in the system of the present invention. Using the e-mail account of the manager, the system handles resource scheduling automatically in the background; the manager is not involved in these transactions. Alternatively, a resource can be given a dedicated e-mail account, whereupon the system uses it for automated scheduling of that resource. Once a resource has been added to the e-mail system (either to its own e-mail account or that of another's), it is distributed to others to make it available to them for booking.

2. Reserving a Resource

The user can request a resource reservation as part of creating a group event. However, the user may want to do it separately, in advance, so he or she can be sure the resource is available before sending meeting invitations. To reserve a resource without scheduling the event, the user employs a Reservation Wizard of the present invention, which will now be illustrated.

Figure 8A:
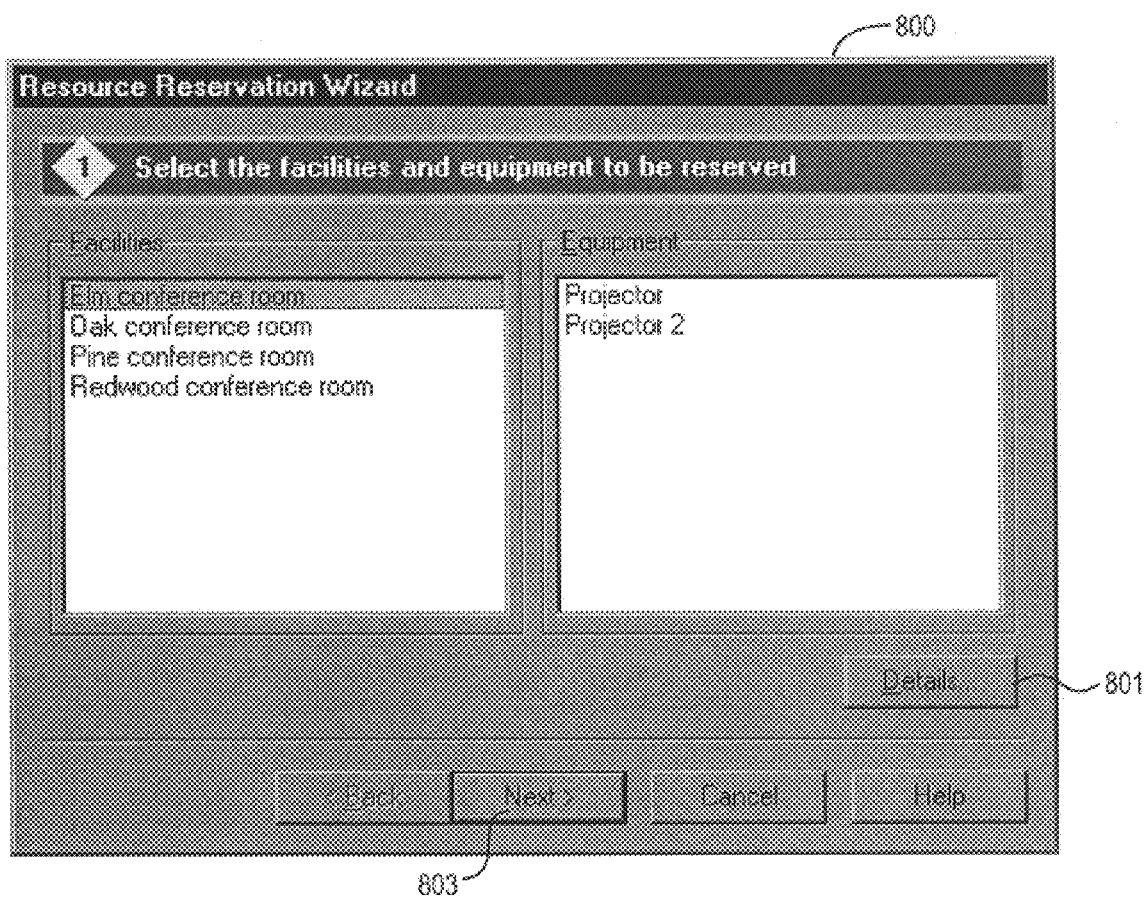

To reserve a resource such as a conference room or projector using the wizard, the user selects Internet|Reservation Wizard from the system menu. This displays the first Resource Reservation Wizard dialog 800, Step 1 (Facilities and Equipment), as shown in FIG. 8A. The dialog lists resources which have already been distributed to the user (and others), or have been created by the user. Here, the user chooses the facilities and equipment he or she wants to reserve by selecting each item. The user can reserve multiple resources by clicking each one. By clicking Details button 801, the user can see detailed information about a selected resource. When finished selecting resource, the user clicks "Next" button 803, to proceed to the next wizard dialog.

Figure 8B:
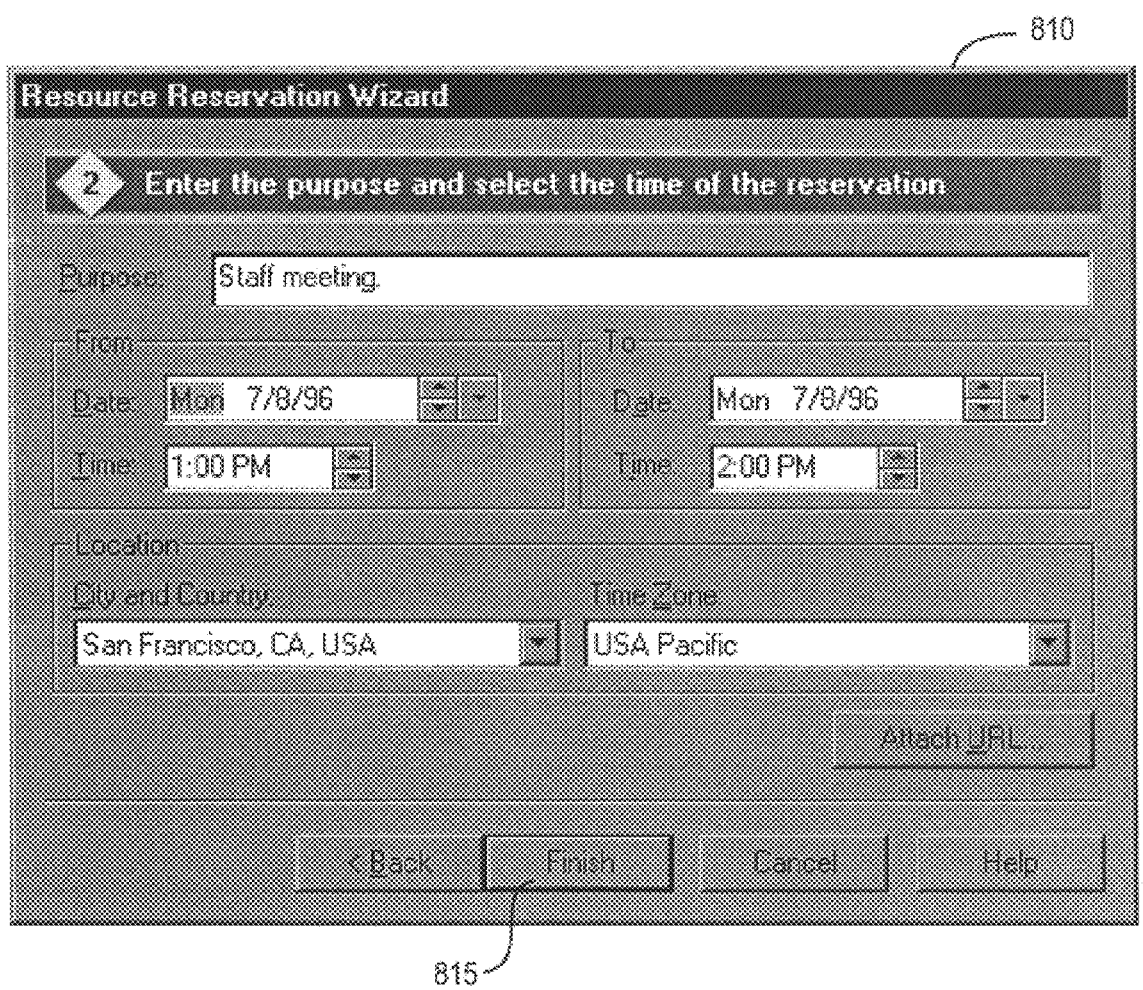

The second Resource Reservation Wizard dialog 810, Step 2, is illustrated in FIG. 8B. In Step 2 (Purpose and Time), the user enters the time and purpose for reserving the resource. When finished with Step 2, the user clicks Finish button 815. Based on the user's inputs, the Reservation Wizard sends out a request to book the resource for the time specified. The request is sent to the computer of the resource's manager (via e-mail account) for processing by the SK client. A reply message is sent back to the requestor's computer automatically, without requiring any action by the resource's manager. If the resource is available, the reply message confirms the reservation. If the resource is unavailable, a message listing available times is sent instead. In this case, the user can reschedule by again choosing Internet|Resources|Reservation Wizard and changing the times as needed before re-sending the request.

3. Adding and Distributing Resources

Figure 8C:
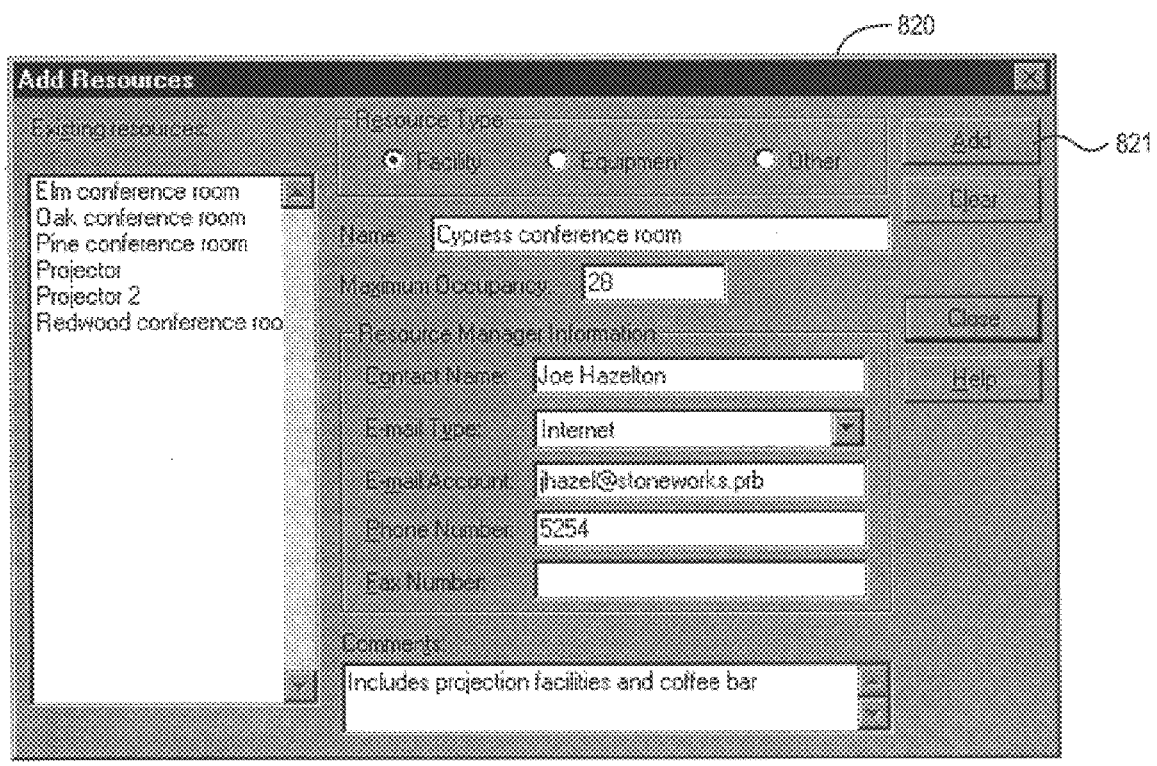

The person who is going to manage the resource is usually the one who adds it using an Add command. This is selected from the system menu by choosing Internet|Resources|Add. In response, the system displays Add Resources dialog 820, illustrated in FIG. 8C. Here, the user enters the name of the resource together with the e-mail type and account information; the latter two are automatically picked up from existing user preferences. The phone number field and other fields are included for convenience in case others have questions about resource reservations. The process is completed by selecting Add button 821.

Figure 8D:
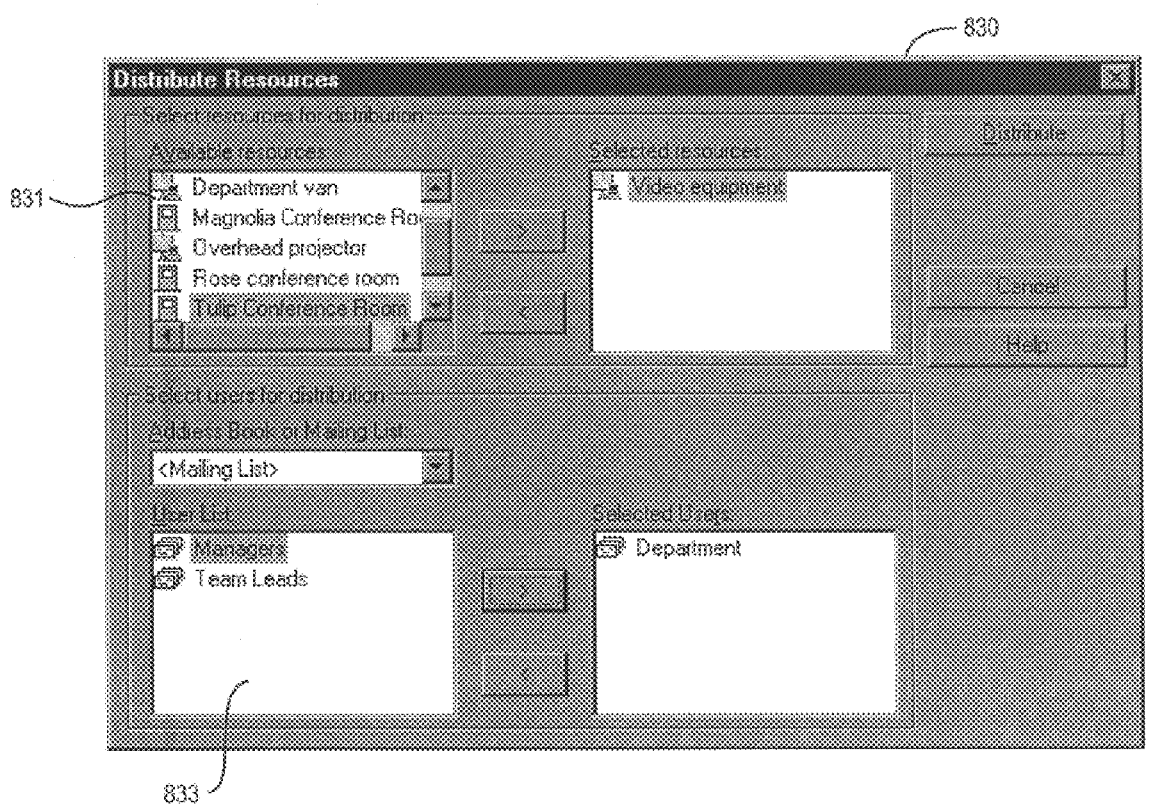

After a resource has been added, it can be distributed. "Distributing" a resource is the process of making it available to others for reserving. The manager distributes it to the users who will be reserving it. Anyone to whom the resource is distributed can distribute it to additional users. To distribute a resource to other users, the user selects a Distribute command from the menu. In response, the system displays Distribute Resources dialog 830, illustrated in FIG. 8D. At 831, the user clicks one or more resources that he or she manages and wants to distribute. At 833, the user selects users to distribute resources to.

4. Managing Resources

Figure 8E:
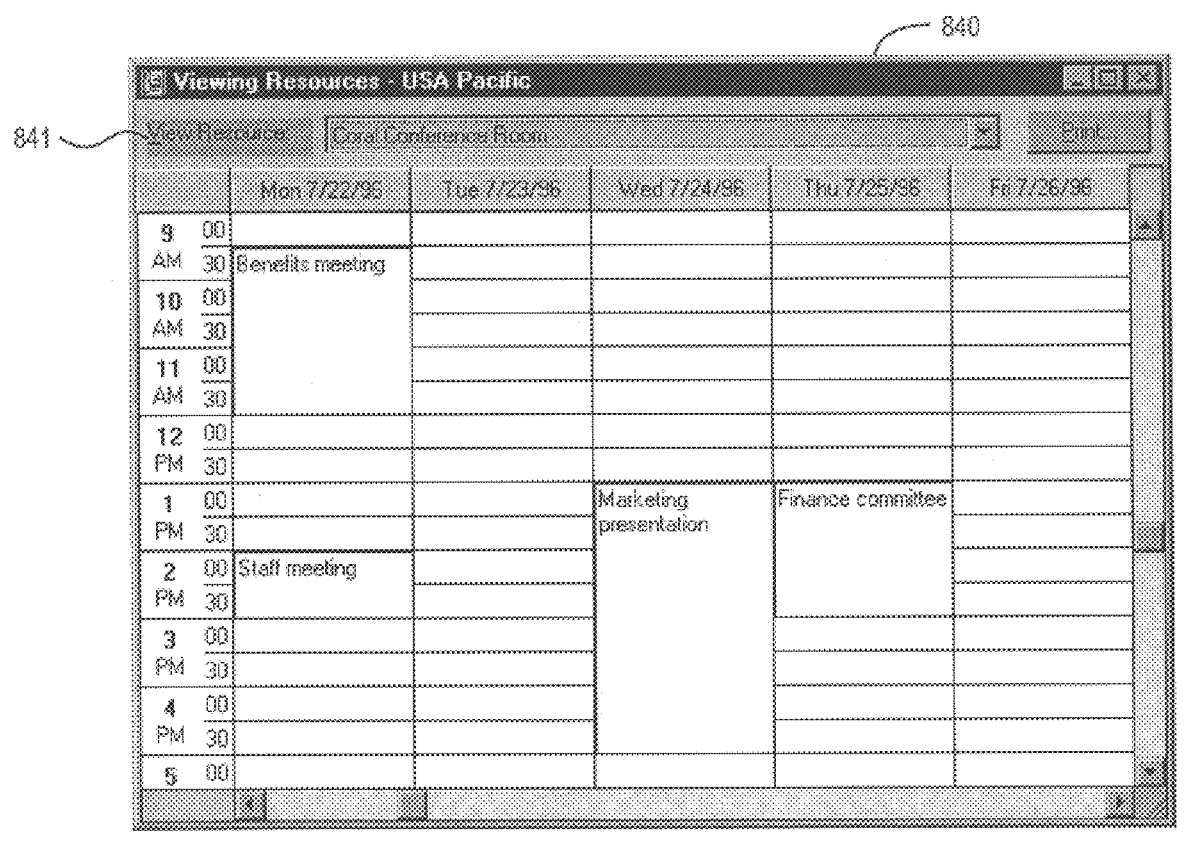

The system of the present invention provides tools that let the user print resource schedules and modify or delete resources from his or her system. The user can view and print the schedule of any resource that he or she manages. To view a resource's schedule, the user chooses Internet|Resources|View. In response, the system displays Viewing Resources dialog 840, illustrated in FIG. 8E. From pulldown list 841, the user can select a particular resource to view and then click to print the schedule for the resource in weekly or monthly view.

To modify a resource (i.e., change the properties of a resource), the user chooses Internet|Resources|Modify from the menu. This opens a Modify Resource dialog box, which is similar to the Add Resource dialog box except that the user cannot modify the resource name. To remove a resource, the user chooses Internet|Resources|Remove, selects a resource from a displayed list, and clicks "Remove."

If the user modifies or removes a resource that he or she does not manage, the user is affecting the local resource file only. The user might want to delete a resource that he or she never uses, or might want to change a resource's description or owner information as displayed on his or her system. Since these changes affect the user's local system only, they do not affect others who also reserve that resource. If the user is the owner of the resource, deleting it has wider impact. By deleting that resource, the user removes the resource's calendar, making it impossible for anyone to schedule that resource. If the user simply wants to stop managing the resource, he or she should "transfer" the resource.

Figure 8F:
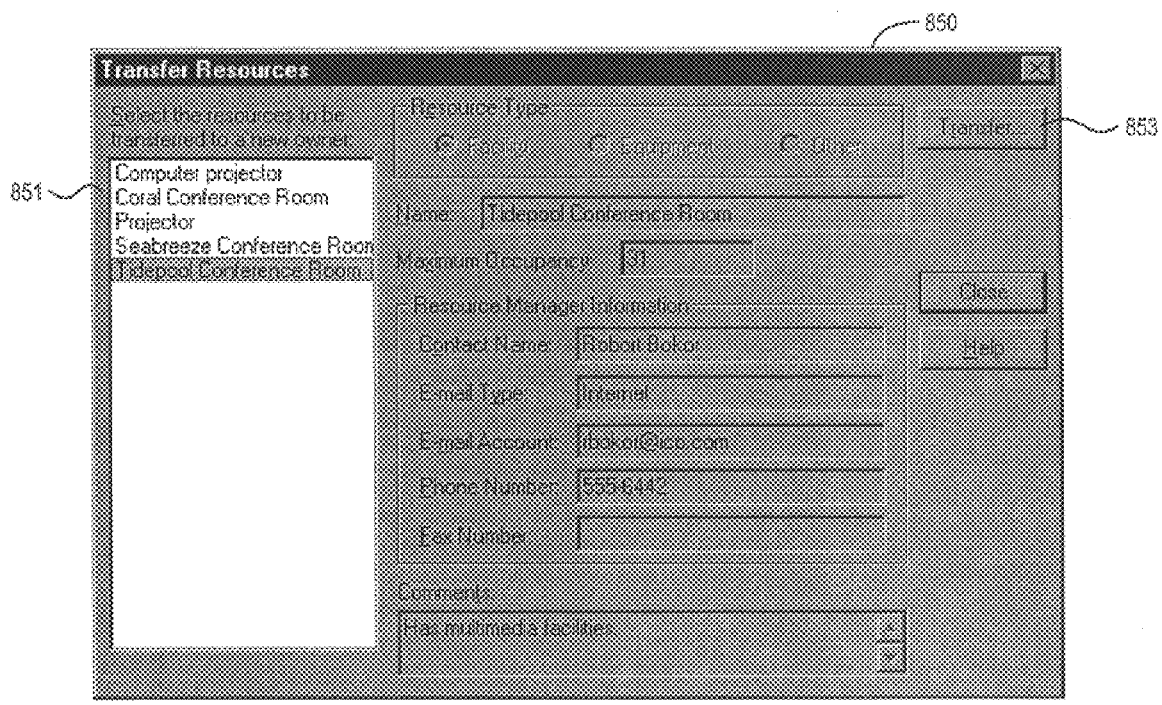
Figure 8G:
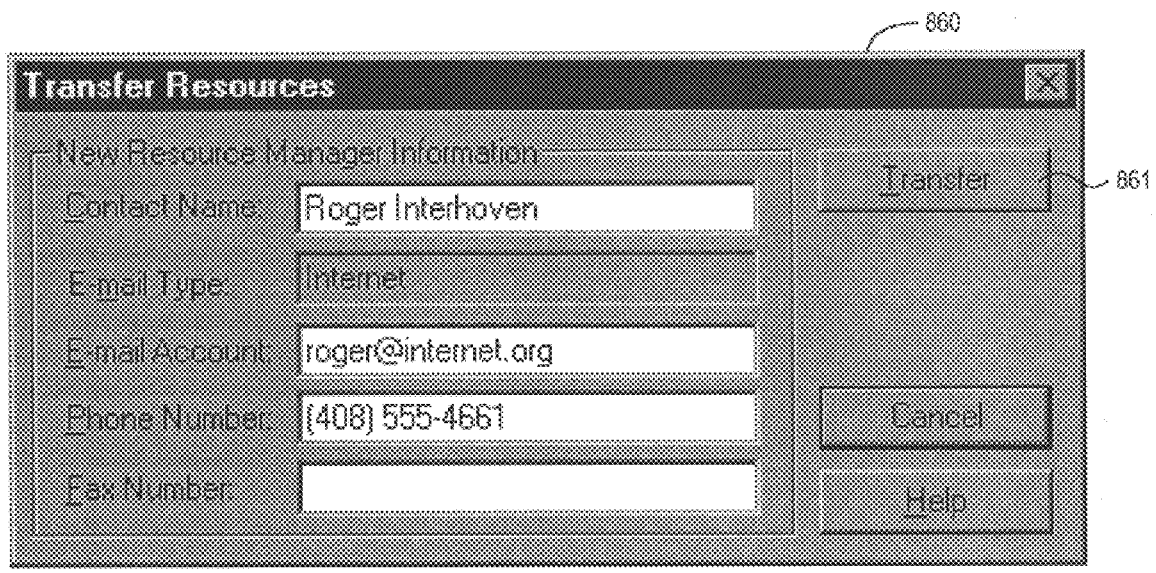

Transferring a resource is the act of assigning a resource the user owns to another manager. This is done by choosing Internet|Resources|Transfer from the menu. In response, the system displays a Transfer Resources dialog 850, illustrated in FIG. 8F. Here, the user selects the resource from resource list 851 and then clicks Transfer button 853. The system now displays a second Transfer Resources dialog 860, shown in FIG. 8G, for entering information about the new resource manager. Transfer is completed by clicking Transfer button 861.

Internal Operation

A. Overview of Architecture and Basic Operation

Figure 9:
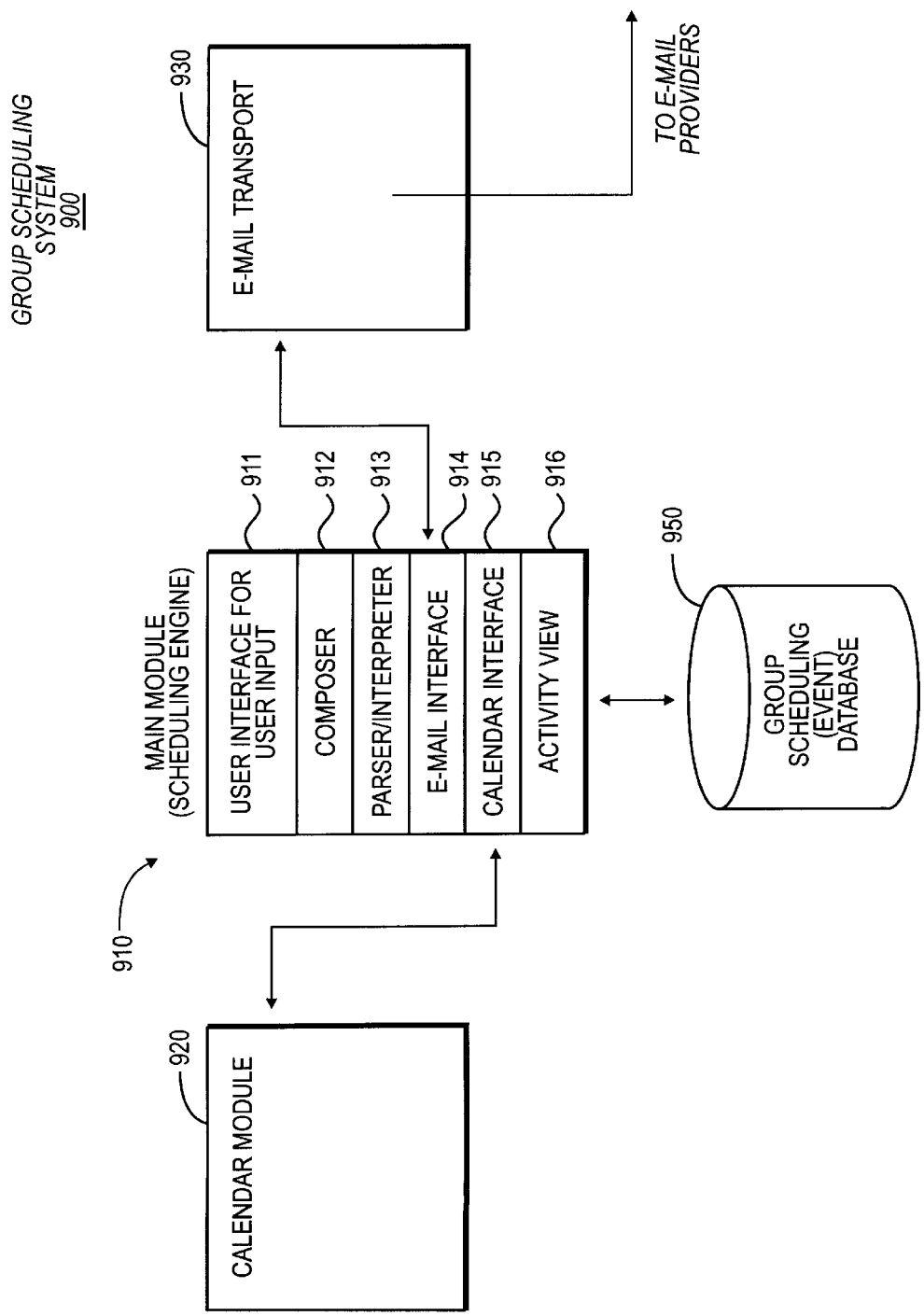
FIG. 9 is a block diagram providing an overview of the internal architecture of a group scheduling system of the present invention.

FIG. 9 is a block diagram providing an overview of the internal architecture of a group scheduling system 900 constructed in accordance with the present invention. The group scheduling system 900 includes a main module 910 comprising a user interface 911, a composer 912, a parser/interpreter 913, an e-mail send/receive interface 914, a calender interface 915, and an Activities view module 916. The user interface module 911 supports entering, editing, and deleting of group scheduling information. The composer 912 is employed for actually composing a group scheduling message. The message itself, when it is received by another SK client, is parsed and interpreted by the parser/interpreter 913. The e-mail module 914 supports the sending and receiving of e-mail messages and documents, using commercial available e-mail providers. The calendar interface 915 allows the main module or engine 910 to communicate with a separate calendar module 920. The Activities view module 916 supports the previously-demonstrated user sessions in Activities View mode of operation.

Figure 10:
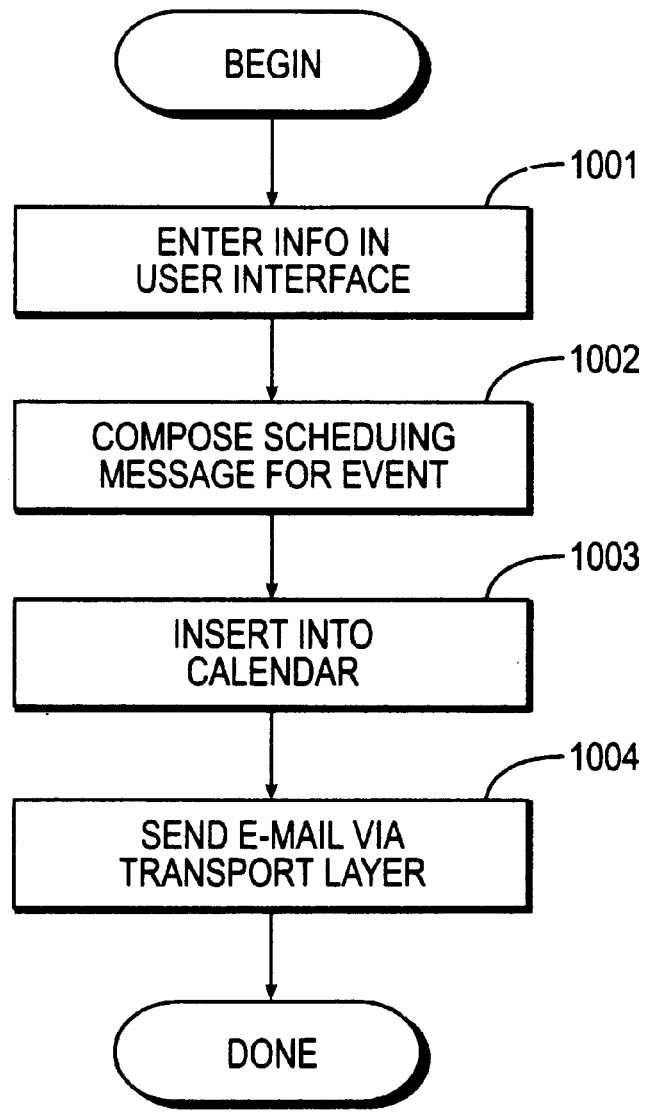
FIG. 10 is a block diagram illustrating the general process of sending an event.

General operation of the system can be divided into two tasks: sending an event and receiving an event message. The general process of sending an event is illustrated by Send Event Method 1000, shown in FIG. 10. The process begins with the user entering event information in the user interface, as indicated by step 1001. The composer module, acting on the user information, proceeds to compose the event scheduling message, at step 1002. At the point of composing a message, the system provides a variety of different message types, each corresponding to a particular state a meeting is at. Once a message has been composed, it can be inserted into the calendar, as shown by step 1003. Thereafter, the system schedules the message to be sent via the e-mail transport layer, as indicated by "e-mail delivery" step 1004. Once the message has been sent, the Send Event Method 1000 is done.

Figure 11:
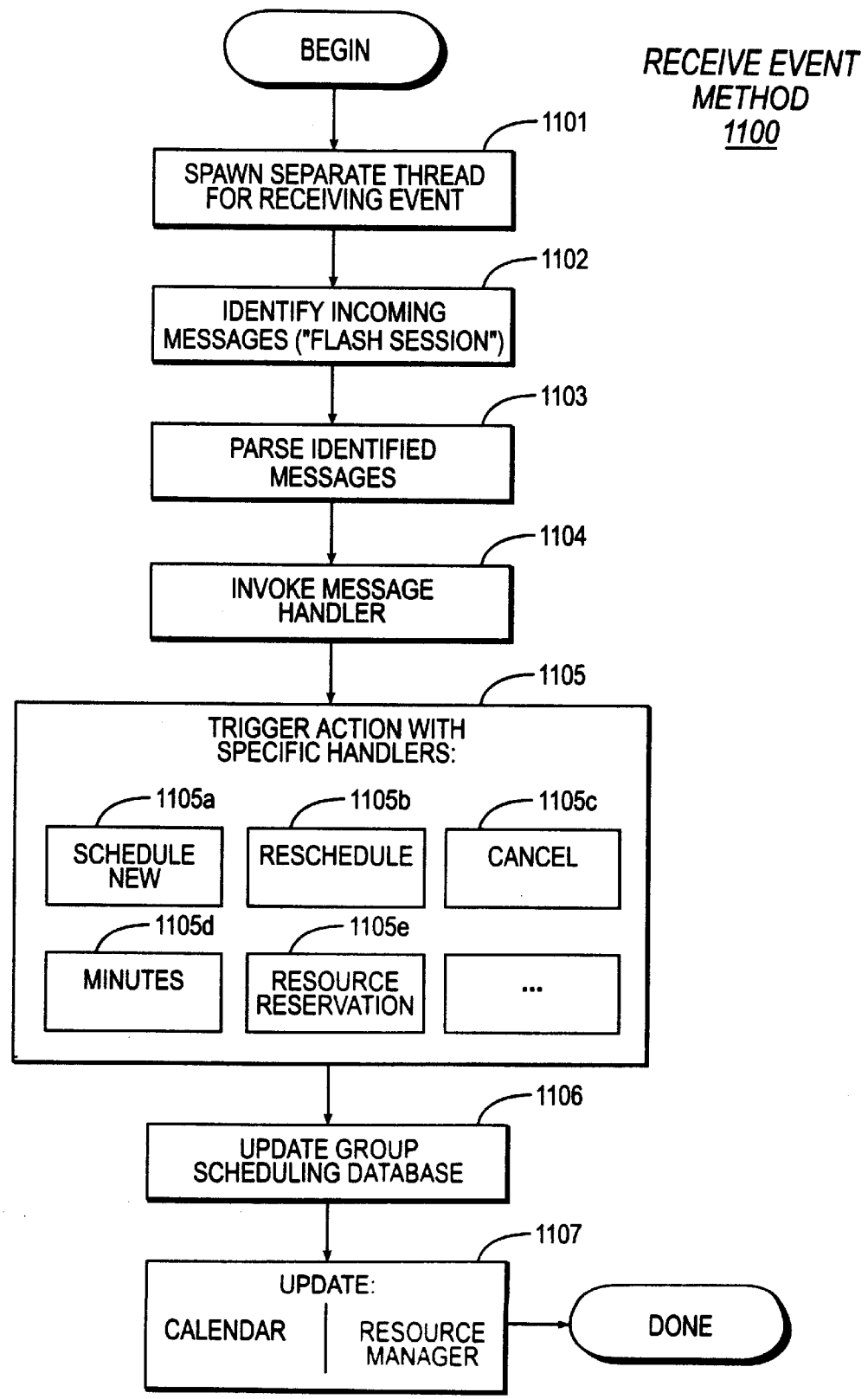
FIG. 11 is a block diagram illustrating the general process of receiving messages.

The general process of receiving messages is illustrated by Receive Event Method 1100, illustrated in FIG. 11. At the outset, the process spawns a separate thread to receive an event message, at step 1101. As shown by step 1102, at a predetermined interval a "flash" session is initiated. During the flash session, the system polls the user's in-box, for identifying incoming scheduling messages (i.e., those having the signature <ISK>).

The incoming scheduling messages are parsed by the parser (913), as shown at step 1103. The parser extracts scheduling information from the messages, storing it in an internal representation suitable for use by other modules of the system. The parser identifies, for instance, the <ISK> identifier, date and time information, message-type information (e.g., Schedule, Reschedule, Cancel, and so forth), and the like. The parsed information is, in turn, passed to a general message handler at step 1104. In response, the message handler triggers one of several actions, as indicated by step 1105, by invoking more-specific handlers—ones which perform the requested action. Actions include, for example, Schedule New 1105*a*, Reschedule 1105 B, Cancel 1105*c*, Minutes of Meeting 1105*d*, Resource Reservation 1105*e*, and the like. At step 1106, the parsed information is stored in the group scheduling database (950). From here, the information will also be employed, at step 1107, to update the calendar and/or a resource manager, as needed. Once updating is complete, the method is done.

B. Core Data Structures

1. Group Item and Group Attachment

Before describing the internal methods of operation in further detail, it is first helpful to examine internal data structures which support operation of those methods. A group scheduling item is represented internally in the system by a "Group Item" data structure, GROUP_ITEM. In an exemplary embodiment, this structure may be constructed as follows (using the C/C++ programming language, for instance).

```
typedef struct
{
    DWORD      dwEventID1;
    DWORD      dwEventID2;
    DWORD      dwFromDateTime;
    DWORD      dwToDateTime;
    DWORD      dwOldFromDateTime;
    DWORD      dwOldToDateTime;
    DWORD      dwSendReceive;
    HANDLE     hText;
    HGLOBAL    hRecipient;
    DWORD      lfData;
    LPGROUP_ATTACHMENT lpAttach;
    //   READ_IN_MAIN; READ_IN_ATTACH; FTMPFILE;
    DWORD      wFlags;
    DWORD      wFlags2;
    short      nTexts;
    short      nRecipients;
    short      nPageHour;
    short      nPageMin;
    BYTE       bTypes;
    BYTE       bTimeZone;
    BYTE       bLead;
    BYTE       bLeadUnit;
} GROUP_ITEM;    //   total 64 bytes
typedef GROUP_ITEM * LPGROUP_ITEM;
```

As shown, the GROUP_ITEM data structure includes two event IDs: dwEventID1 and dwEventID2. Together, these comprise a 64-bit (i.e., two double words) identifier for each scheduling group item. This ID is employed among the various clients for uniquely identifying a particular group scheduling item. Next, the data structure stores "from" and "to" date and time information in dwFromDateTime and dwToDateTime data members, respectively. Additionally, the particular item might comprise a "reschedule" item and, therefore, need to store the original ("old") date and time. This information is stored in dwOldFromDateTime and dwOldToDateTime data members. The dwSendRecieve data member also stores date and time information; it is employed as a time stamp indicating when a group item is sent or received.

Following the date/time data members are two handles: hText and hRecipient. The hText data member is a handle to a text buffer for the subject line (e.g., 256-character string). The hRecipient data member, on the other hand, is a handle pointing to a recipient block—a memory block storing N number of recipients. The lfData member serves as a pointer to the detailed data—that is, the data which follows the subject line.

This is followed by another pointer, lpAttach, which points to a group attachment data structure. The group attachment information is, therefore, nested within (via a pointer) each GROUP_ITEM record. In an exemplary embodiment, a "Group Attachment" data structure, GROUP_ATTACHMENT, may be constructed as follows.

```
#define   ARRAY_LEN      63
typedef struct
{
    WORD       wFlags;     // IS_MEETINGNOTE_FILE
                           // if on then meeting note saved in file
                           // REMINDER_SENT
    short      nAttachSize;
    DWORD      wReserved;
    LPSTR      lpAttachFile;
    HGLOBAL    hRegarding;
    UINT       nRegardings;
    LPSTR      lpMeetingNote;
    UINT       nMeetingNotes;
    char       szLocation[ARRAY_LEN+1];
    char       szCity[ARRAY_LEN+1];
} GROUP_ATTACHMENT;        // 156 bytes;
typedef GROUP_ATTACHMENT   * LPGROUP_ATTACHMENT;
```

As shown, the data structure includes as its first member nAttachSize, an integer storing a size for the attached file. This is followed by wReserve which comprises a double word (DWORD) currently not used. The lpAttachFile data member stores a pointer to a text string comprising the name of the attach file (which itself is stored on disk).

The next data member, hRegarding, is a handle pointing to a "regarding" structure which comprises the message body—that is, what the event is in "regards" to. This is followed by an integer data member, nRegardings, which stores a size for the regarding block which is being pointed to by the hRegarding handle. The lpMeetingNote data member is a pointer to a text block comprising a user-supplied meeting note text string. The size of this pointed-to data structure is stored by nMeetingNotes. Finally, the location (e.g., particular conference room) and city where the meeting or event is to occur are stored by szLocation and szCity character strings, respectively.

Returning to description of GROUP_ITEM data member, the next data member in the GROUP_ITEM data structure is a double word, wFlags, storing a set of flags. The flags indicate various information for the group item and group appointment (described below), including, for example, whether the event is Canceled, Rescheduled, or Deleted. In an exemplary embodiment, the following flags are defined.

```
//   flags for GROUP_APPOINTMENT and GROUP_ITEM.wFlags
#define    READ_IN_MAIN              0x00000001  // both
#define    READ_IN_ATTACH            0x00000002  // both
//   #define   FTMPFILE               0x0004      // both
#define    HAS_MEETING_NOTE          0x00000008  // both
#define    EVENT_CANCELED            0x00000010  // both
#define    EVENT_RESCHEDULED         0x00000020  // both dwOldDateTime good
//   #define   EVENT_DELETED             0x00000040  // both
#define    SCHEDULED_EVENT           0x00000080  // scheduler side
#define    SEND_REMINDER             0x00000100  // scheduler side
#define    REMINDER_SENT             0x00000200  // scheduler side
#define    SEND_LATER                0x00000400  // scheduler side
#define    NO_REPLY_NEEDED           0x00000800  // scheduler side
#define    RECEIVED_EVENT            0x00001000  // receiver side
#define    EVENT_ACCEPTED            0x00002000  // receiver side
#define    EVENT_DECLINED            0x00004000  // receiver side
#define    UNREAD_EVENT              0x00008000  // receiver side
#define    EVENT_FORWARDED           0x00010000  // receiver side
#define    SET_ALARM                 0x00020000  // for GROUP_APPOINTMENT only
#define    STAMP_TO_CARD             0x00040000  // for GROUP_APPOINTMENT only
#define    ATTACH_MY_CALENDAR        0x00080000  // for GROUP_APPOINTMENT only
#define    RESOURCE_EVENT            0x00100000
#define    FREETIME_EVENT            0x00200000
#define    PERSONAL_EVENT            0x00800000
#define    CONFIDENTIAL_EVENT        0x01000000
#define    PAGE_ME                   0x02000000
#define    UNCONFIRMED_EVENT         0x04000000
#define    COMPLETED_EVENT           0x08000000
#define    UNBOOKED_EVENT            0x10000000
#define    EVENT_RESCHEDULE_REQUIRED 0x20000000  // receiver side
//   #define   0x40000000
#define    EVENT_RECEIVE_FORWARD     0x80000000  // the second recipient
```

The flags can be combined (i.e., bitwise "or" operation), for storing in a single double word.

The GROUP_ITEM data structure stores a second set of flags in another double word data member, wFlags2. In an exemplary embodiment, these additional flags are defined as follows.

```
// additional flags
#define   EVENT_QUEUE_ITEM            0x00000001
#define   EVENT_NEW_ITEM              0x00000002
#define   EVENT_RECEIVE_RESCHEDULE    0x00000004
#define   EVENT_RECEIVE_CANCEL        0x00000008
#define   EVENT_RECEIVE_REMINDER      0x00000010  //  receiver side
#define   UNREAD_MEETING_NOTE         0x00000020
#define   EVENT_RECEIVE_REPLY         0x00000040
```

Following the flags, the nText data member stores a byte count corresponding to the size of the block pointed to by the hText handle (described above). The nRecipients data member stores a count for the number of recipients; in an exemplary embodiment, up to 32,000 recipients are supported. The next two data members, nPageHour and nPageMin, specify a time to page the user; this corresponds to the "page me" reminder feature previously described (for the Scheduling Wizard, in FIG. 5H). In an exemplary embodiment, the page time is specified as a time interval in advance of the event or meeting, such as "three hours before" the meeting. This serves to remind the user so that he or she will not forget a meeting which he or she scheduled.

The next data member, bTypes, stores a value describing the item. In an exemplary embodiment, the following types are defined.

```
// values for bTypes in GROUP_ITEM and GROUP_APPOINTMENT
#define   SCHEDULE_ITEM                   1
#define   BROADCAST_ITEM                  2
#define   RESCHEDULE_ITEM                 3
#define   REMINDER_ITEM                   4
#define   FREE_TIME_ITEM                  5
#define   CANCEL_ITEM                     7
#define   REPLY_ITEM                      8
#define   MINUTES_ITEM                    9
#define   EVENT_ACCEPT_ITEM              10
#define   EVENT_DECLINE_ITEM             11
#define   EVENT_FORWARD_REPLY_ITEM       12
#define   EVENT_FORWARD_SCHEDULE_ITEM    13
#define   EVENT_RESCHEDULE_REQUEST_ITEM  14
#define   TRANSFER_SEND_ITEM             15
#define   TRANSFER_ACCEPT_ITEM           16
#define   TRANSFER_DECLINE_ITEM          17
#define    DISTRIBUTE_ITEM               18
#define    BOOK_SCHEDULE_ITEM            19
#define    BOOK_RESCHEDULE_ITEM          20
#define    BOOK_CANCEL_ITEM              21
#define    BOOK_ACCEPT_ITEM              22
#define    BOOK_DECLINE_ITEM             23
```

As shown, the bTypes data member can identify the item as a "Schedule" item, a "Broadcast" item, a "Reschedule" item, a "Reminder" item, a "Reply" item, a "Minutes" item, or the like.

The bTimeZone data member stores an identifier uniquely identifying the time zone (e.g., Pacific Standard Time) that the dates are relative to. In this manner, the recipient user's system can automatically convert the times, if desired, to those relative to the time zone for that recipient. In a preferred environment, each appointment has its own time zone—typically, the time zone in which the item was originally scheduled. The recipient systems convert this information to and from their own relative time zones, as needed.

Finally, the bLead and bLeadUnit data members store information describing a "lead" time or reminder. This information allows the system to send reminders to all participants at a specified interval (e.g., three days).

2. Each Recipient

Each recipient involved with a group scheduling message is represented internally by a recipient data structure: EACH_RECIPIENT. In an exemplary embodiment, the data structure may be constructed as follows.

```
typedef struct
{
    char        szName[32];
    char        szEmail[64];
    long        lID;
    long        lID2;
    DWORD       wFlags;     //  type of e-mail, Has free time,
                            //  sender or not, file flag
    DWORD       wStatus;    //  status flags, message or free time saved.
    long        lfData;     //  point to free time file and ShortMsg mail
    LPRECIPIENT_DATA    lpAttach;
    //  HGLOBAL  hAttach;   //  a RECIPIENT_DATA structure
} EACH_RECIPIENT;           //  114
typedef EACH_RECIPIENT * LPEACH_RECIPIENT;
```

As shown, the first data member, szName, stores a text string comprising the recipient's name (e.g., "John Smith"). This is followed by another text string, szEmail, which stores the e-mail address for the recipient. Following the recipient name and e-mail address are two identifier data members: lID and lID2. These IDs are used in combination to uniquely describe a particular recipient.

Following the identifiers is a double word data member, wFlags, storing recipient flags. The recipient flags indicate, for instance, whether the recipient has free time, whether the recipient accepts or declines, and so forth. In an exemplary embodiment, the status flags may be defined as follows.

```
// type of e-mails, fax, or page in EACH_RECIPIENT structure
#define   TYPE_E-mail AOL              0x0001
#define   TYPE_E-mail_COMPUSERVE       0x0002
#define   TYPE_E-mail_EXCHANGE         0x0004
#define   TYPE_E-mail_INTERNET         0x0008
#define   TYPE_FAX                     0x0010
#define   TYPE_PAGE                    0x0020
#define   TYPE_PHONE                   0x0040
#define   TYPE_MAILING_LIST            0x0080
// type of recipient
#define   TYPE_PARTICIPANT             0x0100
#define   TYPE_CC                      0x0200
#define   TYPE_ROOM                    0x0400
#define   TYPE_EQUIPMENT               0x0800
// also, TYPE_OTHERS defined below
// misc. flags
```

-continued

```
#define   IS_SENDER                          0x1000
#define   IS_SELF                            0x2000
#define   HAS_RECIPIENT_DATA                 0x4000
#define   READ_IN_RECIPIENT_DATA             0x8000
#define   F_LIST_DIRTY                       0x00010000
#define   TYPE_OTHERS                        0x00020000
#define   CARD_ID_SET                        0x00040000
#define   TYPE_PAGE_ME                       0x00080000
#define   RECIPIENT_RECEIVED_FORWARD         0x00100000
#define   RECIPIENT_SENT_FORWARD             0x00200000
// Recipient status flags
// #define RECIPIENT_STATUS                  0x0001
#define   RECIPIENT_FREE_TIME                0x0002
#define   RECIPIENT_FORWARD                  0x0004
#define   RECIPIENT_E-mail_ADDRESS           0x0008
#define   RECIPIENT_NAME                     0x0010
#define   RECIPIENT_CARD_ID                  0x0020
#define   RECIPIENT_MAIL_STATUS              0x0040
#define   RECIPIENT_ACCEPT                   0x0080
#define   RECIPIENT_DECLINE                  0x0100
#define   RECIPIENT_RESCHEDULE_REQUIRED      0x0200
#define   RECIPIENT_RESOURCE_CONFLICT        0x0400
#define   RECIPIENT_RESOURCE_TRANSFERRED     0x0800
#define   RECIPIENT_RESOURCE_NOT_FOUND       0x1000
#define   RECIPIENT_RESOURCE_CANCELED        0x2000
// flags for resource events    (from 0x00010000 to 0x80000000)
#define   RECEIVE_DISTRIBUTE_RESOURCE        0x00010000
#define   RECEIVE_BOOK_RESOURCE              0x00020000
#define   SENT_BOOK_RESOURCE                 0x00040000
#define   RECEIVE_TRANSFER_RESOURCE          0x00080000
#define   SENT_TRANSFER_RESOURCE             0x00100000
#define   TRANSFER_SUCCESSFUL                0x00200000
```

As shown, the information indicates the type of delivery—e-mails, fax, or page—desired for a particular recipient, thereby supporting methods for communicating with all types of recipients, other than just e-mail. For e-mail types, support is provided for multiple providers, including, for instance, America On-line (AOL), CompuServe, Microsoft Exchange, and the Internet. For a recipient to be contacted via phone (i.e., type is TYPE_PHONE), the system adds an item to the user's "call list"—that is, a list of calls the user is to make (as shown at 440, in FIG. 4). A delivery type of "mailing list" indicates that the system is to process multiple recipients according to a mailing list.

The flags also indicate a recipient type. A recipient can be, for instance, a "participant" (i.e., type is TYPE_PARTICIPANT)—someone who is required to reply. A "CC" recipient (i.e., type is TYPE_CC), on the other hand, is not required to reply. Other types of "recipients" include "room," such as a conference room, and "equipment," such as a projector. Finally, a recipient can be simply set to "others" for indicating that the recipient is other than that above.

As a group scheduling item is associated with a list of recipients, it is helpful to further characterize recipients. In this regard, a "sender" flag (type is IS_SENDER) is employed for indicating that the recipient is actually the sender. A "self" flag (type is IS_SELF), on the other hand, indicates that the recipient is "self"—that is, the same individual as the user. Other recipient-type information serves to further characterize the recipient. For instance, the "page me" flag indicates that this recipient is to be paged. A "sent forward" flag, on the other hand, indicates that this recipient has delegated the item to another user.

Finally, the recipient flags store status information for each recipient. Status includes, for instance, information indicating whether the recipient accepted or declined the invitation, or whether the recipient required rescheduling. Additionally, at this point, flag information is stored for resources, such as information indicating that the resource is not found, that the resource has been transferred, that the resource has been canceled, or that a conflict for the resource exists.

Returning to the description of the EACH_RECIPIENT data structure, the next data member, lfData, is a pointer to a data block for the recipient; the data block stores free time information and a short message for the recipient. Finally, the EACH_RECIPIENT data structure stores a pointer, lpAttach, which points to a RECIPIENT_DATA structure. This structure will now be described.

3. Recipient Data

The RECIPIENT_DATA structure stores free time and rescheduling information for a particular recipient. In an exemplary embodiment, the data structure may be defined as follows.

```
typedef struct
{
    DWORD   dwFlags;         // Reserved -- not used
    long    lStart;
    long    lEnd;
    DWORD   dwRescheduleStart[3];  //  reschedule request start
                                       date/time
    DWORD   dwRescheduleEnd[3];    //  reschedule request end
                                       date/time
    LPSTR   lpMsg;
    LPSTR   lpFreeTime;
    void *  lpNext;
} RECIPIENT_DATA;
typedef RECIPIENT_DATA * LPRECIPIENT_DATA;
```

As shown, the first data member, dwFlags, comprises a double word data member storing flag or status information; it is currently not used. The next two data members, lStart and lEnd, indicate a free time range (e.g., next 30 days). Then, the next two data members, dwRescheduleStart and dwRescheduleEnd, store information specifying a reschedule request start date/time and reschedule request end date/time, respectively. As each of these data members comprises an array of size three, these data members actually indicate three rescheduling alternatives.

The next data member, lpMsg, comprises a pointer to a text string storing a message associated with the reschedule request (e.g., "Sorry, I am in Chicago next week; please reschedule."). This is followed by a pointer, lpFreeTime, which points to a block describing the free time for the recipient (i.e., information employed for displaying a Free Time report for this recipient). Finally, the data structure includes a "next" pointer, for pointing to a subsequent RECIPIENT_DATA structure.

Each RECIPIENT_DATA structure, when saved to file, is associated with a header: RECIPIENT_DATA_HEADER. In an exemplary embodiment, the header may be constructed as follows.

```
typedef struct
{
    DWORD   dwFlags;
    UINT    nMsgs;
    UINT    nFreeTimes;
```

```
    long      lStart;
    long      lEnd;
    DWORD     dwRescheduleStart[3];    // reschedule request
                                       //   start date/time
    DWORD     dwRescheduleEnd[3];      // reschedule request
                                       //   end date/time
} RECIPIENT_DATA_HEADER;
typedef RECIPIENT_DATA_HEADER  *
LPRECIPIENT_DATA_HEADER;
```

The header includes data members the same as or similar to those described for RECIPIENT_DATA. Additionally, the header stores a number of messages, nMsgs, and a number of free times, nFreeTimes.

Also stored is a footer: RECIPIENT_DATA_FOOTER. This may be constructed as follows.

```
typedef struct
{
    DWORD lfData;    // -1 if no next item.
} RECIPIENT_DATA_FOOTER;
typedef RECIPIENT_DATA_HEADER  *
LPRECIPIENT_DATA_HEADER;
```

The footer simply comprises a single data member, lfData, which serves to indicate whether a "next" recipient data item exists (in a chain of recipient data records).

4. Group Appointment

At run time, a memory block or buffer is allocated for storing context information. This buffer is organized into a GROUP_APPOINTMENT structure, for describing a particular group appointment. In an exemplary embodiment, this data structure may be constructed as follows.

```
typedef struct
    DWORD    dwEventID1;
    DWORD    dwEventID2;
    DWORD    dwFromDateTime;
    DWORD    dwToDateTime;
    DWORD    dwOldFromDateTime;
    DWORD    dwOldToDateTime;
    DWORD    dwRescheduleStart[3];
    DWORD    dwRescheduleEnd[3];
    DWORD    dwSendReceive;
    HANDLE   hText;
    HANDLE   hRegarding;
    HANDLE   hRecipient;
    LPSTR    lpMeetingNote;   // meeting note file name
    LPSTR    lpShortMsg;
    LPSTR    lpDelegateMsg;
    LPSTR    lpFreeTime;
    int      nIsDelegate;
    int      nIsResource;
    HANDLE   hForward;
    WORD     nTexts;
    WORD     nRegardings;
    WORD     nRecipients;
    DWORD    wFlags;      // READ_IN
    DWORD    wFlags2;
    short    nPageHour;
    short    nPageMin;
    BYTE     bLeadHour;
    BYTE     bLeadMin;
    BYTE     bReminderLead;
    BYTE     bReminderUnit;
    BYTE     bTimeZone;
    BYTE     bTypes;
    int      nTone;
    DWORD    lfData;      // 42
    int      nResourceStatus;
    char     szResourceName[64];
    char     szLocation[64];
    char     szCity[64];
    char     szSenderName[32];
    char     szSenderE-mail[64];
    int      nSenderE-mailType;
    char     szAttachFile[PATHMAX+4];
    EACH_RECIPIENT       PageMe;
    HGLOBAL  hPlaceList;
    int      cPlaceLists;
//  LPSTR    lpTZ;
//  int      nTZs;
} GROUP_APPOINTMENT;      // total 136 bytes
typedef GROUP_APPOINTMENT * LPGROUP_APPOINTMENT;
```

This temporary, in-memory data structure (i.e., it is not saved to disk) largely comprises data members taken from the previously-described data structures. Additionally, however, the data structure stores information further describing any delegation. For instance, the lpDelegateMsg data member points to a delegate message text string. This allows one recipient to send a message to a delegated-to recipient, yet not have that text string message returned to the originator of the invitation. Additionally, delegation is supported by the szSenderName and szSenderE-mail data members. This information indicates who the delegated to recipient should respond to—that is, the originator of the invitation.

Group Scheduling Methodology

1. Schedule Group Event

With an understanding of the internal day structures employed, methods of operation may now be examined in further detail. Group scheduling begins with a request to schedule a group event. This request results from user input occurring at the user interface, as illustrated at step 1001 in FIG. 10. Actual operation of the user interface itself, such as processing menu selections and user input at edit fields, may be done in a conventional manner using standard windows graphical user interface (GUI) methodology.

Once the user input has culminated in a request to schedule a group event, the request is processed by the group scheduling module or engine 910 (of FIG. 9). This module internally invokes a Schedule_Group_Event method. In an exemplary embodiment, the Schedule_Group_Event handler or method may be constructed as follows (again, using the C/C++ programming language).

```
1: /*********************************************************
2:    Schedule a following type of group events:
3:      - Normal group event (reply required)
4:      - Broadcast group event (no reply needed)
5:      - Reminder
6:      - Reschedule
```

```
 7:         - Free time
 8:         - Cancel meeting.
 9:   ***************************************************************
10:   int Schedule_Group_Event (LPGROUP_APPOINTMENT lpNew,
11:         int nAddToList, int nAddToAppointment, int nFromCalendar,
12:         LPSTR lpInBuf, int nInSize)
13:   {
14:       GROUP_ITEM    GroupItem;
15:       LPSTR     lpMessage = lpInBuf;
16:       int nIndex = -1;
17:
18:       if (!lpMessage)
19:       {
20:         lpMessage = AllocLockBufferPtr (NOTETEXTSIZE * 3);
21:         nInSize = NOTETEXTSIZE * 3;
22:       }
23:
24:       if (!lpMessage)
25:          return FALSE;
26:
27:       nstartGroupEvent = TRUE;
28:
29:       // Save to appointment list in Calendar module.
30:       if (lpNew—>hRecipient && lpNew—>nRecipients)
31:       {
32:          // get send and receive time.
33:          if (lpNew—>bTypes == SCHEDULE_ITEM || lpNew—>bTypes
34:              == BROADCAST_ITEM || lpNew—>bTypes
35:              == RESCHEDULE_ITEM || lpNew—>bTypes == CANCEL_ITEM)
36:             time (&(lpNew—>dwSendReceive));
37:
38:          //   - add call items to call list.
39:          if (lpNew—>bTypes == SCHEDULE_ITEM
40:              || lpNew—>bTypes == BROADCAST_ITEM)
41:             Insert_Calls_Calendar (lpNew);
42:
43:          //   - add send letter to todo list.
44:          if (lpNew—>bTypes = SCHEDULE_ITEM
45:              || lpNew—>bTypes == BROADCAST_ITEM)
46:             Insert_Todos_Calendar (lpNew);
47:
48:          // add/edit/delete calendar item
49:          if (!nFromCalendar)
50:          {
51:             if ((lpNew—>bTypes == SCHEDULE_ITEM
52:                 || lpNew—>bTypes == BROADCAST_ITEM)
53:                 && nAddToAppointment)
54:             {
55:                if (!(lpNew—>wFlags & UNBOOKED_EVENT))
56:                   AddNewAppointment_FromGROUP (lpNew);
57:                // AddNewGroupAppointment (lpNew);
58:             }
59:             else if (lpNew—>bTypes == RESCHEDULE_ITEM)
60:             {
61:                // #### Reschedule Appointment
62:                ChangeExistAppointment_FromGROUP (lpNew);
63:             }
64:             else if (lpNew—>bTypes == CANCEL_ITEM)
65:             {
66:                // #### delete appointment
67:                DeleteExistAppointment_FromGROUP (lpNew);
68:             }
69:          }
70:
71:       // add item to GROUP event data base.
72:       if (nAddToList)
73:       {
74:          ResolveAllMailingLists (lpNew);
75:          if(!GROUP_Appointment_To_GROUP_Item(lpNew, &GroupItem))
76:          {
77:             UnlockFreeBufferPtr (lpMessage);
78:             return FALSE;
79:          }
80:          GroupItem.wFlags  == READ_IN_MAIN | READ_IN_ATTACH;
81:          GroupItem.wFlags  == SCHEDULED_EVENT;
82:          GroupItem.wFlags2 == EVENT_QUEUE_ITEM;
83:          if (!IsBroadcastType (&GroupItem))
84:          {
85:             ResolveAllExchangeMailingLists (&GroupItem);
86:          }
```

-continued

```
 87:
 88:        ScanForSelf_SetAccept (&GroupItem);
 89:        // actual call to add item to GROUP event database
 90:        nIndex
 91:          = AddOneGroupItem ( NULL, &GroupItem,
 92:                              SCHEDULED_EVENT,
 93:                              Get Current_SortFlag ( ));
 94:        // . . . DEBUG
 95:      }
 96:      // empty else case . . .
 97:      // Now COMPOSE MESSAGE
 98:      if (!(lpNew—>wFlags & SEND_LATER))
 99:      {
100:        if (lpNew—>bTypes == SCHEDULE_ITEM)
101:        {
102:          ComposeScheduleMessage (lpNew,
103:             MSG_SCHEDULE, lpMessage, nInSize);
104:        }
105:        else if (lpNew—>bTypes == BROADCAST_ITEM)
106:        {
107:          ComposeScheduleMessage (lpNew, MSG_BROADCAST,
108:             lpMessage, nInSize);
109:        }
110:        else if (lpNew—>bTypes == REMINDER_ITEM)
111:        {
112:          ComposeScheduleMessage (lpNew, MSG_REMINDER,
113:             lpMessage, nInSize);
114:          bIsReminderMsg = TRUE;
115:        }
116:        else if (lpNew—>bTypes == RESCHEDULE ITEM)
117:        {
118:          ComposeScheduleMessage (lpNew, MSG_RESCHEDULE,
119:             lpMessage, nInSize);
120:        }
121:        else if (lpNew—>bTypes == CANCEL_ITEM)
122:        {
123:          ComposeCancelMessage (lpNew, lpMessage, nInSize);
124:        }
125:
126:        //   - send email;
127:        Send_AOL_Email (lpNew, lpMessage);
128:        Send_CompuServe_Email (lpNew, lpMessage, FALSE);
129:        Send_Exchange_Email (lpNew, lpMessage, FALSE);
130:        Send_Internet_Email (lpNew, lpMessage, FALSE);
131:
132:
133:        //   - send fax;
134:        Send_Group_Fax (lpNew, lpMessage, FALSE);
135:
136:        if ((lpNew—>bTypes == SCHEDULE_ITEM) ||
137:             (lpNew—>bTypes == BROADCAST_ITEM) ||
138:             (lpNew—>bTypes == RESCHEDULE_ITEM) ||
139:             (lpNew—>bTypes == CANCEL_ITEM))
140:        {
141:          int nLen = lstrlen (lpMessage);
142:
143:          Loadstring (hCardfileInstance,
144:             IDS_THIS_IS_RESOURCE, lpMessage + nLen, BUF_LEN);
145:
146:          Send_CompuServe_Email (lpNew, lpMessage, TRUE);
147:          Send_Exchange Email (lpNew, lpMessage, TRUE);
148:          Send_Internet_Email (lpNew, lpMessage, TRUE);
149:          Send_Group_Fax (lpNew, lpMessage, TRUE);
150:        }
151:
152:        //   - send page;
153:        Send_Group_Page (lpNew, FALSE);
154:        bIsReminderMsg = FALSE;
155:      }
156:      fscheduledDirty = TRUE;
157:    }
158:    else
159:    {
160:      AddNewAppointment FromGROUP (lpNew);
161:    }
162:    if (!lpInBuf)
163:      UnlockFreeBufferPtr (lpMessage);
```

-continued

```
164:     nStartGroupEvent = FALSE;
165:
166:     return TRUE;
167:  }
```

(line numbers added above to aid in the following description)

This method is invoked after the user has completed UI data entry. It serves to schedule one of the following types of group events: Normal group event (reply required), Broadcast group event (no reply required), Reminder, Reschedule, Free Time, or Cancel meeting.

The parameters required for the method are set forth at lines 10–12. The first parameter, lpNew, references a new group appointment data structure (described above). The second parameter, nAddToList, indicates that this group event should be added to the group scheduling database. The third parameter, nAddToAppointment, indicates whether the event should be added to the user's appointments (listed in the user's calendar). The fourth parameter, nFromCalendar indicates that this request is originating from the user's calendar, for example, as a result of a drag-and-drop event occurring in the calendar. The first two parameters, lpnBuff and nSize, characterize a passed-in memory buffer; the memory buffer is typically used for storing message strings. At lines 14–16, the method initializes local (stack) variables. At lines 18–25, the method attempts to allocate a memory buffer for storing a message. If a buffer cannot be successfully allocated, the method returns "false" at line 25. At line 27, the method initializes a global variable, nStartGroupEvent, to the value of "true."

Starting at line 29, the method will undertake to save the group event to the appointment list in the calendar module. This occurs as follows. At line 30, the method tests whether there are recipients—that is, whether this is a "group" appointment. Otherwise (i.e., the condition at line 30 is (false), the event is instead a "local" appointment. Between lines 32 and 69, the method tests group appointment flags for determining its course of action. At lines 32–36, for instance, if the event is a "Schedule" item, a "Broadcast" item, a "Reschedule" item, or a "Cancel" item, the previously-described dwSendRecieve time stamp is updated at line 36. At lines 38–41, the method adds a Schedule or Broadcast item to the user's call list. In a similar manner, at lines 43–46, the method adds a Schedule or Broadcast item to the user's "to do" list. The "insert calendar" call serves to call into the calendar module 920 (of FIG. 9).

At lines 48–49, the method tests whether the event request originated from the calendar. If not, then the method must add the event to the appointment list, if the requested event is a Schedule or Broadcast item. Specifically, the method invokes an AddNewAppointment_FromGROUP subroutine at line 56. Otherwise, the method tests whether the event is a Reschedule item (at line 59) or a Cancel item (at line 64). For a Reschedule item, the method changes the existing appointment, at line 62. For a Cancel item, on the other hand, the method deletes the existing appointment, at line 67.

At lines 71–95, the method undertakes to add the event item to the group scheduling (event) database 950 (of FIG. 9). Specifically, the method tests the nAddToList parameter, at line 72. If this is set to "true" (i.e., greater than 0), the method proceeds to convert the group appointment into a group item, resolving all recipients on any mailing lists. The actual call to add the item to the database occurs at lines 89–93, where one group item is added.

Starting with line 97, the method will now undertake composing of the message for notifying recipients of the group scheduling event. At line 98, the method tests a SEND—LATER flag, which indicates whether the scheduling message is to be sent later. If the message is not to be sent later (i.e., the "if" statement at line 98 evaluates to "true"), then the group scheduling event message must be composed now. In such a case, the method will proceed to compose and send a message, at lines 99–155. Steps of the method for composing and sending the message will be described next.

Lines 100–124 set forth a sequence of "else if" case-like statements which switch on the item type. At line 100, for instance, if the item is a Schedule item, the method invokes the composer at lines 102–103, for composing a Schedule message (MSG_SCHEDULE). If, instead, the item is a Broadcast item, tested at line 105, the method invokes the composer at lines 107–108, for composing a Broadcast message (MSG—BROADCAST). For a Reminder item, tested at line 110, the method invokes the composer at lines 112–113, for composing a reminder message (MSG_REMINDER). For a Reschedule item, tested at line 116, the method invokes the composer at lines 118–119, for composing a reschedule message (MSG_RESCHEDULE). Finally, if the item is a Cancel item, tested at line 121, the method invokes the composer at line 123, for composing a cancel message. The foregoing steps, therefore, invoke an appropriate handler in the composer 912 (of FIG. 9) for creating an appropriate message. The message itself is stored in the memory buffer pointed to by lpMessage—the memory buffer allocated at lines 18–25. After the task of composing the message is done, the method proceeds to send the message using the appropriate transport for each recipient.

At lines 126–130, the method invokes the e-mail module or manager for transporting the message over available services: America On-Line (handler invoked at line 127, CompuServe (handler invoked at line 128), Microsoft Exchange (handler invoked at line 129), and Internet (handler invoked at line 130). As shown, each handler invocation passes a pointer to the GROUP_APPOINTMENT data structure as well as a pointer to the message buffer (which holds the just-created group scheduling event message). As shown, a Boolean parameter is passed with the value of "false" for indicating that the message is not for a resource (which requires a slightly different format). For each handler invocation, the e-mail module will enumerate the recipients for the respective services and post group scheduling event messages accordingly.

At lines 133–134, the method invokes a fax handler for sending facsimile transmissions to the recipients which are preferably reached via that mechanism. Faxing from the computer can be done in a conventional manner, using a "Fax modem" and built-in Fax support (e.g., in Microsoft Windows® 95, available from Microsoft Corp. of Redmond, Wash.).

At lines 136–150, the method essentially repeats the foregoing steps of invoking e-mail and fax handlers, except that here the process is undertaken for a resource. The process is essentially the same except that at lines 141–144 the method modifies the just-created message (stored in the memory buffer) for adding an identifier indicating that the group scheduling event is for a resource. At lines 152–153, the method invokes a SendGroupPage handler for processing any request to page a recipient (or the user himself or herself). At lines 154 and 156 local cleanup is performed.

At line 158, an "else" statement is defined. This statement is reached in the event that the message is to be sent later (i.e., the "if" statement of line 98 evaluates to "false"). In such a case, the method simply adds a new appointment, at line 160. Steps are not undertaken at this point to compose and/or post a group scheduling event message. Finally, the method performs local cleanup, such as freeing the message buffer, at lines 162–163. After resetting the nStartGroupEvent global flag, at line 164, the method returns "true," at line 166, whereupon the method is completed.

2. Composing Messages

To understand methods of the present invention for composing messages, it is helpful at the outset to examine group scheduling formats employed by the system for creating messages. In general, messages are created using delimiters, thereby, avoiding position dependency of particular information within a message.

a. Message Formats

In an exemplary environment, every message includes a signature and a message type, which may be constructed as follows:

```
<Product Signature>   :=   <ISK> (or <SIS>)
<Message Type>        :=   <Schedule\Broadcast\Reply\Free Time\
Reminder\Reschedule\Meeting Note\Cancel\Recurring\New Resource\
Resource\Action\Synchronization>
```

As shown, the message includes the previously-described signature followed by a particular message-type. The message-type itself can be any one of the following: Schedule, Broadcast, Reply, Free Time, Reminder, Reschedule, Meeting Note, Cancel, Recurring, New Resource, Resource, Action, and Synchronization. The "Action" message-type supports workflow applications. Here, the message serves as a "to do" item or task for one or more recipient users. The "Synchronization" message, on the other hand, serves to synchronize two or more data objects, such as user calendars. Recall that a data object characterizing a calendar (e.g., free time data object) can be imbedded within a message. A Synchronization message-type, therefore, exchanges calendars and instructs the recipient system to automatically synchronize the recipient's calendar with the embedded calendar. The synchronization generic in nature, so that it can be extended to any data object which is capable of synchronization.

b. Message Body

Following the signature and message-type is (if required) a message body. Here, the system includes specific data items which characterize the scheduling event. The message body for Schedule and Broadcast message-types is exemplary in this regard. In an exemplary environment, a message body for these message-types may be constructed as follows:

```
<From Date Time>    :=  YY/MM/DD HH:MM
<To Date Time>      :=  YY/MM/DD HH:MM
<Location> :=  Place name where the meeting will be held
<City>              :=  City name where the meeting will be held It is related to Time Zone.
<Time Zone>         :=  <Time zone name where appointment time is based on>
<Attributes>        :=  <Alarm>
<EventID1>          :=  A unique ID for the event.
<EventID2>          :=  The second part of the ID.
<Subject>           :=  <Message text></Subject>
<Message Content>   :=  <Regarding text></Message Content>
<Participants>      :=  "Name; Email address; Email Type" "Name; Email Address;
Email Type" </Participants>
<CC> := "Name; Email address; Email Type" "Name; Email Address; Email Type"
</CC>
<Room> : = "Name; Email address; Email Type" "Name; Email Address; Email Type"
</Room>
<Equipment> := "Name; Email address; Email Type" "Name; Email Address; Email
Type"
</Equipment>
```

As shown, the message body includes data items which correspond to the previously-described internal data structures. For instance, the group scheduling event is characterized by a "from" and a "to" date and time, a location, a city, a time zone, and the like. The event is identified by the previously-described two-part event ID. The message body concludes with a list of e-mail addresses, including addresses for participants, "CC" recipients, and resources (divided into "room" and "equipment" subtypes). Each of these data items may comprise a list of e-mail addresses.

The message body for a reply message, on the other hand, is constructed as follows.

```
<Reply Types>       :=   <Accept\Decline\Reschedule Required\Sleep\
Forward\Resource\Free Time>
<Forward To>        :=   <Name; E-mail address; Email Type>
</Forward To>
<< If Reschedule required
<From Date Time>    :=   YY/MM/DD HH:MM
<To Date Time>      :=   YY/MM/DD HH:MM
>>
<EventID1>   :=   A unique ID for the event.
<EventID2>   :=   The second part of the ID.
<Short Message>     :=   <Short text message></Short Message>
```

Again, the message body includes data items corresponding to the previously-described data members in the group scheduling internal data structures. A reply includes, for instance, a reply type, such as "Accept," "Decline," "Reschedule required," or the like. In the event that the replying user has delegated the event, the delegated-to user's address is provided in the "forward to" field. If the reply request rescheduling, rescheduling date and time information is included. For this type of message, the message also includes a file attachment providing further information for (e.g., Free Time report). Finally, the message includes the two-part event ID, so that the reply can be matched up with the original invitation. Any message provided by the replying user is transmitted in the message field, "short message."

The "sleep" message-type is provided for those users who are on vacation. Exemplary message bodies for other message types are appended herewith as Appendix A.

c. Methodology for Composing Messages

In an exemplary environment, a method for composing scheduling event messages, ComposedScheduledMessage, may be constructed as follows.

```
1:   /***************************************************************
2:       This function is called for schedule a:
3:          - Schedule meeting
4:          - Broadcast meeting
5:          - Reminder
6:          - Reschedule
7:
8:       Meeting message format is:
9:
10:      <Message Type>    message type name\r\n
11:      <Old Date Time>   yy/mm/dd hh:mm\r\n (if it's a reschedule message)
12:      <From Date Time>  yy/mm/dd hh:mm\r\n
13:      <To Date Time>    yy/mm/dd hh:mm\r\n
14:      <Location>        location name\r\n
15:      <Time Zone>       time zone value\r\n
16:      <Attributes>      "attribute" "attribute" . . . \r\n
17:      <EventID1>        EventID1 value string\r\n
18:      <EventID2>        EventID2 value string\r\n
19:      <Subject> Text body</Subject>\r\n
20:      <Message Content> Regarding body</Message Content>\r\n
21:
22:
23:   ***************************************************************/
24:  int ComposeScheduleMessage  (LPGROUP_APPOINTMENT lpGroup,
25:                                        int nMessageType,
26:                                        LPSTR lpMessage,
27:                                        int nSize)
28:  {
29:      char    szField[BUF_LEN+1], szSpace[2],
30:              szReturn[5], szTime[BUF_LEN+1];
31:      int     nIsReschedule = FALSE, nIsBroadCast = FALSE;
32:      LPSTR   lpBuf;
33:      BYTE    bTypes;
34:
35:      szSpace[0] = ' ';
36:      szSpace[1] = 0;
37:      GetReturnNewline (szReturn);
38:
39:      if ((nMessageType == MSG_DISTRIBUTE_RESOURCE)
40:          || (nMessageType == MSG_TRANSFER_RESOURCE))
41:      {
42:         LoadGenericHeaderMessage (lpMessage);
43:      }
44:      else
45:      {
46:         if (nMessageType == MSG_SCHEDULE ||
47:             nMessageType == MSG_REMINDER ||
48:             nMessageType == MSG_BROADCAST ||
49:             nMessageType == MSG_RESCHEDULE)
50:             Load_ISK_Message_Header (lpGroup, lpMessage, nSize);
51:      }
52:
53:
54:  /*
55:
56:  This message was generated by Internet Sidekick.
57:   * If you have Internet Sidekick installed on your system:
58:   - Please ignore this message and do not delete it from you inbox.
59:   - Internet Sidekick will automatically process it next time you
60:     Send/Receive messages or during the next scheduled Flash Session.
61:
62:   * If you do not have Internet Sidekick:
63:   - You can reply to this invitation using your e-mail software.
64:     Type an X next to either Accept or Decline below, so it reads
65:     [X] Accept or [X] Decline.
66:   - You can also enter a short message as part of your reply to the
67:     initiator in the blank section between <BEGIN REPLY MESSAGE> and
68:     <END REPLY MESSAGE>.
69:   - When you reply from your E-mail product, make sure that the reply
70:     includes the whole original message body including the section
```

-continued

```
71:    below the heading, For Internet Sidekick Use Only. Also do not
72:    modify or delete the Subject of this e-mail message.
73:    - For further information on how to procure it, please visit
74:    Starfish Software's web site at:
75:    <http://www.starfishsoftware.com>.
76:    *****************************************************************
77:
78:    Message From: {Initiator}
79:    Date/Time: {Date/Time}
80:    Duration: {Duration}
81:    Time Zone: {Time Zone}
82:    Location: {Location}
83:    City/Country: {City}
84:
85:    Subject: {Subject}
86:    Message: {Message}
87:
88:    *****************************************************************
89:
90:    <BEGIN REPLY>
91:    Your Reply:
92:
93:    [ ] Accept
94:    [ ] Decline
95:    <END REPLY>
96:
97:    Reply Message:
98:    <BEGIN REPLY MESSAGE>
99:
100:   <END REPLY MESSAGE>
101:   *****************************************************************
102:   The section below is for Internet Sidekick Use Only.
103:   Please, do not edit or delete any of the information
104:   below this line.
105:   *****************************************************************
106:
107:   */
108:
109:
110:       //   append <Message Type> and space
111:       LoadString (hCardfileInstance,
112:                   IDS_SKWGROUP_MESSAGE_TYPE_ID,
113:                   lpMessage+lstrlen(lpMessage), nSize);
114:       lstrcat (lpMessage, szSpace);
115:
116:       //   append Schedule, Broadcast, Reminder, Reschedule
117:       switch (nMessageType)
118:       {
119:         case MSG_SCHEDULE:
120:           LoadString (hCardfileInstance,
121:                       IDS_SKWGROUP_SCHEDULE, szField, BUF_LEN);
122:           break;
123:         case MSG_BROADCAST:
124:           LoadString (hCardfileInstance,
125:                       IDS_SKWGROUP_BROADCAST,
126:                       szField, BUF_LEN);
127:           nIsBroadCast = TRUE;
128:           break;
129:         case MSG_REMINDER:
130:           LoadString (hCardfileInstance,
131:                       IDS_SKWGROUP_REMINDER, szField, BUF_LEN);
132:           break;
133:         case MSG_RESCHEDULE:
134:           LoadString (hCardfileInstance,
135:                       IDS_SKWGROUP_RESCHEDULE, szField, BUF_LEN);
136:           nIsReschedule = TRUE;
137:           break;
138:         case MSG_RESOURCE:
139:           LoadString  (hCardfileInstance,
140:                       IDS_SKWGROUP_RESOURCE_SCHEDULE,
141:                       szField, BUF_LEN);
142:                       break;
143:         case MSG_DISTRIBUTE_RESOURCE:
144:           LoadString  (hCardfileInstance,
145:                       IDS_SKWGROUP_NEW_RESOURCE,
146:                       szField, BUF_LEN);
147:           break;
148:         case MSG_RESOURCE_RESCHEDULE:
149:           LoadString  (hCardfileInstance,
150:                       IDS_SKWGROUP_RESOURCE_RESCHEDULE,
```

```
151:                      szField, BUF_LEN);
152:          break;
153:        case MSG_RESOURCE_CANCEL:
154:          LoadString    (hCardfileInstance,
155:                         IDS_SKWGROUP_RESOURCE_CANCEL,
156:                         szField, BUF_LEN);
157:          break;
158:      }
159:      AppendString    (lpMessage, szField,
160:                       szReturn, NULL, NULL, NULL, nSize);
161:
162:      if (nIsReschedule)
163:      {
164:        /*
165:          if it is a reschedule operation
166:          then insert original date/time
167:        */
168:        GetGmtTimeString   (lpGroup—>dwOldFromDateTime,
169:                            lpGroup—>bTimeZone, szTime, BUF_LEN);
170:        LoadString    (hCardfileInstance,
171:                       IDS_SKWGROUP_OLD_DATE_TIME,
172:                       szField, BUF_LEN);
173:        AppendString    (lpMessage, szField,
174:                         szSpace, szTime,
175:                         szReturn, NULL, nSize);
176:      }
177:
178:      //   Append from and to date/time
179:      LoadString    (hCardfileInstance,
180:                     IDS_SKWGROUP_FROM_DATE_TIME,
181:                     szField, BUF_LEN);
182:      GetGmtTimeString   (lpGroup—>dwFromDateTime,
183:                          lpGroup—>bTimeZone, szTime, BUF_LEN);
184:      AppendString    (lpMessage, szField,
185:                       szSpace, szTime, szReturn, NULL, nSize);
186:
187:      LoadString    (hCardfileInstance,
188:                     IDS_SKWGROUP_TO_DATE_TIME, szField, BUF_LEN);
189:      GetGmtTimeString   (lpGroup—>dWToDateTime,
190:                          lpGroup—>bTimeZone, szTime, BUF_LEN);
191:      AppendString    (lpMessage, szField,
192:                       szSpace, szTime, szReturn, NULL, nSize);
193:
194:      //   Append city and country information
195:      LoadString    (hCardfileInstance,
196:                     IDS_SKWGROUP_CITY, szField, BUF_LEN);
197:      AppendString    (lpMessage, szField,
198:                       szSpace, lpGroup—>szCity,
199:                       szReturn, NULL, nSize);
200:
201:      //   Append location and time zone information
202:      //   <Location>    location name\r\n
203:      //   <Time Zone>   time zone value\r\n
204:      //   IDS_SKWGROUP_TIME_ZONE, "<Time Zone>"
205:      //   IDS_SKWGROUP_LOCATION, "<Location>"
206:      LoadString    (hCardfileInstance,
207:                     IDS_SKWGROUP_LOCATION, szField, BUF_LEN);
208:      AppendString    (lpMessage, szField,
209:                       szSpace, lpGroup—>szLocation,
210:                       szReturn, NULL, nSize);
211:      LoadString    (hCardfileInstance,
212:                     IDS_SKWGROUP_TIME_ZONE, szField, BUF_LEN);
213:      //   nvalue = GetTimeZoneValue (lpGroup);
214:      _itoa ((int)lpGroup—>bTimeZone, szTime, 10);
215:      AppendString    (lpMessage, szField,
216:                       szSpace, szTime, szReturn, NULL, nSize);
217:
218:      //   Append attributes
219:      //   <Attributes> "attribute" "attribute" . . . \r\n
220:      //   IDS_SKWGROUP_ATTRIBUTES, "<Attributes>"
221:      LoadString    (hCardfileInstance,
222:                     IDS_SKWGROUP_ATTRIBUTES, szField, BUF_LEN);
223:      GetAttributeString    (lpGroup, szTime, BUF_LEN);
224:      AppendString    (lpMessage, szField,
225:                       szSpace, szTime, szReturn, NULL, nSize);
226:
227:      //   Append Event ID1
228:      //   <EventID1>    EventID1 value string\r\n
229:      //   IDS_SKWGROUP_EVENTID_1, "<EventID1>"
230:      LoadString    (hCardfileInstance,
```

```
231:                    IDS_SKWGROUP_EVENTID_1, szField, BUF_LEN);
232:    _ltoa ((long)lpGroup—>dwEventID1, szTime, 10);
233:    AppendString    (lpMessage, szField,
234:                    szSpace, szTime, szReturn, NULL, nSize);
235:
236:    //  Append Event ID2
237:    //  <EventID2>      EventID2 value string\r\n
238:    //  IDS_SKWGROUP_EVENTID_2, "<EventID2>"
239:    LoadString    (hCardfileInstance,
240:                    IDS_SKWGROUP_EVENTID_2, szField, BUF_LEN);
241:    _ltoa ((long) lpGroup—>dwEventID2, szTime, 10);
242:    AppendString    (lpMessage, szField,
243:                    szSpace, szTime,
244:                    szReturn, NULL, nSize);
245:
246:    if (lpGroup—>wFlags & EVENT_FORWARDED)
247:    {
248:      EACH_RECIPIENT Recipient;
249:
250:      // append sender's name and sender's email address
251:      if (GetSenderInfo (lpGroup, &Recipient, IS_SENDER) >= 0)
252:      {
253:        LoadString    (hCardfileInstance,
254:                      IDS_SKWGROUP_SENDER_NAME,
255:                      szField, BUF_LEN);
256:        AppendString    (lpMessage, szField,
257:                        szSpace, Recipient, szName,
258:                        szReturn, NULL, nSize);
259:        LoadString    (hCardfileInstance,
260:                      IDS_SKWGROUP_SENDER_EMAIL,
261:                      szField, BUF_LEN);
262:        AppendString    (lpMessage, szField,
263:                        szSpace, Recipient, szEmail,
264:                        szReturn, NULL, nSize);
265:      }
266:      //   append forward flag "1"
267:      LoadString    (hCardfileInstance,
268:                    IDS_SKWGROUP_IS_DELEGATE,
269:                    szField, BUF_LEN);
270:      AppendString    (lpMessage, szField, szSpace,
271:                      "1", szReturn, NULL, nsize);
272:    }
273:
274:    //  Append Text
275:    //  <Subject> Text body</Subject>\r\n
276:    //  IDS_SKWGROUP_TEXT,          "<Subject>"
277:    //  IDS_SKWGROUP_END_TEXT,  "</Subject>"
278:    if (lpGroup—>hText)
279:    {
280:      LoadString    (hCardfileInstance,
281:                    IDS_SKWGROUP_TEXT,
282:                    szField, BUF_LEN);
283:      LoadString    (hCardfileInstance,
284:                    IDS_SKWGROUP_END_TEXT,
285:                    szTime, BUF_LEN);
286:      lpBuf = GlobalLock (lpGroup—>hText);
287:      AppendString    (lpMessage, szField,
288:                      szSpace, lpBuf,
289:                      szTime, szReturn, nSize);
290:      GlobalUnlock    (lpGroup—>hText);
291:    }
292:
293:    //  Append Regarding
294:    //  <Message Content> Regarding body</Message Content>\r\n
295:    //  IDS_SKWGROUP_REGARDING, "<Message Content>"
296:    //  IDS_SKWGROUP_END_REGARDING, "</Message Content>"
297:    if (lpGroup—>hRegarding)
298:    {
299:      LoadString    (hCardfileInstance,
300:                    IDS_SKWGROUP_REGARDING, szField, BUF_LEN);
301:      LoadString    (hCardfileInstance,
302:                    IDS_SKWGROUP_END_REGARDING, szTime, BUF_LEN);
303:      lpBuf = GlobalLock (lpGroup—>hRegarding);
304:      AppendString    (lpMessage, szField,
305:                      szSpace, lpBuf, szTime,
306:                      szReturn, nSize);
307:      GlobalUnlock    (lpGroup—>hRegarding);
308:    }
309:    // Append Delegate msg
310:    if (lpGroup—>wFlags & EVENT_FORWARDED
```

```
311:            && lpGroup—>lpDelegateMsg)
312:        {
313:            LoadString    (hCardfileInstance,
314:                           IDS_SKWGROUP_START_DELEGATE_MSG,
315:                           szField, BUF_LEN);
316:            LoadString    (hCardfileInstance,
317:                           IDS_SKWGROUP_END_DELEGATE_MSG,
318:                           szTime, BUF_LEN);
319:         if (lstrlen(lpMessage)
320:            + lstrlen (lpGroup—>lpDelegateMsg)
321:            + lstrlen(szField) + lstrlen(szTime)
322:            + 10 < nSize)
323:          AppendString   (lpMessage, szField,
324:                          szSpace, lpGroup—>lpDelegateMsg,
325:                          szTime, szReturn, nSize);
326:        }
327:
328:        /*
329:          Append participant's name
330:          and email address to message body.
331:        */
332:        AppendRecipientInfo    (lpMessage, lpGroup,
333:                                nSize, nMessageType);
334:
335:        /*
336:          Append resource's name
337:          and email address to message body.
338:        */
339:        if (nMessageType != MSG_REMINDER)
340:           AppendResourceInfo   (lpMessage, lpGroup,
341:                                  nSize, nMessageType);
342:
343:        return TRUE;
344:    }
```

As its first parameter, the method is passed a pointer to the previously-described GROUP_APPOINTMENT data structure—the internal buffer storing context information characterizing a group scheduling event (including a message-type). At lines 29–37, local (stack) variables are declared and initialized. At lines 39–40, the method tests whether the message-type involves a resource. For a resource, the method will load a generic header for the message, at line 42. Otherwise (i.e., the "if" statement evaluates to "false"), the method will load into the message buffer, pointed to by lpMessage, a (non-resource) message header, provided that the message-type is Schedule, Reminder, Broadcast, or Reschedule. The comment set forth at lines 54–107 illustrates an exemplary message header. As shown, the message header is formatted in a fashion which permits a user having only basic e-mail support to read the scheduling message and reply (e.g., accept or decline) accordingly.

After the message header has been loaded into the message buffer, the method proceeds to append to the message being constructed the other fields set forth in the previously-described message formats. The method proceeds as follows. At lines 110–114, the method appends the "message-type" delimiter. This is followed by appending the actual message type for the message, at lines 116–160. Specifically, the method first determines the appropriate text string for the message type, at lines 117–158. Then, this message string is appended to the message being constructed, at lines 159–160.

Other fields of the message can be appended to the message being created in a similar manner. At lines 162–176, the method inserts the original date/time in the event that the message is a Reschedule message. At lines 178–192, the method appends the "from" and "to" date and time. At lines at 194–199, the method appends the city and country information, and at lines 201–216, the method appends location and time zone information.

At lines 218–225, attribute information is appended. At lines 227–234 and at 236–244, the first and second event IDs are appended, respectively. In the event that the message indicates that the scheduling event has been forwarded (i.e., delegated) to another user (tested at line 246), the method appends the sender's name and sender's e-mail address, at lines 258–265. Additionally, an "append forward" flag is set, at lines 266–271.

At lines 274–291, the method appends the "subject" text. Any "regarding" message is appended at lines 293–308, and any "delegate" message is appended at lines 310–326. To complete the message, the participant's name and address is appended to the message body, at lines 329–333. Finally, resource information (for any resource) is appended to the message body, at lines 335–341. Now, the message has been successfully completed, and the method may return "true" at line 343. Once the message has been composed, it can be posted to the transport layer, using the previously described Schedule_Group_Event Method.

Figure 12A:
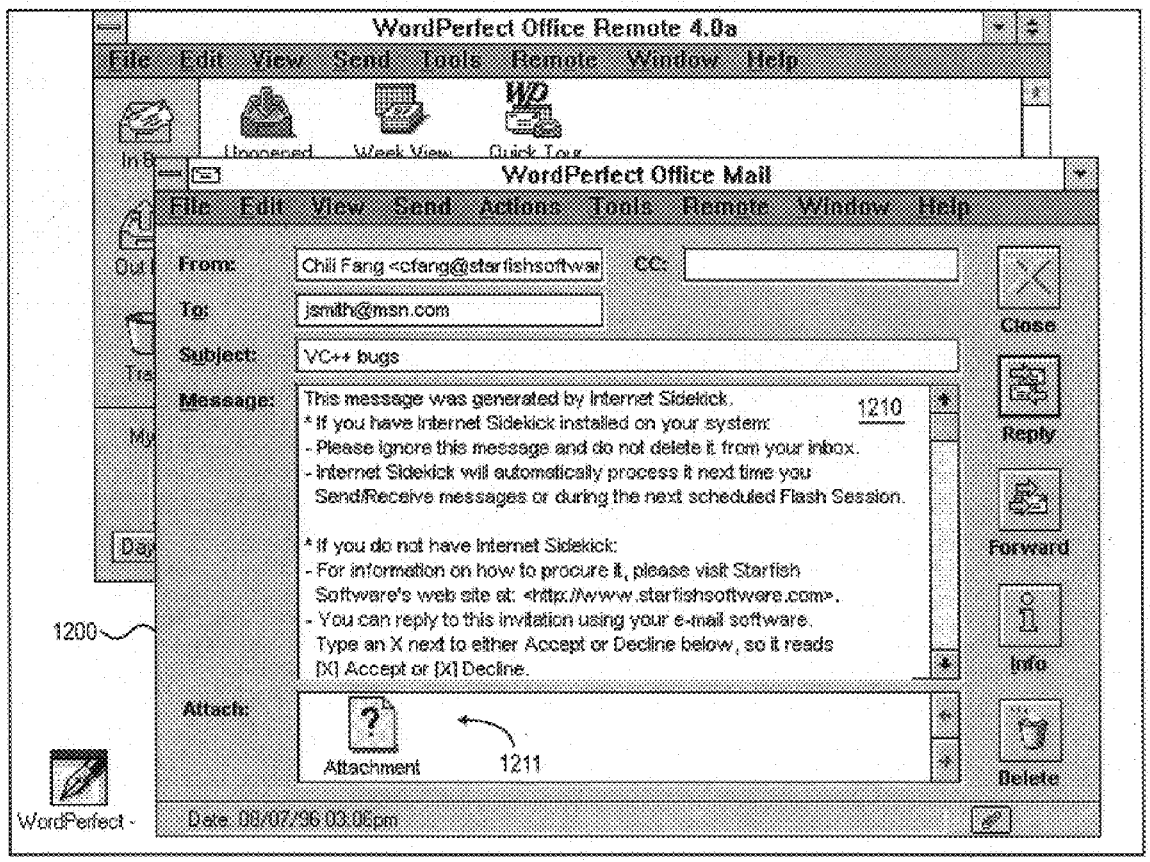
FIGS. 12A–C are bitmap screenshots illustrating receipt of an e-mail scheduling invitation by a recipient whose system represents a non-SK client without browser support.
Figure 12B:
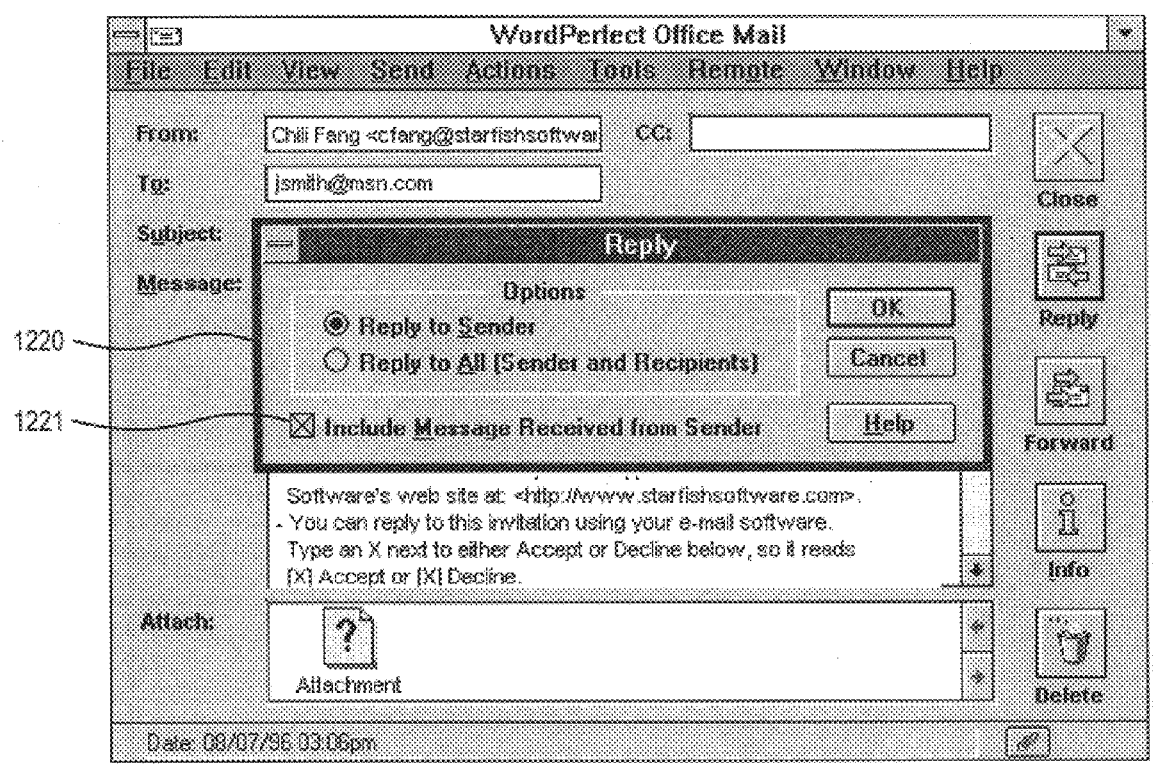
Figure 12C:
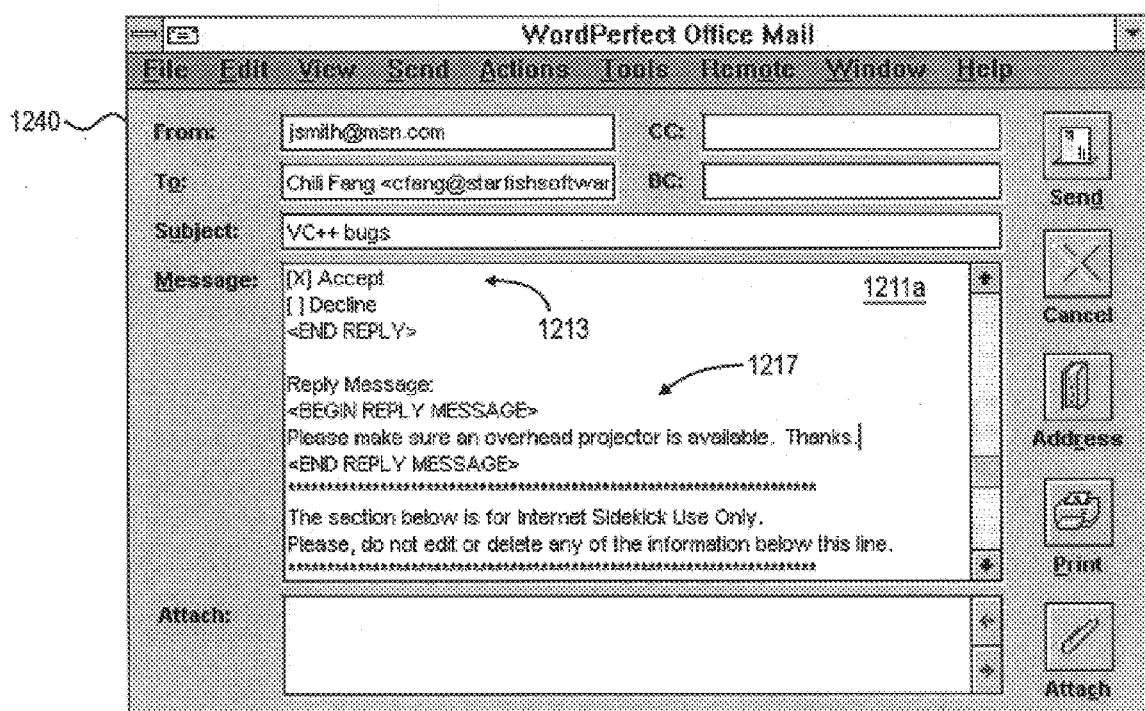

Receipt of the composed scheduling message by a non-SK client without browser support (e.g., WordPerfect Office user) is illustrated in FIGS. 12A–C. FIG. 12A shows an e-mail viewer 1200 displaying the invitation in simple text format 1210. Although the message also includes richer formats (e.g., Attachement(s) 1211), the remote system does not recognize them and, thus, can simply ignore them. As shown in FIG. 12B, the remote user can "reply" to the invitation using his or her own e-mail software, as shown at dialog 1220, and choose to include the message received from the sender, as shown at 1221. Following the instructions in the e-mail invitation, the remote user, as shown in FIG. 12C, edits the reply 1211a by entering an "X" in the [ ] Accept text string at 1213 and entering a brief message between the <BEGIN REPLY MESSAGE> and <END REPLY MESSAGE> delimiters or markers 1217.

The above-illustrated message composition can be extended to automatically generate a Hypertext Markup Language (HTML) form as a scheduling invitation. Here, the HTML form is generated in a conventional manner using HTML code, except that instead of a user hand-crafting the form, the system automatically maps the scheduling information into appropriate target destinations (fields, buttons, and labels) on the form. For instance, the following data fields are mapped to HTML fields:

| HTML field | Mapped information |
|---|---|
| Message From: | {Initiator} |
| Date/Time: | {Date/Time} |
| Duration: | {Duration} |
| Time Zone: | {Time Zone} |
| Location: | {Location} |
| City/Country: | {City} |
| Subject: | {Subject} |
| Message: | {Message} |

Further, the "Accept" and "Decline" responses are mapped to HTML buttons.

Creation of these control in HTML is straightforward. For instance, the "Accept" and "Decline" buttons can be emitted in HTML format as:

```
<HTML>
...
<BODY>
<FORM>
...
<H1>Accept and Decline Buttons</H1>
<INPUT TYPE="Accept" VALUE="I accept the invitation">
<INPUT TYPE="Decline" VALUE="I decline the invitation">
```

-continued
```
</BODY>
</FORM>
...
</HTML>
```

Description of the HTML format is well documented in the trade literature; see e.g., Duncan, R., *An HTML Primer*, PC Magazine, Jun. 13, 1995, pp. 261–270. Further description is provided by Duncan, R., *Publishing HTML Forms on the Web*, PC Magazine, Dec. 5, 1995, pp. 391–403. The disclosures of the foregoing are hereby incorporated by reference.

Figure 13:
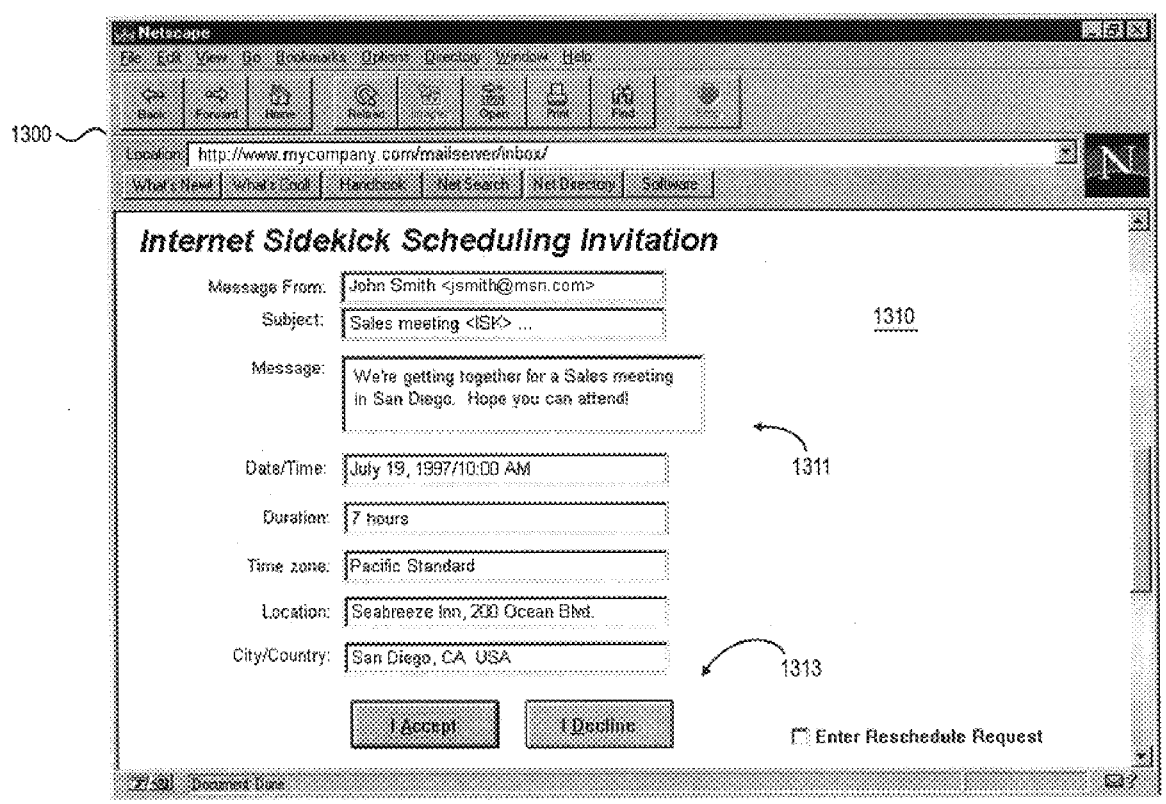
FIG. 13 is a screenshot illustrating receipt of an e-mail scheduling invitation by a recipient whose system represents a non-SK client with browser support.

Receipt of the composed HTML scheduling message by a non-SK client with browser support (e.g., Netscape Navigator user) is illustrated in FIG. 13. The remote user employs the browser 1300 for displaying the invitation in hypertext (HTML) format 1310. The scheduling data fields are automatically placed on the form as HTML form fields 1311. The "Accept" and "Decline" buttons, on the other hand, are placed as buttons 1313. The receiving user can now simply respond to the form, whereupon his or her answer is transmitted back to the sender.

d. Methodology for Parsing Messages

Methods of the present invention for identifying and processing incoming group scheduling event messages will now be described. All incoming mail is initially processed by a ReceiveAllIncomingMails method. In an exemplary embodiment, this method may be constructed as follows.

```
 1:   /***************************************************************
 2:       This function will receive all incoming group event messages.
 3:   ***************************************************************/
 4:   int ReceiveAllIncomingMails (void)
 5:   {
 6:       LPMESSAGEINFOSET lpInfoSet;
 7:       int     i,
 8:               nLists = cScheduledLists,
 9:               nWantDlg=FALSE,
10:               nResult,
11:               nPaint  = FALSE,
12:               nFolderCreated;
13:       char    szSender[PATHMAX+1], szTo[PATHMAX+1],
14:               szCC[PATHNAX+1], szBCC[PATHMAX+1],
15:               szSubject[PATHMAX+1], szTime[BUF_LEN+1],
16:               szEmail[65], szEmailType[BUF_LEN+1],
17:               szAttach[PATHMAX+1], szSignature[BUF_LEN+1];
18:       HGLOBAL  hMessage;
19:       LPSTR    lpMessage;
20:
21:       TurnOnFlashSession ( );
22:       lpMessage = AllocLockBuffer (&hMessage, NOTETEXTSIZE * 4);
23:       if (!hMessage)
24:       {
25:         TurnOffFlashSession ( );
26:         return FALSE;
27:       }
28:
29:       LoadString  (hCardfileInstance,
30:                    IDS_SKWGROUP_SIGNATURE, szSignature,
31:                    BUF_LEN);
32:
33:       //   Get email messages from Exchange
34:       if (IsDeliverExchange ( ))
35:       {
36:         char szFolderName[BUF_LEN+1];
37:
38:         //   ReceiveAllNewMails (hCardfileWnd);
39:         ReceiveAllMailsNow (hCardfileWnd);
40:
41:         //   Create Internet Sidekick Folder.
42:         LoadString   (hCardfileInstance,
```

-continued

```
 43:                      IDS_ISK_FOLDER_NAME, szFolderName, BUF_LEN);
 44:      nFolderCreated
 45:        = CreateAFirstLevelFolderInDefaultMsgStore
 46:          {
 47:             hCardfileWnd,
 48:             szFolderName
 49:          };
 50:
 51:
 52:      // Search for ISK Messages.
 53:      lpInfoSet
 54:        = SearchSKWScheduleMsgInInboxFolder
 55:          {
 56:             hCardfileWnd,
 57:             szSignature
 58:          };
 59:
 60:
 61:      if (!lpInfoSet)   //   not enough memory
 62:        {
 63:          UnlockFreeBuffer (hMessage);
 64:          TurnOffFlashSession ( );
 65:          return FALSE;
 66:        }
 67:
 68:      if (lpInfoSet—>ulCount)
 69:        {
 70:          for (i=0; i<(int)lpInfoSet—>ulcount; i++)
 71:            {
 72:              if (GetMessageContents   (hCardfileWnd,
 73:                                        lpInfoSet—>lpMsgInfo [i].lpEID,
 74:                                        szSender, PATHMAX,
 75:                                        szEmail, 64,
 76:                                        szEmailType, BUF_LEN,
 77:                                        szTo, PATHMAX,
 78:                                        szCC, PATHMAX,
 79:                                        szSubject, PATHMAX,
 80:                                        lpMessage, NOTETEXTSIZE * 4,
 81:                                        szTime, BUF_LEN,
 82:                                        szAttach, PATHMAX))
 83:                {
 84:
 85:                  trim_start_end (szSender, '\'', '\'');
 86:                  trim_start_end (szSender, '\"', '\"');
 87:                  trim_start_end (szEmail, '\!', '\'');
 88:                  trim_start_end (szEmail, '\"', '\"');
 89:                  trim_start_end (szTo, '\'', '\'');
 90:                  trim_start_end (szTo, '\"', '\"');
 91:
 92:                  if (!(nResult
 93:                        = ReceiverMessageHandler  (szSender,
 94:                                                   szEmail, szEmailType,
 95:                                                   szTo, szCC, szSubject,
196:                                                   lpMessage, szAttach,
 97:                                                   FALSE)))
 98:                      continue;
 99:
100:                  nPaint = TRUE;
101:                  SetMailRead (hCardfileWnd,
102:                     lpInfoSet—>lpMsgInfo[i].lpEID);
103:                  if (!IsLeaveOnServer ( ))
104:                      DeleteMail    (hCardfileWnd,
105:                                     lpInfoSet—>lpMsgInfo [i]. lpEID,
106:                                     TRUE);
107:                  else
108:                    {
109:                      if (nFolderCreated)
110:                         MoveISKMailsToISKMailFolder
111:                           {
112:                             hCardfileWnd,
113:                             lpInfoSet—>lpMsgInfo[i].lpEID,
114:                             szFolderName
115:                           };
116:                    }
117:                }
118:            }
119:        }
120:      FreeMessageInfoSet (lpInfoSet);
121:    }
122:
```

```
123:    //  Get email messages from POP3 account.
124:    if (IsDeliverOwnInternet ( ))
125:    {
126:      if (SFMailGetNew (hCardfileWnd, szSignature))
127:      {
128:        if (SFMailBoxOpen ( ))
129:        {
130:          lpInfoSet = SFMailScanMail (hcardfileWnd);
131:          if (lpInfoSet)
132:          {
133:            for (i=0; i<(int)lpInfoSet—>ulCount; i++)
134:            {
135:              if ( SFGetMessageContents
136:                  {
137:                    hCardfileWnd,
138:                    lpInfoSet—>lpMsgInfo[i].lpEID,
139:                    szEmail, 64,
140:                    szSender, PATHMAX,
141:                    //szEmailType, BUF_LEN,
142:                    szTo, PATHMAX,
143:                    szCC, PATHMAX,
144:                    szBCC, PATHMAX,
145:                    szSubject, PATHMAX,
146:                    lpMessage, NOTETEXTSIZE * 3,
147:                    szAttach, PATHMAX,
148:                    szTime, BUF_LEN
149:                  }
150:              }
151:              {
152:
153:                trim_start_end (szSender, '\'', '\'');
154:                trim_start_end (szSender, '\"', '\"');
155:                trim_start_end (szEmail, '\'', '\'');
156:                trim_start_end (szEmail, '\"', '\"');
157:                trim_start_end (szTo, '\'', '\'');
158:                trim_start_end (szTo, '\"', '\"');
159:
160:                if (!(nResult
161:                   = ReceiverMessageHandler
162:                      {
163:                        szSender,
164:                        szEmail,
165:                        szEmailType,
166:                        szTo, szCC,
167:                        szSubject, lpMessage,
168:                        szAttach, FALSE
169:                      }}}
170:                continue;
171:                nPaint = TRUE;
172:                //   delete message from inbox.
173:                if (nResult)
174:                  SFDeleteMessage
175:                  {
176:                    hCardfileWnd,
177:                    lpInfoSet—>lpMsgInfo [i].lpEID
178:                  };
179:              }
180:            }
181:          }
182:          SFMailBoxClose ( );
183:        }
184:      }
185:    }
186:
187:    // unlock and free message block
188:    UnlockFreeBuffer (hMessage);
189:
190:    TurnOffFlashSession ( );
191:    if (npaint)
192:    {
193:      if (hCoverPageWnd && IsGroupPageFront ( ))
194:      {
195:        Sort_GroupEventList   (hCoverPageWnd, NULL,
196:                               Get_Current_SortFlag ( ));
197:        if (!nLists)
198:        {
199:        }
200:      }
201:      else
202:        SortGroupEventInfo  (hScheduledList, cScheduledLists,
```

```
203:                    Get_Current_SortFlag ( ));
204:        }
205:        return TRUE;
206: }
```

After initializing local (stack) variables at lines 6–19, the method "turns on" the "flash" session, at line 21. This sets a global flag for preventing re-entry, since this is a timer/interrupt driven process. At lines 22–27, the method allocates a memory block for storing an incoming message. If the allocation fails, the method returns "false" at line 26. At lines 29–31, the method loads from a resource file the signature string (i.e., <ISK>). This string will be used to identify incoming group scheduling events.

Now, the method is ready to retrieve e-mail messages from the user's in-box. At lines 33–121, the method retrieves messages for Microsoft Exchange and creates a folder for those messages (at lines 41–49). Now, the method searches in that folder for group scheduling event messages—that is, messages containing the identifying signature (at lines 52–58). If at least one group scheduling event message is found (i.e., count is greater than zero at line 68), the method sets up a "for" loop at line 70, for looping through each such message. At lines 72–82, the message contents are extracted by a call to GetMessageContents. At lines 85–90, any trailing spaces are trimmed from this extracted information. As shown, the extracted information includes information about the sender (name), e-mail (address), e-mail-type, "To", "CC", subject, message, time, and any attachment.

Further processing is performed by a call to ReceiverMessageHandler, at line 93. The ReceiverMessageHandler method provides appropriate message handling (action), based on the extracted or parsed message information. If the message cannot be handled (i.e., the "if" statement at line 92 evaluates to "false"), then the method loops back for the next message, by executing the "continue" statement at line 98. Otherwise, the message can be handled whereupon the method removes the message from the user's in-box (lines 104–106), and places it in a group scheduling mail folder (lines 109–115). Thereafter, cleanup is performed at line 120. In the event that the user's e-mail system is from a POP3 (Internet Post Office Protocol) account, the method executes lines 123–185. Here, the method performs essentially the same task as just described for a Microsoft Exchange mail account.

The method completes its operation by freeing up memory at lines 187–188, turning off the flash session flag at line 190, and repaints the user interface with the new information (if needed) at lines 191–204. Thereafter, all incoming mail has been appropriately processed, and the method may return "true" at line 205.

The message handler itself, ReceiverMessageHandler, may be constructed as follows.

```
 1:    /***************************************************************
 2:       This function will handle incoming group event messages.
 3:    ***************************************************************/
 4:    int ReceiverMessageHandler    (LPSTR lpFrom,
 5:                                   LPSTR lpEmail,
 6:                                   LPSTR lpEmailType,
 7:                                   LPSTR lpTo,
 8:                                   LPSTR lpCC,
 9:                                   LPSTR lpSubject,
10:                                   LPSTR lpMessage,
11:                                   LPSTR lpAttachFile,
12:                                   int nReplyCcode)
13:    {
14:       LPSTR lpShortMsg = NULL, lpNew = NULL;
15:       int nMsgID
16:           = MessageTypeParser (lpSubject, lpMessage, &lpNew),
17:         nReplyType = 0;
18:
19:       if (nMsgID == GROUP_SCHEDULE
20:           || nMsgID == GROUP_BROADCAST
21:           || nMsgID == GROUP_RESCHEDULE)
22:       {
23:          lpShortMsg
24:             = IsThisAutoReplyMessage  (lpMessage,
25:                                        &nMsgID,
26:                                        &nReplyType);
27:       }
28:
29:       switch (nMsgID)
30:       {
31:          case GROUP_REMINDER:
32:          case GROUP_SCHEDULE:
33:          case GROUP_BROADCAST:
34:             return Handle_Schedule_Meeting
35:                (
36:                   lpFrom, lpEmail,
37:                   lpEmailType, lpTo,
38:                   lpCC, lpMessage,
39:                   lpAttachFile, nMsgID
40:                );
41:
```

-continued

```
 42:        case GROUP_REPLY:
 43:          return Handle_Reply
 44:            {
 45:               lpFrom, lpEmail,
 46:               lpTo, lpCC,
 47:               lpSubject, lpMessage,
 48:               nReplyType, lpShortMsg
 49:            };
 50:
 51:        case GROUP_FREETIME:
 52:          return CreateFreeTime_Matrix_Send
 53:            {
 54:               lpFrom, lpEmail,
 55:               lpCC, lpMessage
 56:            };
 57:
 58:        case GROUP_RESCHEDULE:
 59:          return Handle_Reschedule
 60:            {
 61:               lpFrom, lpEmail,
 62:               lpEmailType, lpTo,
 63:               lpCC, lpMessage,
 64:               nReplyCode
 65:            };
 66:
 67:        case GROUP_MEETING_NOTE:
 68:          return Handle_Meeting_Note
 69:            {
 70:               lpFrom, lpCC,
 71:               lpMessage, lpAttachFile
 72:            };
 73:
 74:        case GROUP_CANCEL_MEETING:
 75:          return Handle_Cancel_Meeting (lpFrom, lpCC, lpMessage);
 76:
 77:        case GROUP_NEW_RESOURCE:
 78:          return Handle_AddNewResource    (lpFrom,
 79:                                           lpEmail, lpMessage);
 80:
 81:        case GROUP_RESOURCE_SCHEDULE:
 82:        case GROUP_RESOURCE_RESCHEDULE:
 83:          return Handle_Resource_Schedule
 84:            {
 85:               lpFrom, lpEmail,
 86:               lpEmailType, lpTo,
 87:               lpCC, lpMessage
 88:            };
 89:
 90:             case GROUP_RESOURCE_CANCEL:
 91:          return Handle_Resource_Cancel   (lpFrom,
 92:                                           lpEmail, lpMessage);
 93:
 94:        case GROUP_FREE_RESOURCE:
 95:          return Handle_Free_Resource (lpFrom, lpEmail, lpMessage);
 96:
 97:        case GROUP_TRANSFER_RESOURCE:
 98:          return Handle_Transfer_Resource
 99:            {
100:               lpFrom, lpEmail,
101:               lpEmailType, lpMessage,
102:               lpAttachFile
103:            };
104:     }
105:     return TRUE;
106:  }
```

As shown, the method is invoked with parameters set equal to the just-extracted e-mail information. After declaring local variables at line 14, the method parses out the message type, at lines 15–16. At lines 19–21, the method examines whether the message is one which it can automatically reply to; such a condition holds true when the message is for a Group Schedule, Broadcast, or Reschedule. At lines 20–104, the method establishes a case statement which switches on message type or ID, for invoking more specialized handlers. Group Reminder, Schedule, and Broadcast messages, for instance, invoke a Handle_Schedule_Meeting handler at line 34. A group reply message, on the other hand, invokes a Handle_Reply handler at line 43. Other handlers are invoked in a corresponding manner. A list of exemplary handlers is appended herewith as Appendix B.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

APPENDIX A

Exemplary Message Formats

Group scheduling format design

1. Internet appointment message format
Every type of message will have following two parts at least.
<Product Signature> := <ISK>(or <SIS>)
<Message Type> := <Schedule | Broadcast | Reply | Free Time | Reminder | Reschedule | Meeting Note | Cancel | Recurring | New Resource | Resource | Action | Synchronization>
Schedule and Broadcast:

| | | |
|---|---|---|
| <From Date Time> | := | YY/MM/DD HH:MM |
| <To Date Time> | := | YY/MM/DD HH:MM |
| <Location> | := | Place name where the meeting will be held. |
| <City> | := | City name where the meeting will be held. It is related to Time Zone. |
| <Time Zone> | := | <Time zone name where appointment time is based on> |
| <Attributes> | := | <Alarm> |
| <EventID1> | := | A unique ID for the event. |
| <EventID2> | := | The second part of the ID. |
| <Subject> | := | <Message text></Subject> |
| <Message Content> | := | <Regarding text></Message Content> |
| <Participants> | := | "Name; Email address; Email Type" "Name; Email Address; Email Type" </Participants> |

<CC> := "Name; Email address; Email Type" "Name; Email Address; Email Type"
</CC>
<Room>:= "Name; Email address; Email Type" "Name; Email Address; Email Type"
</Room>
<Equipment>:= "Name; Email address; Email Type" "Name; Email Address; Email Type"
</Equipment>
If this message is a broadcast message, it requires no ACCEPT response.
Reply:

| | | |
|---|---|---|
| <Reply Types> | := | <Accept | Decline | Reschedule Required | Sleep | Forward | Resource | Free Time> |
| <ForwardTo> | := | <Name; E-mail address; Email Type></Forward To> |

<< If Reschedule required

| | | |
|---|---|---|
| <From Date Time> | := | YY/MM/DD HH:MM |
| <To Date Time> | := | YY/MM/DD HH:MM |

>>

| | | |
|---|---|---|
| <EventIDl> | := | A unique ID for the event. |
| <EventID2> | := | The second part of the ID. |
| <Short Message> | := | <Short text message></Short Message> |

<<If it is a Reschedule Required, Free Time Request, or Resource Reservation type of Schedule
There is a file attached on this message
The Reschedule Required type of reply is for the purpose of rescheduling right away. For example, a person received a group meeting request. He does not have free time. So he requires to reschedule the meeting with different time.
The purpose of Sleep type is for people on vacation or leaving.
Free Time: (A Free Time request message)

| | | |
|---|---|---|
| <EventID1> | := | A unique ID for this Free Time request. |
| <EventID2> | := | The second part of the ID. |
| <From Date Time> | := | YY/MM/DD HH:MM |
| <To Date Time> | := | YY/MM/DD HH:MM |
| <Subject> | := | <Message text></Subject> |

This is an auto reply message request. The reply result of Free Time report is a text matrix with 0 and 1.
Reschedule:

| | | |
|---|---|---|
| <Old Date/Time> | := | YY/MM/DD; HH:MM. |
| <From Date Time> | := | YY/MM/DD HH:MM |
| <To Date Time> | := | YY/MM/DD HH:MM |
| <Location> | := | Place name where the meeting wiil be held. |
| <City> | := | City name where the meeting wiil be held. It is related to Time Zone. |
| <Time Zone> | := | <Time zone name where appointment time is based on> |
| <Attributes> | := | <Alarm | Previously Status: Accept; Decline> |
| <EventID1> | := | A unique ID for the event. |
| <EventID2> | := | The second part of the ID. |
| <Subject> | := | <Message text></Subject> |
| <Message Content> | := | <Regarding text></Subject> |
| <Participants> | := | "Name; Email address; Email Type" "Name; Email Address; Email Type" </Participants> |

<CC>:= "Name; Email address; Email Type" "Name; Email Address; Email Type"
</CC>
<Room> := "Name; Email address; Email Type" "Name; Email Address; Email Type" </
</Room>

APPENDIX A-continued

Exemplary Message Formats

<Equipment>  :=  "Name; Email address; Email Type" "Name; Email Address; Email Type" </
</Equipment>
If this meeting is previously accepted, then a forced change appointment list will happen. If this meeting is previously declined or not responded, then it is handled like a normal schedule request.
A Resource request message will be sent again when a Reschedule message is sent.
Reminder:

| | | |
|---|---|---|
| <From Date Time> | := | YY/MM/DD HH:MM |
| <To Date Time> | := | YY/MM/DD HH:MM |
| <Location> | := | Place name where the meeting will be held. |
| <City> | := | City name where the meeting will be held. It is related to Time Zone. |
| <Time Zone> | := | <Time zone name where appointment time is based on> |
| <Attributes> | := | <Alarm \|1 Previous Status: Accept; Decline> |
| <EventID1> | := | A unique ID for the event. |
| <EventID2> | := | The second part of the ID. |
| <Subject> | := | <Message text></Subject> |
| <Message Content> | := | <Regarding text></Message Content> | if not Broadcast
<Participants>  := "Name; Email address; Email Type" "Name; Email Address; Email Type" </Participants>
<CC>:=  "Name; Email address; Email Type" "Name; Email Address; Email Type" </CC>
<Room>  :=  "Name; Email address; Email Type" "Name; Email Address; Email Type" </
</Room>
<Equipment>  :=  "Name; Email address; Email Type" "Name; Email Address; Email Type" </
</Equipment>
If this meeting is previously accepted, the ACCEPT button will be grayed out. If this meeting is not responded, it is handled like a normal schedule.
Meeting Note:

| | | |
|---|---|---|
| <From Date Time> | := | YY/MM/DD HH:MM |
| <To Date Time> | := | YY/MM/DD HH:MM |
| <Location> | := | Place name where the meeting was held. |
| <City> | := | City name where the meeting will be held. It is related to Time Zone. |
| <Time Zone> | := | <Time zone name where appointment time is based on> |
| <EventID1> | := | A unique ID for the event. |
| <EventID2> | := | The second part of the ID. |
| <Subject> | := | <Message text></Subject> |
| <Meeting Note> | := | The meeting note text</Meeting Note> |

Cancel a group meeting:

| | | |
|---|---|---|
| <EventID1> | := | A unique ID for the event. |
| <EventID2> | := | The second part of the ID. |
| <Subject> | := | <Message text></Subject> |
| <Short Message> | := | <Message text></Short Message> |

Resource: (Resource Reservation Message)

| | | |
|---|---|---|
| <From Date Time> | := | YY/MM/DD HH:MM |
| <To Date Time> | := | YY/MM/DD HH:MM |
| <EventID1> | := | A unique ID for the event |
| <EventID2> | := | The second part of the ID |
| <Subject> | := | <Message text></Subject> |
| <Message Content> | := | <Regarding text></Message Content> |

Schedule a recurring Appointment:

| | | |
|---|---|---|
| <Start Date> | := | YY/MM/DD |
| <End Date> | := | YY/MM/DD |
| <From Date Time> | := | YY/MM/DD HH:MM |
| <To Date Time> | := | YY/MM/DD HH:MM |
| <Recur Pattern 1> | := | Month \| Week \| Day |
| <Recur Pattern 2> | := | Frequency |
| <Recur Pattern 3> | := | Include and Exclude |
| <Location> | := | Place name where the meeting will be held. |
| <City> | := | City name where the meeting will be held. It is related to Time Zone. |
| <Time Zone> | := | <Time zone name where appointment time is based on> |
| <Attributes> | := | <Alarm> |
| <Subject> | := | <Message text></Subject> |
| <Message Content> | := | <Regarding text></Message Content> |

Executing an Action cross the serverless network:

| | | |
|---|---|---|
| <From Date Time> | := | YY/MM/DD HH:MM |
| <To Date Time> | := | YY/MM/DD HH:MM |
| <Location> | := | Place name where the meeting will be held. |

APPENDIX A-continued

Exemplary Message Formats

| | | |
|---|---|---|
| <City> | := | City name where the meeting will be held. It is related to Time Zone. |
| <Time Zone> | := | <Time zone name where appointment time is based on> |
| <EventID1> | := | A unique ID for the event. |
| <EventID2> | := | The second part of the ID. |
| <Subject> | := | <Message text></Subject> |
| <Message Content> | := | <Regarding text></Message Content> |
| <Action Item> | := | <Java applet | An executable program | operations which can be recognized in Sidekick> |

Synchronizing files cross the network:

| | | |
|---|---|---|
| <From Date Time> | := | YY/MM/DD HH:MM |
| <To Date Time> | := | YY/MM/DD HH:MM |
| <Location> | := | Place name where the meeting will be held. |
| <City> | := | City name where the meeting will be held. It is related to Time Zone. |
| <Time Zone> | := | <Time zone name where appointment time is based on> |
| <EventID1> | := | A unique ID for the event. |
| <EventID2> | := | The second part of the ID. |
| <Subject> | := | <Message text></Subject> |
| <Message Content> | := | <Regarding text></Message Content> |
| <File Name> | := | <File name which needs to be synchronized> |

Resource scheduling requires non-overlapped time and a subject. The scheduling is a non-negotiable process. The reply only has two options: Accept and Decline.

APPENDIX B

Exemplary Message Handlers for Actions

```
/************************************************************
*************************************************************/
int Handle_Schedule_Meeting    (LPSTR lpFrom,
                                LPSTR lpEmail,
                                LPSTR lpEmailType,
                                LPSTR lpTo,
                                LPSTR lpCC,
                                LPSTR lpMessage,
                                LPSTR lpAttachFile,
                                int   nMsgID)
{
    //  This function will scan the incoming message and get all the
    //  information related to this event.
    //     Information includes following parts:
    //         - start date/time and end date/time
    //         - time zone
    //         - location
    //         - City and country
    //         - Event properties, such as alarm, tentative, RSVP, etc..
    //         - Participants info
    //         - Resource allocated for this event
    //         - Event ID
    //         - Subject
    //         - Message body
    //  After getting the information, it will add one item into Event List
    //  database
    //  This function will also handle the Reminder and Confirm message type
    //
    return TRUE;
}
/************************************************************
*************************************************************/
int Handle_Reschedule (LPSTR lpFrom, LPSTR lpEmail, LPSTR lpEmailType, LPSTR
lpTo, LPSTR lpCC, LPSTR lpMessage, int nReplyCode)
{
    //  This function will scan incoming message and get all the information
    //      It will set new value to the same item in the Event database
}
/************************************************************
*************************************************************/
int Handle_Reply (LPSTR lpFrom, LPSTR lpEmail, LPSTR lpTo, LPSTR lpCC, LPSTR
lpSubject, LPSTR lpMessage, int nInReplyType, LPSTR lpShortMsg)
{
    1.  Get group schedule information included in lpMessage;
    2.  Get Reply type information included in lpMessage;
    3.  Handle Group Meeting update, including change recipient status,
        change recipient if it is a forward to type of reply.
```

APPENDIX B-continued

Exemplary Message Handlers for Actions

```
}
/****************************************************************************
 ****************************************************************************/
int CreateFreeTime_Matrix_Send (LPSTR lpFrom, LPSTR lpEmail, LPSTR lpCC, LPSTR
lpMessage)
{
    //   Create a free time calendar and send to initiator
}
/****************************************************************************
 ****************************************************************************/
int Handle_Meeting_Note (LPSTR lpFrom, LPSTR lpCC, LPSTR lpMessage, LPSTR
lpAttachFile)
{
    //   get minutes of meeting and attached file and
    //   save to the Event
}
/****************************************************************************
 ****************************************************************************/
int Handle Cancel_Meeting (LPSTR lpFrom, LPSTR lpCC, LPSTR lpMessage)
{
    //   get information from message
    //   delete event from calendar
    //   set current event to canceled status
}
/****************************************************************************
 ****************************************************************************/
int Handle_Resource_Schedule (LPSTR lpFrom, LPSTR lpEmail, LFSTR lpEmailType,
LPSTR lpTo, LPSTR lpCC, LPSTR lpMessage)
{
    //   get information from message
    //   try to reserve the resource
    //   send reply back to initiator (accept or decline)
}
/****************************************************************************
 ****************************************************************************/
{
int Handle_Resource_Cancel (LPSTR lpFrom, LPSTR lpEmail, LPSTR lpMessage)
    //   cancel resource reservation
}
/****************************************************************************
 ****************************************************************************/
{
int Handle_Free_Resource (LPSTR lpFrom, LPSTR lpEmail, LPSTR lpMessage)
{
    //   create resource free time calendar and send to intiator
}
/****************************************************************************
 ****************************************************************************/
int Handle_Transfer_Resource (LPSTR lpFrom, LPSTR lpEmail, LPSTR lpEmailType,
LPSTR lpMessage, LPSTR lpAttachFile)
{
    //   get transfer resource and add an item to event database
}
```

What is claimed is:

1. In a computerized scheduling system, a method for assisting a user with scheduling calendar events in an electronic calendar, the method comprising:

(a) receiving input from the user specifying an event to schedule together with a lists of participants desired to participate in the event, at least some of said participants employing remote computer systems which are unable to interpret proprietary scheduling formats of the computerized scheduling system of the user;

(b) in response to said input, generating an electronic scheduling invitation which invites the participants to the event, said scheduling invitation being encoded in a plurality of different message formats, each message format supporting a different level of information content, said plurality of different message formats selected from a group comprising at least a proprietary scheduling format, a Hypertext Markup Language (HTML) format, and a simple electronic-mail format so that said scheduling invitation may be encoded for appropriate processing by disparate remote computer systems including those which are unable to interpret proprietary scheduling formats of the computerized scheduling system of the user;

(c) sending said scheduling invitation to each participant;

(d) upon receiving said scheduling invitation, generating an electronic scheduling reply by:

(i) decoding the message format having the highest level of information content suitable for the computer system employed by said each participant, (ii) creating an electronic scheduling reply suitable for automatic processing by said computerized scheduling system of the user, said reply including a response indicating whether said each participant can participate in the event, and (iii) sending said scheduling reply to said user; and (e) upon receiving each participant's scheduling reply, automatically updating the calendar based on the response contained within the scheduling reply.

2. In a computerized scheduling system, a method for assisting a user with scheduling calendar events in an electronic calendar, the method comprising:
   (a) receiving input from the user specifying an event to schedule together with a lists of participants desired to participate in the event, at least some of said participants employing remote computer systems which are unable to interpret proprietary scheduling formats of the computerized scheduling system of the user;
   (b) in response to said input, generating an electronic scheduling invitation which invites the participants to the event, said scheduling invitation being encoded in a plurality of different message formats, each message format supporting a different level of information content;
   (c) sending said scheduling invitation to each participant;
   (d) upon receiving said scheduling invitation, generating an electronic scheduling reply by:
      (i) decoding the message format having the highest level of information content suitable for the computer system employed by said each participant.
      (ii) creating an electronic scheduling reply suitable for automatic processing by said computerized scheduling system of the user, said reply including a response indicating whether said each participant can participate in the event, and
      (iii) sending said scheduling reply to said user; and
   (e) upon receiving each participant's scheduling reply, automatically updating the calendar based on the response contained within the scheduling reply, wherein at least one message format comprises a proprietary scheduling format of the computerized scheduling system of the user.

3. The method of claim 2, wherein said message format which comprises a proprietary scheduling format of the computerized scheduling system of the user is transmitted in the electronic scheduling message as a binary attachment.

4. The method of claim 3, wherein said binary attachment comprises a Multipurpose-Internet-Mail-Extensions binary attachment.

5. The method of claim 1, wherein at least one message format comprises a simple text message ensuring that a participant employing a computer system providing only simple electronic-mail support can reply to said electronic scheduling message.

6. The method of claim 1, wherein said input received from the user comprises an event time and location.

7. The method of claim 6, wherein at least one of the scheduling replies comprises a reply indicating that a participant cannot participate in the event and further includes information indicating an alternate time for scheduling the event.

8. In a computerized scheduling system, a method for assisting a user with scheduling calendar events in an electronic calendar, the method comprising:
   (a) receiving input from the user specifying an event to schedule together with a lists of participants desired to participate in the event, at least some of said participants employing remote computer systems which are unable to interpret proprietary scheduling formats of the computerized scheduling system of the user;
   (b) in response to said input, generating an electronic scheduling invitation which invites the participants to the event, said scheduling invitation being encoded in a plurality of different message formats, each message format supporting a different level of information content;
   (c) sending said scheduling invitation to each participant;
   (d) upon receiving said scheduling invitation, generating an electronic scheduling reply by:
      (i) decoding the message format having the highest level of information content suitable for the computer system employed by said each participant,
      (ii) creating an electronic scheduling reply suitable for automatic processing by said computerized scheduling system of the user, said reply including a response indicating whether said each participant can participate in the event, and
      (iii) sending said scheduling reply to said user; and
   (e) upon receiving each participant's scheduling reply, automatically updating the calendar based on the response contained within the scheduling reply, wherein said message format which comprises a Hypertext Markup Language (HTML) form automatically generated by the system based on said input from the user, said HTML form capable of being viewed by any participant having an HTML browser.

9. The method of claim 8, wherein said HTML form comprises form fields displaying said input from the user, and further comprises screen buttons which a participant can select for generating a reply.

10. In a computerized scheduling system, a method for assisting a user with scheduling calendar events in an electronic calendar, the method comprising:
   (a) receiving input from the user specifying an event to schedule together with a lists of participants desired to participate in the event, at least some of said participants employing remote computer systems which are unable to interpret proprietary scheduling formats of the computerized scheduling system of the user;
   (b) in response to said input, generating an electronic scheduling invitation which invites the participants to the event, said scheduling invitation being encoded in a plurality of different message formats, each message format supporting a different level of information content;
   (c) sending said scheduling invitation to each participant;
   (d) upon receiving said scheduling invitation, generating an electronic scheduling reply by:
      (i) decoding the message format having the highest level of information content suitable for the computer system employed by said each participant,
      (ii) creating an electronic scheduling reply suitable for automatic processing by said computerized scheduling system of the user, said reply including a response indicating whether said each participant can participate in the event, and
      (iii) sending said scheduling reply to said user; and
   (e) upon receiving each participant's scheduling reply, automatically updating the calendar based on the response contained within the scheduling reply, wherein said a different level of information content comprises selected ones of a proprietary scheduling format of the computerized scheduling system, a Hypertext Markup Language (HTML) format, and a simple text format.

11. The method of claim 1, wherein said electronic scheduling invitation includes an embedded identifier which is incorporated into each reply so that said computerized scheduling system can automatically differentiate the replies from other electronic mail which the user receives.

12. The method of claim 11, wherein said embedded identifier includes information allowing said computerized scheduling system to automatically identify the replies as being associated with a particular electronic scheduling invitation.

13. The method of claim 1, wherein each reply includes a participant identifier allowing said computerized scheduling system to automatically associate each reply with a particular participant.

14. The method of claim 13, wherein step (e) includes indicating in the calendar which participants can attend.

15. The method of claim 1, wherein step (c) includes:
transmitting said scheduling invitation via a particular electronic-mail format of America On-line, CompuServe, Microsoft Exchange, and Internet POP3, wherein the particular electronic-mail format employed is selected based on an electronic-mail address for each participant.

16. An automated electronic scheduling system comprising:
a computer having a processor and a memory;
a user interface for inputting a particular event for scheduling;
a composer, responsive to said user interface, for automatically generating an electronic mail (e-mail) invitation which encodes scheduling information in formats of differing levels of information content for supporting e-mail systems other than said automated electronic scheduling system, said plurality formats selected from a group comprising at least a proprietary scheduling format, a Hypertext Markup Language (HTML) format, and a simple electronic-mail format so that said e-mail invitation may be encoded for appropriate processing by disparate e-mail systems including those which are unable to interpret proprietary scheduling formats of said automated electronic scheduling system;
an e-mail transport mechanism for sending the e-mail invitation to each desired participants, at least some of who reply to the e-mail invitation; and
means for identifying each reply which responds to the e-mail invitation; and
a parser, responsive to identification means, for extracting from each reply information indicating whether a desired participant can attend the particular event.

17. The system of claim 16, further comprising:
a calendar update module for automatically indicating which desired participants can attend the particular event.

18. The system of claim 16, wherein said composer inserts an identifier into the e-mail invitation so that any reply which incorporates contents of the e-mail invitation can be associated with the particular event.

19. The system of claim 18, wherein said identifier is inserted into a subject line of the e-mail invitation.

20. The system of claim 16, wherein said composer inserts into the e-mail invitation for each particular desired participant an identifier for the participant so that any reply which incorporates contents of the e-mail invitation can be associated with the particular desired participant.

21. An automated electronic scheduling system comprising:
a computer having a processor and a memory;
a user interface for inputting a particular event for scheduling;
a composer, responsive to said user interface, for automatically generating an electronic mail (e-mail) invitation which encodes scheduling information in formats of differing levels of information content for supporting e-mail systems other than said automated electronic scheduling system;
an e-mail transport mechanism for sending the e-mail invitation to each desired participants, at least some of who reply to the e-mail invitation; and
means for identifying each reply which responds to the e-mail invitation; and
a parser, responsive to identification means, for extracting from each reply information indicating whether a desired participant can attend the particular event, wherein said formats comprise at least a simple text message understood by any participant having a system with simple e-mail support, a Hypertext Markup Language (HTML) form understood by any participant having a system with an Internet browser, and a binary attachment understood by any participant having the automated electronic scheduling system.

22. The system of claim 21, wherein said simple text message includes delimiters for recording a desired participant's response in a manner which can be identified by the parser.

23. The system of claim 22, wherein said delimiters comprise text strings having a form substantially like [ ] Accept and [ ] Decline, for allowing a desired participant to indicate whether the participant can attend the particular event.

24. The system of claim 22, wherein said delimiters further comprise text strings having a form substantially like <BEGIN REPLY MESSAGE> and <END REPLY MESSAGE>, for allowing a desired participant to enter a reply which is automatically recognized and processed by the system.

25. An automated electronic scheduling system comprising:
a computer having a processor and a memory;
a user interface for inputting a particular event for scheduling;
a composer, responsive to said user interface, for automatically generating an electronic mail (e-mail) invitation which encodes scheduling information in formats of differing levels of information content for supporting e-mail systems other than said automated electronic scheduling system;
an e-mail transport mechanism for sending the e-mail invitation to each desired participants, at least some of who reply to the e-mail invitation; and
means for identifying each reply which responds to the e-mail invitation; and
a parser, responsive to identification means, for extracting from each reply information indicating whether a desired participant can attend the particular event, wherein said e-mail transport mechanism is a selected one of a Microsoft MAPI (Messaging Application Programming Interface) compliant e-mail transport mechanism and a POP3 (Internet Post Office Protocol) compliant e-mail transport mechanism.

26. A method for unattended scheduling of resources, the method comprising:
storing in a computer information describing a set of resources which are available for use by individuals;
providing at least one electronic mail (e-mail) account at the computer for receiving e-mail scheduling requests from the individuals for scheduling use of the resources at particular times;

for such an e-mail request received at the computer, processing the e-mail request for identifying a particular individual who is requesting a particular resource at a requested time;

comparing the received request against a scheduling calendar listing availability of the particular resource at the requested time; and if the particular resource is available at the requested time, automatically sending a reply e-mail message to the particular individual confirming acceptance of the scheduling request and updating the scheduling calendar for indicating that the particular resource is now scheduled at the requested time for use by the particular individual.

27. The method of claim 26, further comprising:

if the particular resource is unavailable at the requested time, automatically sending a reply e-mail message to the particular individual denying acceptance of the scheduling request.

28. The method of claim 27, wherein said reply e-mail message further comprises a report indicating availability of the particular resource for a given time period.

29. The method of claim 26, wherein said set of resources include at least two types of resources selected from a movable type of resource and an immovable type of resource.

30. The method of claim 29, wherein said movable type of resource includes an "equipment" resource type.

31. The method of claim 29, wherein said immovable type of resource includes a "room" resource type.

32. The method of claim 31, wherein said scheduling calendar also maintains schedules for meetings of the individuals and wherein individuals are not allowed to schedule two meetings which require an identical resource which is of type "room."

33. The method of claim 29, wherein a resource which is immovable is not allowed to accept scheduling requests specifying times which overlap.

34. The method of claim 29, wherein a resource which is movable is allowed to accept scheduling requests specifying times which overlap.

35. The method of claim 26, wherein said processing the e-mail request includes parsing the e-mail request to extract an identifier indicating that the e-mail is a scheduling request for a resource.

36. The method of claim 26, wherein said requested time is automatically converted by the system to a time zone relative to where the particular individual resides.

* * * * *